(12) United States Patent
Zaharchuk et al.

(10) Patent No.: US 12,348,031 B2
(45) Date of Patent: Jul. 1, 2025

(54) LOAD CONTROL SYSTEM HAVING INDEPENDENTLY-CONTROLLED UNITS RESPONSIVE TO A BROADCAST CONTROLLER

(71) Applicant: Lutron Technology Company LLC, Coopersburg, PA (US)

(72) Inventors: Walter S. Zaharchuk, Macungie, PA (US); Timothy S. Majewski, New Tripoli, PA (US); Christopher Buck, Stow, MA (US); Daniel Vander Valk, Nazareth, PA (US); John H. Bull, Slatington, PA (US); Joel S. Spira, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/607,748

(22) Filed: Mar. 18, 2024

(65) Prior Publication Data

US 2024/0223006 A1   Jul. 4, 2024

Related U.S. Application Data

(63) Continuation of application No. 17/232,933, filed on Apr. 16, 2021, now Pat. No. 11,967,821, which is a
(Continued)

(51) Int. Cl.
*H02J 13/00* (2006.01)
*H02J 3/00* (2006.01)
(Continued)

(52) U.S. Cl.
CPC .......... *H02J 13/00024* (2020.01); *H02J 3/00* (2013.01); *H02J 3/14* (2013.01); *H02J 4/00* (2013.01);
(Continued)

(58) Field of Classification Search
None
See application file for complete search history.

(56) References Cited

U.S. PATENT DOCUMENTS

| 4,916,328 A | 4/1990 | Culp, III |
| 5,248,919 A | 9/1993 | Hanna et al. |
| (Continued) | | |

FOREIGN PATENT DOCUMENTS

| CN | 1729727 A | 2/2006 |
| CN | 101164381 A | 4/2008 |
| (Continued) | | |

OTHER PUBLICATIONS

Silicon Labs, "Using Antenna Diversity to Create Highly Robust Radio Links", Jan. 1, 2009, pp. 1-13.
(Continued)

*Primary Examiner* — Jared Fureman
*Assistant Examiner* — Joel Barnett
(74) *Attorney, Agent, or Firm* — Michael S. Czarnecki; Glen R. Farbanish; Philip N. Smith

(57) ABSTRACT

A load control system for controlling the amount of power delivered from an AC power source to a plurality of electrical load includes a plurality of independent units responsive to a broadcast controller. Each independent unit includes at least one commander and at least one energy controller for controlling at least one of the electrical loads in response to a control signal received from the commander. The independent units are configured and operate independent of each other. The broadcast controller transmits wireless signals to the energy controllers of the independent units. The energy controllers do not respond to control signals received from the commanders of other independent units, but the energy controllers of both independent units respond to the wireless signals transmitted by broadcast
(Continued)

controller. The energy controller may operate in different operating modes in response to the wireless signals transmitted by the broadcast controller.

21 Claims, 21 Drawing Sheets

Related U.S. Application Data continuation of application No. 16/564,093, filed on Sep. 9, 2019, now Pat. No. 11,005,264, which is a continuation of application No. 15/394,128, filed on Dec. 29, 2016, now Pat. No. 10,447,036, which is a continuation of application No. 13/725,105, filed on Dec. 21, 2012, now Pat. No. 9,553,451.

(60) Provisional application No. 61/654,562, filed on Jun. 1, 2012, provisional application No. 61/640,241, filed on Apr. 30, 2012, provisional application No. 61/580,898, filed on Dec. 28, 2011.

(51) Int. Cl.
*H02J 3/14* (2006.01)
*H02J 4/00* (2006.01)
*H02J 50/80* (2016.01)
*H04B 7/04* (2017.01)
*H04B 7/06* (2006.01)
*H04H 20/00* (2009.01)
*H04L 12/28* (2006.01)
*H05B 47/10* (2020.01)
*H05B 47/19* (2020.01)
*G08C 17/02* (2006.01)
*H05B 47/165* (2020.01)
*H05B 47/17* (2020.01)

(52) U.S. Cl.
CPC .. *H02J 13/00004* (2020.01); *H02J 13/00022* (2020.01); *H02J 13/00026* (2020.01); *H02J 50/80* (2016.02); *H04B 7/04* (2013.01); *H04B 7/0608* (2013.01); *H04H 20/00* (2013.01); *H04L 12/2816* (2013.01); *H05B 47/10* (2020.01); *H05B 47/19* (2020.01); *G08C 17/02* (2013.01); *H02J 2310/14* (2020.01); *H05B 47/165* (2020.01); *H05B 47/17* (2020.01); *Y02B 70/30* (2013.01); *Y02B 70/3225* (2013.01); *Y02B 90/20* (2013.01); *Y02D 30/70* (2020.08); *Y04S 20/20* (2013.01); *Y04S 20/222* (2013.01); *Y04S 20/244* (2013.01); *Y04S 20/246* (2013.01); *Y04S 40/00* (2013.01); *Y04S 40/126* (2013.01)

(56) References Cited

U.S. PATENT DOCUMENTS

| | | | |
|---|---|---|---|
| 5,479,448 A | 12/1995 | Seshadri | |
| 5,565,855 A | 10/1996 | Knibbe | |
| 5,834,855 A | 11/1998 | Chiba | |
| 5,905,442 A | 5/1999 | Mosebrook et al. | |
| 5,982,103 A | 11/1999 | Mosebrook et al. | |
| 6,085,076 A | 7/2000 | Lindsay et al. | |
| 6,437,692 B1 | 8/2002 | Petite et al. | |
| 6,501,803 B1 | 12/2002 | Alamouti et al. | |
| 6,528,957 B1 | 3/2003 | Luchaco | |
| 6,553,021 B1 | 4/2003 | Bishop, Jr. et al. | |
| 6,671,586 B2 | 12/2003 | Davis et al. | |
| 6,803,728 B2 | 10/2004 | Balasubramaniam et al. | |
| 6,836,737 B2 | 12/2004 | Petite et al. | |
| 6,862,498 B2 | 3/2005 | Davis et al. | |
| 6,891,838 B1 | 5/2005 | Petite et al. | |
| 6,914,533 B2 | 7/2005 | Petite | |
| 6,914,893 B2 | 7/2005 | Petite | |
| 6,927,547 B2 | 8/2005 | Walko, Jr. et al. | |
| 6,975,958 B2 | 12/2005 | Bohrer et al. | |
| 6,980,080 B2 | 12/2005 | Christensen et al. | |
| 6,983,783 B2 | 1/2006 | Carmen et al. | |
| 7,053,767 B2 | 5/2006 | Petite et al. | |
| 7,103,511 B2 | 9/2006 | Petite | |
| 7,211,968 B2 | 5/2007 | Adamson et al. | |
| 7,362,285 B2 | 4/2008 | Webb et al. | |
| 7,391,297 B2 | 6/2008 | Cash et al. | |
| 7,573,208 B2 | 8/2009 | Newman, Jr. | |
| 7,619,539 B2 | 11/2009 | Veskovic et al. | |
| 7,643,908 B2 | 1/2010 | Quirino et al. | |
| 7,697,492 B2 | 4/2010 | Murdoch | |
| 7,747,357 B2 | 6/2010 | Murdoch | |
| 7,755,505 B2 | 7/2010 | Johnson et al. | |
| 7,756,086 B2 | 7/2010 | Petite et al. | |
| 7,940,167 B2 | 5/2011 | Steiner et al. | |
| 8,009,042 B2 | 8/2011 | Steiner et al. | |
| 8,013,732 B2 | 9/2011 | Petite et al. | |
| 8,031,049 B2 | 10/2011 | Murdoch | |
| 8,031,650 B2 | 10/2011 | Petite et al. | |
| 8,035,529 B2 | 10/2011 | Veskovic et al. | |
| 8,064,412 B2 | 11/2011 | Petite | |
| 7,880,639 B2 | 12/2011 | Courtney et al. | |
| 7,889,051 B1 | 12/2011 | Billig et al. | |
| 8,111,008 B2 | 2/2012 | Veskovic et al. | |
| 8,139,945 B1 | 3/2012 | Amir et al. | |
| 8,199,010 B2 | 6/2012 | Sloan et al. | |
| 8,228,184 B2 | 7/2012 | Blakeley et al. | |
| 8,288,981 B2 | 10/2012 | Zaharchuk et al. | |
| 8,306,473 B2 | 11/2012 | Anreddy et al. | |
| 8,330,638 B2 | 12/2012 | Altonen et al. | |
| 8,368,310 B1 | 2/2013 | Roosli | |
| 8,379,564 B2 | 2/2013 | Petite et al. | |
| 8,396,007 B2 | 3/2013 | Genia et al. | |
| 8,406,220 B2 | 3/2013 | McLaughlin et al. | |
| 8,410,706 B2 | 4/2013 | Steiner et al. | |
| 8,457,793 B2 | 6/2013 | Golding et al. | |
| 8,487,474 B2 | 7/2013 | Weidman et al. | |
| 8,492,987 B2 | 7/2013 | Nuhfer et al. | |
| 8,504,174 B2 | 8/2013 | Rahme et al. | |
| 8,598,978 B2 | 12/2013 | Knode | |
| 8,680,787 B2 | 3/2014 | Veskovic | |
| 8,838,282 B1 | 9/2014 | Ratliff et al. | |
| 9,300,147 B2 | 3/2016 | Lee et al. | |
| 9,553,451 B2 | 1/2017 | Zacharchuk et al. | |
| 10,734,807 B2 | 8/2020 | Mosebrook et al. | |
| 2003/0197426 A1* | 10/2003 | Carson | H05B 47/1965 340/12.32 |
| 2004/0132402 A1 | 7/2004 | Agashe et al. | |
| 2005/0280546 A1 | 12/2005 | Ganley et al. | |
| 2006/0049935 A1 | 3/2006 | Giannopoulos et al. | |
| 2007/0082632 A1 | 4/2007 | Liu | |
| 2007/0085699 A1 | 4/2007 | Walters et al. | |
| 2007/0085700 A1 | 4/2007 | Walters et al. | |
| 2007/0085701 A1 | 4/2007 | Walters et al. | |
| 2007/0085702 A1 | 4/2007 | Walters et al. | |
| 2008/0088180 A1 | 4/2008 | Cash et al. | |
| 2008/0092075 A1 | 4/2008 | Jacob et al. | |
| 2008/0111491 A1 | 5/2008 | Spira et al. | |
| 2008/0147337 A1 | 6/2008 | Walters et al. | |
| 2008/0183307 A1 | 7/2008 | Clayton et al. | |
| 2008/0203928 A1 | 8/2008 | Frumau et al. | |
| 2008/0283621 A1 | 11/2008 | Quirino et al. | |
| 2008/0284347 A1 | 11/2008 | Raneri | |
| 2008/0303688 A1 | 12/2008 | Newman, Jr. | |
| 2009/0086731 A1 | 4/2009 | Lee et al. | |
| 2009/0096623 A1 | 4/2009 | Roosli | |
| 2009/0130990 A1 | 5/2009 | Rofougaran | |
| 2009/0195065 A1 | 8/2009 | Rofougaran | |
| 2009/0206983 A1 | 8/2009 | Knode et al. | |
| 2009/0243517 A1 | 10/2009 | Verfuerth et al. | |
| 2009/0315400 A1 | 12/2009 | Howe et al. | |
| 2010/0031076 A1 | 2/2010 | Wan et al. | |
| 2010/0188009 A1 | 7/2010 | Bull | |
| 2010/0215111 A1 | 8/2010 | Filipovic et al. | |

(56) References Cited

U.S. PATENT DOCUMENTS

| | | |
|---|---|---|
| 2010/0241255 A1 | 9/2010 | Benetz et al. |
| 2010/0244706 A1 | 9/2010 | Steiner et al. |
| 2010/0244709 A1 | 9/2010 | Steiner et al. |
| 2010/0323613 A1 | 12/2010 | Imaeda |
| 2011/0029136 A1 | 2/2011 | Altonen et al. |
| 2011/0029139 A1 | 2/2011 | Altonen et al. |
| 2011/0031806 A1 | 2/2011 | Altonen et al. |
| 2011/0035061 A1 | 2/2011 | Altonen et al. |
| 2011/0043035 A1* | 2/2011 | Yamada ............ H02J 3/14 307/39 |
| 2011/0046806 A1 | 2/2011 | Nagel et al. |
| 2011/0068900 A1* | 3/2011 | Billig ............ H05B 47/19 340/9.1 |
| 2011/0090042 A1 | 4/2011 | Leonard et al. |
| 2011/0127843 A1 | 6/2011 | Karaoguz et al. |
| 2011/0215736 A1 | 9/2011 | Horbst et al. |
| 2011/0254453 A1 | 10/2011 | Veskovic |
| 2012/0001487 A1 | 1/2012 | Pessina |
| 2012/0051444 A1 | 3/2012 | Steiner et al. |
| 2012/0056712 A1 | 3/2012 | Knode |
| 2012/0062125 A1 | 3/2012 | Mohan et al. |
| 2012/0068686 A1 | 3/2012 | Steiner et al. |
| 2012/0068824 A1 | 3/2012 | Steiner et al. |
| 2012/0078547 A1 | 3/2012 | Murdoch |
| 2012/0091213 A1 | 4/2012 | Altonen et al. |
| 2012/0091804 A1 | 4/2012 | Altonen et al. |
| 2012/0095601 A1 | 4/2012 | Abraham et al. |
| 2012/0130544 A1 | 5/2012 | Mohan et al. |
| 2012/0133287 A1 | 5/2012 | Steiner et al. |
| 2012/0158203 A1 | 6/2012 | Feldstein |
| 2012/0261078 A1 | 10/2012 | Adams et al. |
| 2012/0286676 A1 | 11/2012 | Saveri et al. |
| 2012/0299485 A1 | 11/2012 | Mohan et al. |
| 2013/0004177 A1 | 1/2013 | Deligiannis |
| 2013/0010018 A1 | 1/2013 | Economy |
| 2013/0181630 A1 | 7/2013 | Taipale et al. |
| 2014/0062297 A1* | 3/2014 | Bora ............ H05B 45/10 315/297 |
| 2014/0188296 A1 | 7/2014 | Oh et al. |

FOREIGN PATENT DOCUMENTS

| | | |
|---|---|---|
| CN | 101399623 A | 4/2009 |
| CN | 101645602 A | 2/2010 |
| CN | 101692719 A | 4/2010 |
| CN | 101946420 A | 1/2011 |
| CN | 102081395 A | 6/2011 |
| WO | 2001/35693 A1 | 5/2001 |
| WO | 2003/007665 A1 | 1/2003 |
| WO | 2004/023849 A1 | 3/2004 |
| WO | 2006/095317 A1 | 9/2006 |
| WO | 2010/122440 A2 | 10/2010 |
| WO | 2010/143130 A1 | 12/2010 |
| WO | 2011/050055 A2 | 4/2011 |
| WO | 2012/137125 A2 | 10/2012 |

OTHER PUBLICATIONS

Antenova, "Antenna Designs for MIMO Systems", Queen Mary University of London, Crown Copyright, Jan. 1, 2004, 120 pages.

Awang Da et al., "Polarization Diversity Monopole Antenna", Wireless Communication Centre (WCC), Faculty of Electrical Engineering, Malaysia, Jul. 5-8, 2010, 5 pages.

Zhuo, et al. "System Research on Transmit Diversity Techniques for Modern Mobile Communication" Radio Communications Technology, China Academic Journal Electronic Publishing House, vol. 33, No. 6. pp. 13-15.

* cited by examiner

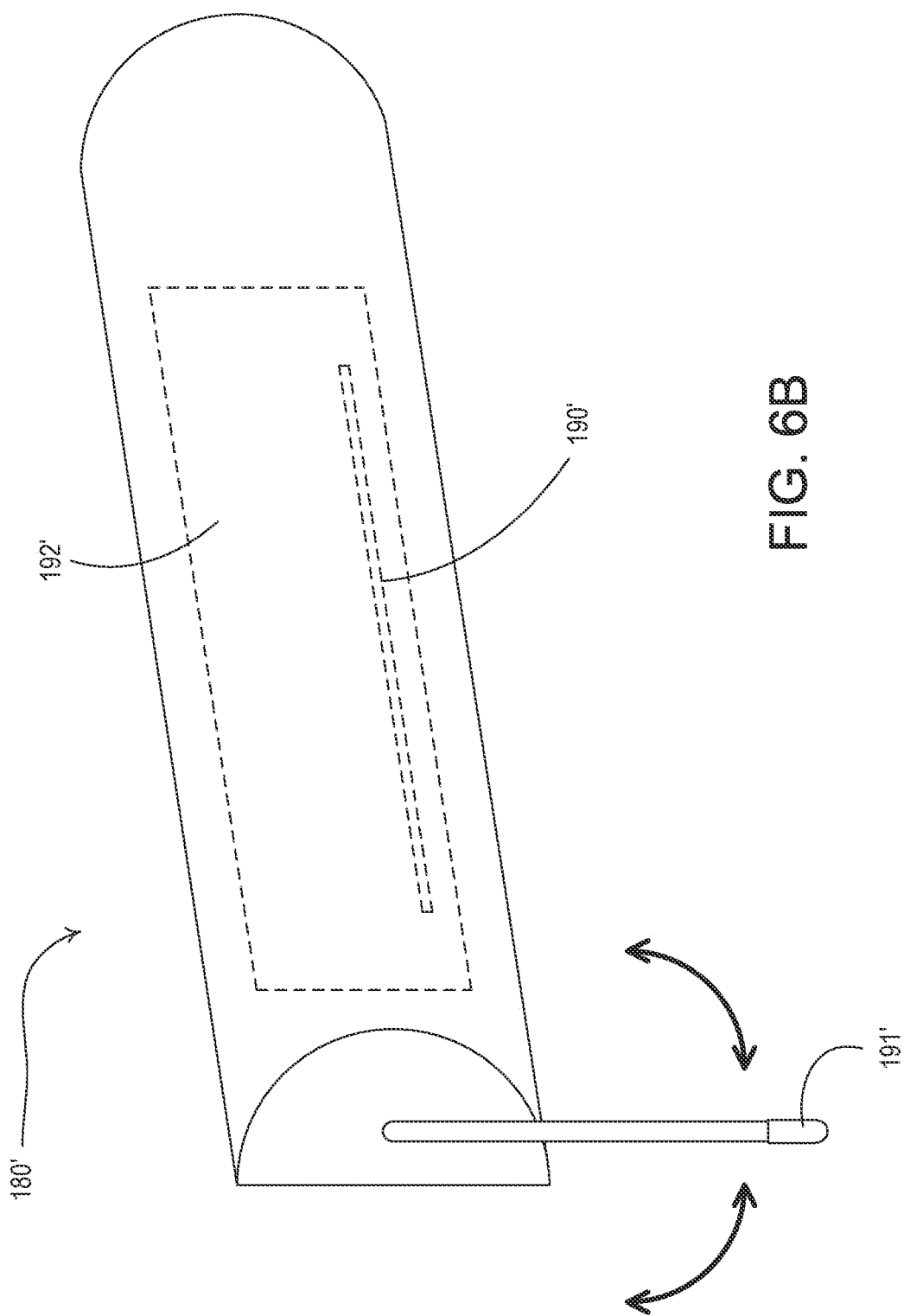

| | Condition Yellow | Condition Orange | Condition Red | Time-of-day Pricing | Time Clock | Tuning | Demand Charge Mgmt |
|---|---|---|---|---|---|---|---|
| | | Hallways | Offices | Special Offices 1 | Special Offices 2 | Do Not Touch | Outside Lights |
| Dimmers | | Shed 30% in 1 min | Shed 20% in 1 min | Shed 10% in 1 min | Unaffected | Unaffected | Unaffected |
| Plug-in-Dimmers | | Shed 30% in 1 min | Shed 20% in 1 min | Shed 10% in 1 min | Unaffected | Unaffected | Unaffected |
| Switches | | Turn Off | Turn Off | Turn Off | Unaffected | Unaffected | Unaffected |
| Plug-in-Switches | | Turn Off | Turn Off | Unaffected | Unaffected | Unaffected | Unaffected |
| Thermostats | | Set back 2° | Set back 2° | Set back 1° | Unaffected | Unaffected | Unaffected |
| Shades | | Close | Close | Close | Unaffected | Unaffected | Unaffected |

FIG. 10A

| | Condition Yellow | Condition Orange | Condition Red | Time-of-day Pricing | Time Clock | Tuning | Demand Charge Mgmt |
|---|---|---|---|---|---|---|---|
| | | Hallways | Offices | Special Offices 1 | Special Offices 2 | Do Not Touch | Outside Lights |
| Dimmers | | Shed 60% in 30 sec | Shed 55% in 30 sec | Shed 50% in 1 min | Shed 20% in 1 min | Unaffected | Unaffected |
| Plug-in-Dimmers | | Shed 60% in 30 sec | Shed 55% in 30 sec | Shed 50% in 1 min | Shed 20% in 1 min | Unaffected | Unaffected |
| Switches | | Turn Off | Turn Off | Turn Off | Unaffected | Unaffected | Turn Off |
| Plug-in-Switches | | Turn Off | Turn Off | Unaffected | Unaffected | Unaffected | Turn Off |
| Thermostats | | Set back 4° | Set back 3° | Set back 3° | Set back 2° | Unaffected | Unaffected |
| Shades | | Close | Close | Close | Unaffected | Unaffected | Unaffected |

FIG. 10B

| | | Condition Yellow | Condition Orange | Condition Red | Time-of-day Pricing | Time Clock | Tuning | Demand Charge Mgmt |
|---|---|---|---|---|---|---|---|---|
| | | | | Hallways | Offices | Special Offices 1 | Special Offices 2 | Do Not Touch | Outside Lights |
| Dimmers | | | | Turn Off in 1 sec | Turn Off in 1 sec | Turn Off in 1 sec | Turn Off in 1 sec | Unaffected | Turn Off in 1 sec |
| Plug-in-Dimmers | | | | Turn Off in 1 sec | Turn Off in 1 sec | Turn Off in 1 sec | Turn Off in 1 sec | Unaffected | Turn Off in 1 sec |
| Switches | | | | Turn Off | Turn Off | Turn Off | Turn Off | Unaffected | Turn Off |
| Plug-in-Switches | | | | Turn Off | Turn Off | Turn Off | Turn Off | Unaffected | Turn Off |
| Thermostats | | | | Turn Off | Turn Off | Turn Off | Turn Off | Unaffected | Unaffected |
| Shades | | | | Close | Close | Close | Close | Unaffected | Unaffected |

FIG. 10C

| | Condition Yellow | Condition Orange | Condition Red | Time-of-day Pricing | Time Clock | Tuning | Demand Charge Mgmt. |
|---|---|---|---|---|---|---|---|

Below are the default high-end-trim values for each group.

| | Hallways | Offices | Special Offices 1 | Special Offices 2 | Do Not Touch | Outside Lights |
|---|---|---|---|---|---|---|
| Dimmers | 70% | 80% | 80% | 80% | 100% | 80% |
| Plug-in-Dimmers | 70% | 80% | 80% | 80% | 100% | 80% |

FIG. 10D

LOAD CONTROL SYSTEM HAVING INDEPENDENTLY-CONTROLLED UNITS RESPONSIVE TO A BROADCAST CONTROLLER

CROSS REFERENCE TO RELATED APPLICATIONS

This application is a continuation of U.S. patent application Ser. No. 17/232,933 filed Apr. 16, 2021; which is a continuation of U.S. patent application Ser. No. 16/564,093, filed on Sep. 9, 2019, now U.S. Pat. No. 11,005,264 issued May 11, 2021; which is a continuation of U.S. patent application Ser. No. 15/394,128, filed on Dec. 29, 2016, now U.S. Pat. No. 10,447,036, issued on Oct. 15, 2019, which is a continuation of U.S. patent application Ser. No. 13/725,105, filed on Dec. 21, 2012, now issued as U.S. Pat. No. 9,553,451 on Jan. 24, 2017, which claims priority to U.S. Provisional Patent Application No. 61/580,898, filed Dec. 28, 2011, U.S. Provisional Patent Application No. 61/640,241, filed on Apr. 30, 2012, and U.S. Provisional Patent Application No. 61/654,562, filed Jun. 1, 2012, the entire disclosure of each of which is hereby incorporated by reference herein.

BACKGROUND

Buildings, such as homes, office buildings, warehouses, factories, and the like, often use load control systems for controlling electrical loads. Examples of electrical loads include electric lights, motorized window treatments, fans, and other such energy-consuming devices. FIG. 1 depicts such a load control system 10 in an example office building 11.

The load control system 10 may include one or more individual systems 12a-d. Depicted are three offices 14a-c and one conference room 14d—each room having its own individual system 12a-d. Each individual system 12a-d may include at least one load control device, for example, a wall-mounted dimmer switch 26, which may control an overhead light 18. The dimmer switch 24 may be responsive to an occupancy sensor 20. Specifically, the occupancy sensor 20 may detect when someone enters the room and then send a control signal to the dimmer switch 24. The dimmer switch 24, in response to the control signal, may turn on the overhead light 18. Similarly, the dimmer switch 24 may also be responsive to a light sensor (not shown) for dimming the light based on how much daylight is present. The load control system 10 may also comprise a motorized window treatment 22 that may be responsive to the light sensor. The dimmer switch 24, the occupancy sensor 20, the light sensor, and the motorized window treatment 22 may communicate wirelessly.

Because load control system 10 includes individually-operating systems 12a-d, the control devices of one individual system do not control the control devices of another individual system. Likewise, the control devices of one individual system do not respond to command signals from control devices of another individual system. For example, the occupancy sensor 20 in the office 14c adjacent to the conference room 14d would not control a dimmer switch 24 in the conference room 14d. And, the dimmer switch 24 in the conference room 12d would not respond to a control signal from the occupancy sensor 20 in the office 14c next door.

Having individual systems 12a-d in the rooms 14a-d is useful to the occupants of the building 11. The individual systems 12a-d are relatively easy to install. For example, the individual systems 12a-d can be installed and tested room-by-room, often done in parallel with multiple installers. The individual systems 12a-d are relatively easy to maintain. Changes in one individual system can made without affecting other systems. The individual systems 12a-d allow the load control system 10 to be somewhat flexible, since additional individual systems can be added to the building to allow for staged installations and growth over time. For example, the occupant of an office building may wish to install motorized window treatments in conference rooms first before installing them in individual offices. Similarly, the operator may wish to install occupancy sensors in the restrooms and storage rooms before rolling them out to the rest of the building.

However, there is a major drawback to using independently-operating systems 12a-d in the building 11—no system-wide control and management. Because the independently-operating systems 102a-d are completely independent, there is no mechanism for them to act in a coordinated way across the system as a whole. For example, demand response and whole-building timeclock functions are two popular and useful system-wide controls. An example demand response is when a load control system makes system-wide adjustment, such as reducing total electricity consumption, based on an indication from the electric utility—often when demand on the electric utility is the greatest. A whole-building timeclock function may include, for example, adjusting all of the lights in one mode during the day and another mode afterhours. Because these independently-operating systems 12a-d shown in FIG. 1 operate completely independently of each other, there is no mechanism for adjusting all of the independent units together in response to an indication from the electric utility or in response to a single time-clock. These beneficial system-wide capabilities are not available to a building with a load control system having conventional independent units 12a-d.

Accordingly, there is a need for a load control system that provides the benefits of conventional independent units 102a-d, as well as, enables system-wide functionality, such as demand response and whole-building time clock functions.

SUMMARY

As described herein, a load control system for controlling a plurality of electrical loads includes a plurality of independently-controlled units (or sub-systems) having commanders for controlling energy controllers, where the independent units are configured and operate independent of each other. The load control system further comprises a broadcast controller, which transmits wireless signals to the energy controllers of the independently-controlled units. For example, the energy controllers of the independent units may operate according to different control algorithms (e.g., in different modes of operation) in response to the wireless signals received from the broadcast controller. Since the broadcast controller is adapted to communicate wirelessly with the energy controllers of the independent units, e.g., via radio-frequency (RF) signals, the broadcast controller may be installed without requiring additional wires to be run. The broadcast controller may comprise two antenna oriented to provide spatial and polar diversity to provide for a total transmission area that is greater than twice the transmission area if the broadcast controller only had one antenna.

The load control system may be easily installed and configured without the need for a computer or an advanced commissioning procedure. The independently-controlled units may be independently programmed (i.e., the energy controllers are configured to be responsive to the commanders of the respective independently-controlled unit). The load control system may be easily upgraded to add new system functionality and to add more commanders and energy controllers. Particularly, the broadcast controller may be added to the load control system after the independently-controlled units are initially commissioned to add the global and central control of the independently-controlled units (such as demand response control) without requiring the energy controllers and commanders of the independently-controlled units to be reprogrammed, thus allowing for a short additional commissioning time. In addition, the broadcast controller may provide a simple out-of-box functionality for controlling the electrical loads when a demand response command is received by the load control system, where the out-of-box functionality is easy to communicate and explain to potential customers of the load control system. Further, the operating characteristics and settings of the energy controllers of the load control system may be tuned to allow for easy adjustment of system operation to improve occupant comfort and satisfaction after the initial commissioning of the system.

The broadcast controller may be further operable to collect data (e.g., energy usage information) for use is energy analysis of the load control system. For example, the broadcast controller may be operable to log data from one or more commanders that may be used to predict energy savings of the load control system before energy controllers are installed. The load control system may also provide feedback (such as an audible sound) when the load control system adjusts the load in response to the demand response command.

The commanders of the load control system may comprise, for example, occupancy sensors, vacancy sensors, daylight sensors, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, battery-powered remote controls, kinetic or solar-powered remote controls, key fobs, cell phones, smart phones, tablets, personal digital assistants, personal computers, laptops, timeclocks, audio-visual controls, key-card switches, safety devices, power monitoring devices (such as power meters, energy meters, utility submeters, and utility rate meters), central controllers, residential, commercial, or industrial controllers, or any combination of these input devices.

The energy controllers of the load control system may comprise one or more of, for example, a dimming or switching ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for each controlling one or more plug-in loads (such as coffee pots and space heaters); a motor control units for controlling a motor load, such as a ceiling fan or an exhaust fan; a drive unit for controlling a motorized window treatment or a motorized projection screen; motorized interior or exterior shutters; a thermostat for a heating and/or cooling system; a temperature control device for controlling a setpoint temperature of an HVAC systems; an air conditioner; a compressor; an electric baseboard heater controller; a controllable damper; a variable air volume controller; a fresh air intake controller; a ventilation controller; a hydraulic valve for a radiator or radiant heating system; a humidity control unit; a humidifier; a dehumidifier; a water heater; a boiler controller; a pool pump; a refrigerator; a freezer; a TV or computer monitor; a video camera; an audio system or amplifier; an elevator; a power supply; a generator; an electric charger, such as an electric vehicle charger; an energy storage system; and an alternative energy controller.

According to an embodiment of the present invention, a load control system for controlling a plurality of electrical loads comprises a broadcast controller and a plurality of independent units each having at least one commander and at least one energy controller. The independent units are configured and operate independent of each other. Each energy controller of the independent units is operable to control at least one of the electrical loads in response to a control signal received from the commander of the independent unit. The broadcast controller transmits wireless signals to the energy controllers of the independent units. The energy controllers do not respond to control signals received from the commanders of other independent units, but the energy controllers of both independent units respond to the wireless signals transmitted by the broadcast controller.

According to another aspect of the present invention, a load control system for controlling an electrical load comprises at least one commander for generating a control signal, at least one energy controller operable to control the electrical load in response to the control signal received from the at least one commander, and a broadcast controller operable to transmit wireless signals to the energy controller. The energy controller operates in different operating modes in response to the wireless signals transmitted by the broadcast controller. The energy controller controls the electrical load in response to the control signal received from the at least one commander in different manners depending upon the present operating mode of the energy controller.

According to another embodiment of the present invention, a load control device for controlling an electrical load in response to a remote control device comprises a wireless receiver operable to receive a first wireless signal from the remote control device, and a controller coupled to the wireless receiver for controlling the electrical load in response to the first wireless signal from the remote control device. The wireless receiver is further operable to receive a second wireless signal comprising an operating mode for the load control device. The controller automatically operates according to one of a plurality of control algorithms in response to the operating mode received in the second wireless signal.

In addition, a method for configuring a load control system for controlling a plurality of electrical loads disposed in a plurality of separate rooms in a common building is also described herein. The method comprises the steps of: (1) programming at least one commander in each of the rooms for the control of at least one energy controller which controls a respective load in its respective room for normal operation; and (2) programming each of the commanders to receive overriding wireless control signals from a common broadcast controller to modify the control of each of the energy controllers in response to a standard demand response signal (e.g., a standard demand wireless signal) or an emergency demand response signal (e.g., an emergency demand response wireless signal) produced by the broadcast controller.

Also as described herein, a broadcast controller may be configured to receive a first signal indicating a first condition corresponding to one or more operations of which at least one energy controller may be operable to perform. The broadcast controller may also be configured to transmit a second signal to the at least one energy controller. The second signal may be interpretable by the at least one energy controller to perform at least one of the one or more operations. Further, the at least one energy controller may be configured to prioritize the second signal over a control signal received from the at least one commander.

The broadcast controller may perform a method of discovering nodes or devices of independent units as described herein. The broadcast controller may communicate with a first node (or device) of a first independent unit. The first node may be at least one of a first commander or a first energy controller. The broadcast controller may obtain an address of the first node. And the broadcast controller may obtain from the first node an address of at least one second node of the first independent unit. The at least one second node may be at least one of a second commander or a second energy controller. The at least one second node may also be in communication with the first node. The broadcast controller may make a determination as to if at least one of the first node or the at least one second node may be an energy controller. Further, the broadcast controller may identify at least one of the first node or the at least one second node as an energy controller according to the determination. Additionally, the broadcast controller may identify at least one of the address of the first node or the address of the at least one second node as an address of an energy controller according to the determination.

In addition, as described herein, an energy controller, which may be operable to control at least one electrical load in response to a control signal received from at least one commander, may comprise a wireless communication transceiver. The wireless communication transceiver may be operable to receive a first signal from a broadcast controller. The first signal may include a request for information regarding one or more nodes of an independent unit that may include the energy controller. The wireless communication transceiver may also be operable to transmit a second signal to the broadcast controller in response to the first signal. The second signal may include the information regarding the one or more nodes of the independent unit.

Also as described herein, the broadcast controller may be configured, at least in part, to register respective addresses of one or more energy controllers. The broadcast controller may also be configured to arrange one or more energy controllers into a first group according to at least one user-defined characteristic of the one or more energy controllers. The broadcast controller may also be configured to assign a first group address to the one or more energy controllers arranged into the first group. And the broadcast controller may be configured to transmit the first group address to the one or more energy controllers arranged into the first group.

A method of associating a broadcast controller with an independent unit having at least one transmit-only commander and at least one energy controller operable to control at least one electrical load in response to the commander is also described herein. The method comprises: (1) receiving by the broadcast controller a first wireless signal including a first identifier of the transmit-only commander; (2) transmitting by the broadcast controller a second wireless signal including a query for the serial numbers of energy controllers that are responsive to the commander having the identifier of the first wireless signal; (3) transmitting by the energy controller a third wireless signal including a second identifier of the energy controller; and (4) associating the energy controller with the broadcast controller in response to the broadcast controller receiving the third wireless signal including the second identifier.

Other features and advantages of the present invention will become apparent from the following description of the invention that refers to the accompanying drawings.

BRIEF DESCRIPTION OF THE DRAWINGS

FIG. 6B shows a broadcast controller according to an alternate embodiment of the present invention.

FIGS. 10A-10C show example screenshots of a management view screen that may be displayed on a computing device of the load control system of FIG. 3 according to a third embodiment of the present invention.

FIG. 10D shows an example screenshot of a tuning screen that may be displayed on the computing device of the load control system of FIG. 3 according to the third embodiment of the present invention.

DETAILED DESCRIPTION

Figure 1:
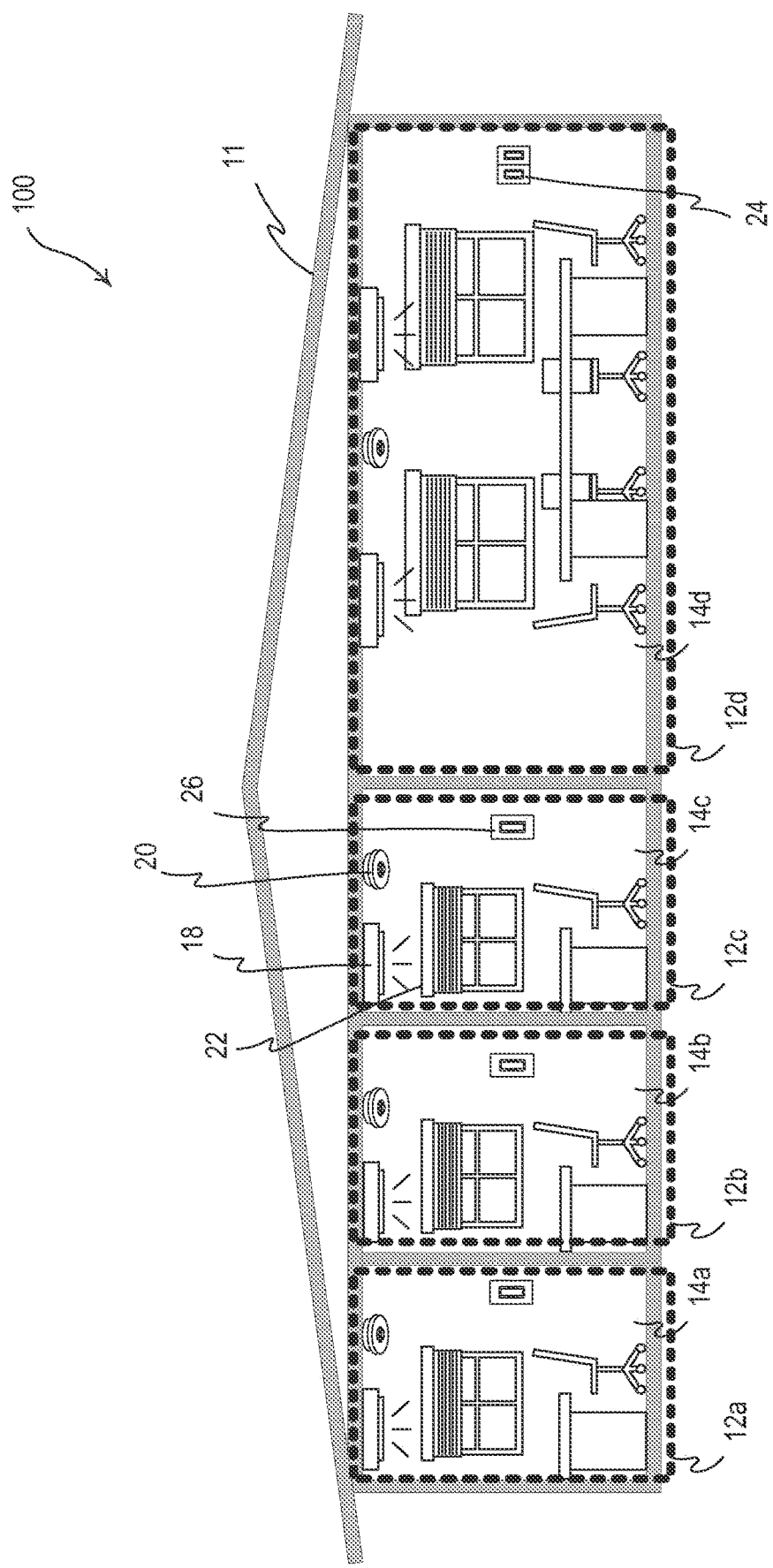
FIG. 1 is an exemplary diagram of a prior art load control system comprising four independent units (e.g., sub-systems) consistent with embodiments.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
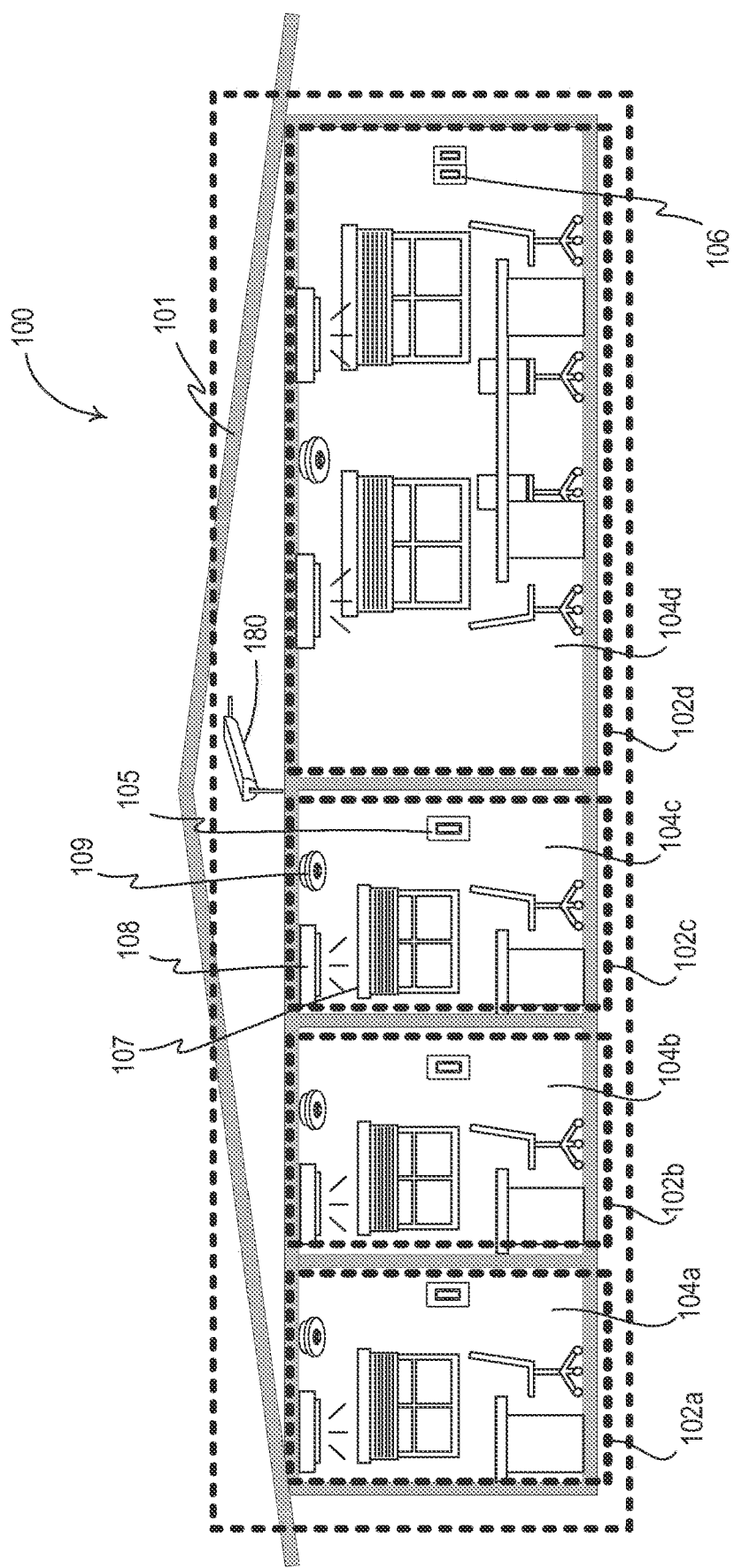
FIG. 2 is an exemplary diagram of a load control system comprising four independent units (e.g., sub-systems) and a broadcast controller consistent with embodiments.

FIG. 2 depicts a load control system 100 employed in a building 101, where the load control system 100 includes the independent units 102a, 102b, 102c, and 102d. Depicted also are three offices 104a-c and one conference room 104d—each room having its own independent unit 102a-d. As described herein, each independent unit 102a-d may include at least one commander and at least one energy controller, which both comprise communication nodes of the load control system 100. The at least one energy controller may be operable to control at least one electrical load in response to a control signal received from the at least one commander. As shown in FIG. 2, the load control system 100 comprises wall-mounted dimmer switches 105, 106 and a motorized window treatment 107, which are examples of energy controllers. The dimmer switch 105 may control an overhead light 108 in the independent unit 102c. An occupancy sensor 109 is depicted as an example of a commander. Similarly, a light sensor (not shown) may be a commander that controls the dimmer 105 and a motorized window treatment 107—dimming the light and adjusting the shades based on how much daylight is present, for example.

The load control system 100 also includes a broadcast controller 180 (e.g., a broadcast transmitter) according to one or more embodiments described in greater detail herein. The broadcast controller 180 may perform the system-wide (or building-wide) control of one or more of the energy controllers (e.g., the dimmer switches 105, 106 and the motorized window treatment 107) regardless of the independent units with which the respective energy controllers may be associated, for functions such as, but not limited to, demand response and/or timeclock-based functions. For example, to act on a demand response condition, the broadcast controller 180 may override the commanders of one or more of the energy controllers (e.g., the dimmer switches 105, 106 and the motorized window treatment 107) and order those energy controllers to perform some load-shedding function (e.g., dimming or ambient light control). Thus, the broadcast controller 180 may operate to control energy controllers across the various independent units 102a-d (as well as across the various offices 104a-c and the conference room 104d).

Figure 3:
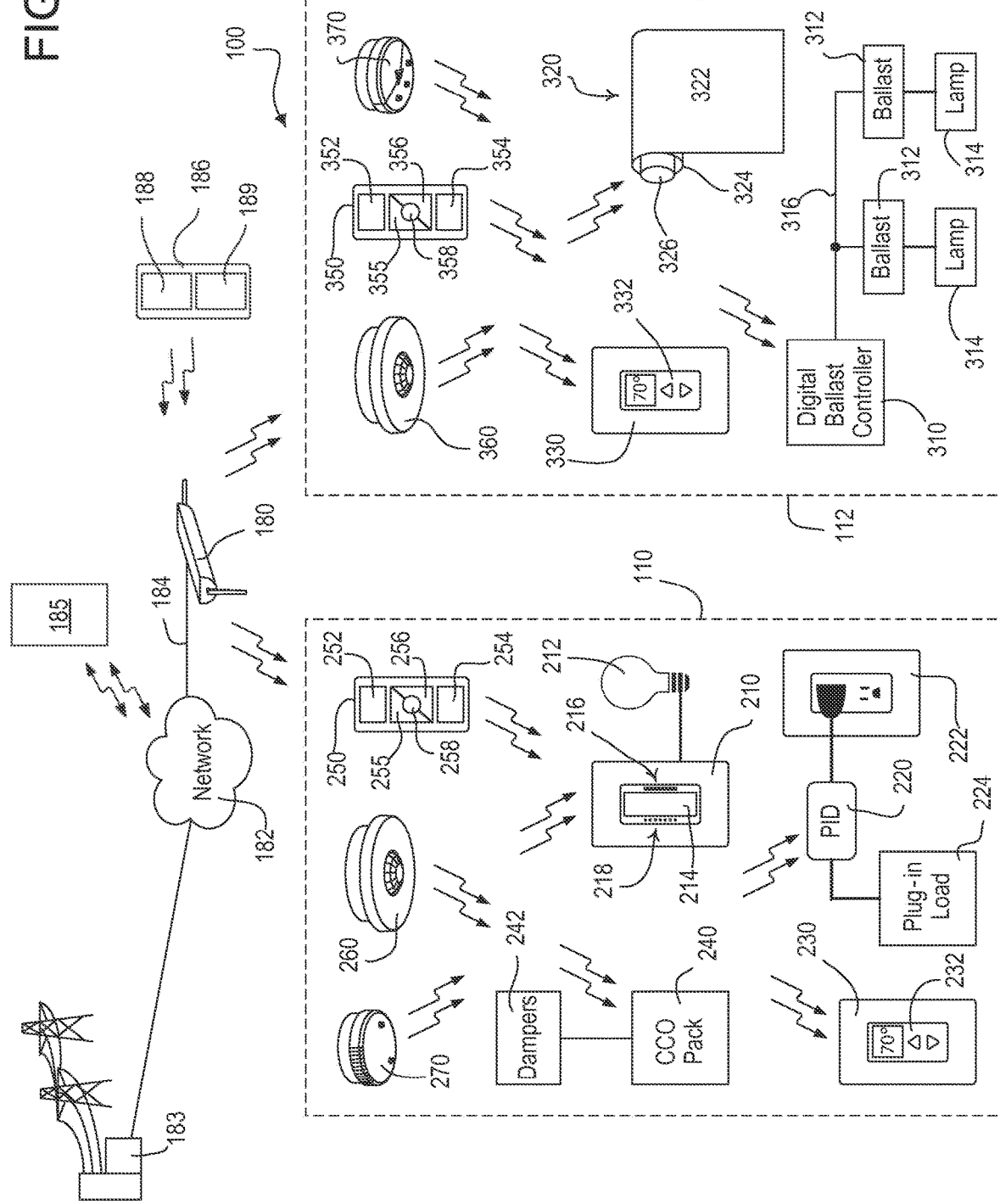
FIG. 3 is a simple diagram of a load control system comprising two independent units (e.g., sub-systems) and a broadcast controller according to a first embodiment of the present invention.

FIG. 3 illustrates the load control system 100 comprising two independent units 120, 122 (e.g., sub-systems) according to a first embodiment of the present invention. Each of the independent units 110, 112 comprise one or more commanders (e.g., wireless transmitters) that are operable to control one or more energy controllers (e.g., load control devices having wireless receivers or transceivers for controlling electrical loads in response to received wireless signals). The commanders may be operable to transmit, for example, radio-frequency (RF) signals to the energy controllers for controlling the respective loads. For example, the commanders may comprise one-way transmitters (i.e., transmit-only devices) that are only operable to transmit the RF signals, and energy controllers may comprise one-way receivers (i.e., receive-only devices) that are only operable to receive the RF signals. Alternatively, the commanders and the energy controllers may comprise two-way devices, each operable to both transmit and receive the RF signals. The load control system 100 may comprise a mixture of one-way and two-day commanders and energy controllers. As previously mentioned, the commanders and energy controllers serve as communication nodes of the load control system 100.

The independent units 110, 112 may be installed, for example, in separate and at least partially-enclosed rooms in a common building and may be adjacent to each other. The independent units 110, 112 are both located within an area which is within the RF transmission range (i.e., within the total transmission area) of the broadcast controller 180. The control devices of the independent units 110, 112 (i.e., the commanders and energy controllers) are configured (i.e., programmed) independent of each other, such that the energy controllers are operable to control the connected loads in response to only the commanders of that independent unit (i.e., the independent units operate independently of each other). However, the energy controllers of both of the first and second independent units 110, 112 are all responsive to RF signals transmitted by the broadcast controller 180 of the load control system 100 as will be described in greater detail below.

The commanders and the broadcast controller 180 may be operable to transmit digital messages to the load control devices via the RF signals (e.g., approximately 434 MHz) according to a predefined RF communication protocol, such as, for example, one of LUTRON CLEAR CONNECT, WI-FI, WI-MAX, BLUETOOTH, ZIGBEE, Z-WAVE, 6LoWPAN, KNX-RF, and ENOCEAN RADIO protocols. Alternatively, the commanders and the broadcast controller 180 could transmit the digital messages via a different wireless medium, such as, for example, infrared (IR) signals or sound (such as voice). Examples of RF lighting control systems are disclosed in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and U.S. Pat. No. 6,803,728, issued Oct. 12, 2004, entitled SYSTEM FOR CONTROL OF DEVICES, the entire disclosures of which are hereby incorporated by reference.

The broadcast controller 180 and the energy controllers are operable to communicate (i.e., transmit and receive digital messages via the RF signals) using a time division technique, i.e., the broadcast controller 180 and the energy controllers transmit digital messages during predetermined time slots. An example of an RF load control system using the time division technique is described in greater detail in commonly-assigned U.S. patent application Ser. No. 12/033, 223, filed Feb. 19, 2008, entitled COMMUNICATION PROTOCOL FOR A RADIO-FREQUENCY LOAD CONTROL SYSTEM, the entire disclosure of which is hereby incorporated by reference. When the commanders are one-way transmitters, the commanders are operable to repetitively transmit a single digital message in a number of RF signals (i.e., in a number of packets) to the energy controllers to reduce the likelihood of collisions of all of the transmitted RF signals with RF signals transmitted by another control device (i.e., to improve the chance that the transmitted RF signals will get to the intended recipient). An example of a load control system having both one-way and two-way communication devices is described in greater detail in commonly-assigned U.S. Patent Application Publication No. 2012/0056712, published Mar. 8, 2012, entitled METHOD OF CONFIGURING A TWO-WAY WIRELESS LOAD CONTROL SYSTEM HAVING ONE-WAY WIRELESS REMOTE CONTROL DEVICES, the entire disclosure of which is hereby incorporated by reference.

As shown in FIG. 3, the broadcast controller 180 is connected to a network 182 (e.g., a local area network or the Internet) via a network communication link 184. The network communication link 184 may comprise, for example, a digital communication link operating in accordance with a predefined communication protocol (such as, for example, one of Ethernet, IP, WiFi, QS, DMX, BACnet, Modbus, LonWorks, and KNX protocols). Alternatively, the network communication link 184 may comprise a serial digital communication link, an RS-485 communication link, an RS-232 communication link, a digital addressable lighting interface (DALI) communication link, or a LUTRON ECO-SYSTEM communication link. The load control system 100 may further comprise an Internet-Protocol-enabled computing device, for example, a tablet 185 (such as an iPad® tablet), a smart phone (such as an iPhone®, Android®, or Blackberry® smart phone), a personal computer (PC), or a laptop, for transmitting digital messages to the broadcast controller 180 via the network 182.

An electrical utility 183 may transmit demand response commands to the broadcast controller 180 via the network 182 and/or network communication link 184. In addition, the broadcast controller 180 may be responsive to a time-clock command, a load shed command, a peak demand command, or time-of-day pricing information received via the network 182 and/or network communication link 184. For example, the broadcast controller 180 may be operable to reduce the energy consumption of the energy controllers in response to the time-of-day pricing information to during times when the cost of electricity is expensive. Further, the broadcast controller 180 may be responsive to XML data received from a WebServices interface via the network 182 and/or network communication link 184. The load control system 100 may comprise additional broadcast controllers 180 for transmitting digital messages to additional independent units. The broadcast controllers 180 may be operable to communicate with each other via the network 182 or via the RF signals.

As shown in FIG. 3, the energy controllers (i.e., load control devices) of the first independent unit 110 may comprise, for example, a dimmer switch 210, a plug-in load control device (PID) 220, a temperature control device 230, and a contact-closure output (CCO) pack 240. The commanders of the first independent unit 110 may comprise a remote controller 250, an occupancy sensor 260, and a temperature sensor 270. The energy controllers of the second independent unit 112 may comprise a digital ballast controller 310, a motorized window treatment 320, and a temperature control device 330. The commanders (i.e., wireless transmitters) of the second independent unit 112 may comprise a battery-powered remote control 350, an occupancy sensor 360, and a daylight sensor 370. The occupancy sensors 260, 360, the daylight sensor 370, and the temperature sensor 270 provide for automatic control of the various loads of the first and second independent units 110, 112, while the remote controls 250, 350 allow for manual override of the automatic control of the loads. The first and second independent units 110, 112 may comprise additional energy controllers and commanders. In addition, the load control system 100 may comprise additional independent units.

The dimmer switch 210 of the first independent unit 110 is adapted to be coupled in series electrical connection between an alternating-current (AC) power source (not shown) and a lighting load 212 for controlling the amount of power delivered to the lighting load. The dimmer switch 210 may be adapted to be wall-mounted in a standard electrical wallbox, or may alternatively be implemented as a table-top load control device. The dimmer switch 210 comprises a toggle actuator 214 and an intensity adjustment actuator 216. Actuations of the toggle actuator 214 toggle, i.e., turn off and on, the lighting load 212, while actuations of upper and lower portions of the intensity adjustment actuator 216 respectively increase or decrease a present lighting intensity $L_{PRES}$ of the lighting load between a minimum intensity $L_{MIN}$ (e.g., approximately 1%) to a maximum intensity $L_{MAX}$ (e.g., approximately 100%). The dimmer switch 210 is also operable to control the lighting load in response to the RF signals received from the remote control 250 and occupancy sensor 260. The dimmer switch 210 is operable to fade the present lighting intensity $L_{PRES}$ from a first intensity to a second intensity over a fade time, such that the lighting intensity may be adjusted slowly and the intensity adjustment may not be noticed by a user of the space. The dimmer switch 210 also comprises a plurality of visual indicators 218, e.g., light-emitting diodes (LEDs), which are arranged in a linear array on the dimmer switch and are illuminated to provide feedback of the intensity of the lighting load. An example of a dimmer switch is described in greater detail in U.S. Pat. No. 5,248,919, issued Sep. 29, 1993, entitled LIGHTING CONTROL DEVICE, the entire disclosure of which is hereby incorporated by reference. Alternatively, the load control system 100 could comprise an electronic switch (not shown) that is operable to simply turn a lighting load or other electrical load on and off in response to actuations of a toggle actuator or receiving the RF signals.

The minimum intensity $L_{MIN}$ and the maximum intensity $L_{MAX}$ of the dimmer switch 210 may be adjusted using a tuning procedure. For example, a user may press and hold the toggle actuator 214 and the upper portion of the intensity adjustment actuator 216 for a predetermined amount of time to enter a maximum intensity tuning mode. In one or more embodiments, the user may substantially simultaneously (e.g. at the same time, at the same instant, concurrent, and/or coincident) actuate the toggle actuator 214 and the upper portion of the intensity adjustment actuator 216 for a predetermined amount of time to enter the maximum intensity tuning mode. In the maximum intensity tuning mode, the dimmer switch 210 blinks one of the visual indicators 218 that is representative of the value of the maximum intensity $L_{MAX}$. The user may actuate the upper and lower portions of the intensity adjustment actuator 216 to respectively raise and lower the value of the maximum intensity $L_{MAX}$. The dimmer switch 210 may adjust the one of the visual indicators that is blinking and/or the intensity of the lighting load 212 in response to actuations of the intensity adjustment actuator 216 in the maximum intensity tuning mode. After the appropriate value of the maximum intensity $L_{MAX}$ is selected, the user may actuate the toggle actuator 214 to exit the maximum intensity tuning mode. Similarly, the user may press and hold the toggle actuator 214 and the lower portion of the intensity adjustment actuator 216 for the predetermined amount of time to enter a minimum intensity tuning mode to adjust the value of the minimum intensity $L_{MIN}$.

Figure 4:
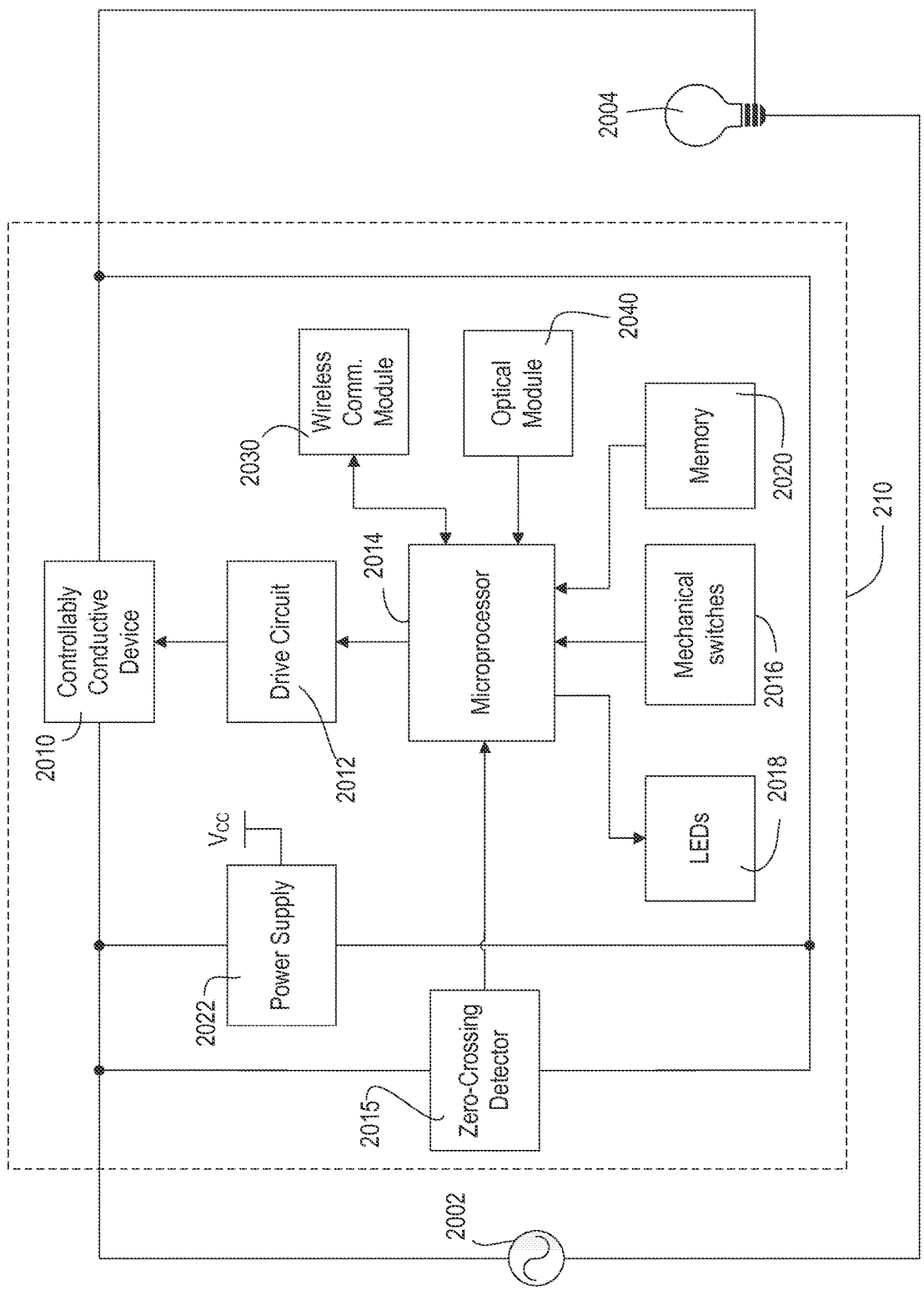
FIG. 4 is an exemplary diagram of a dimmer switch energy controller consistent with embodiments.

FIG. 4 illustrates an exemplary simplified block diagram of the dimmer switch 210. The dimmer switch 210 comprises a controllably conductive device 2010 coupled in series electrical connection between the AC power source 1002 and the lighting load 1004 for control of the power delivered to the lighting load. The controllably conductive device 2010 may comprise a relay or other switching device, or any suitable type of bidirectional semiconductor switch, such as, for example, a triac, a field-effect transistor (FET) in a rectifier bridge, or two FETs in anti-series connection. The controllably conductive device 2010 includes a control input coupled to a drive circuit 2012.

The dimmer switch 210 further comprises a microprocessor 2014 coupled to the drive circuit 2012 for rendering the controllably conductive device 2010 conductive or non-conductive to thus control the power delivered to the lighting load 2004. The microprocessor 2014 may alternatively comprise a microcontroller, a programmable logic device (PLD), an application specific integrated circuit (ASIC), a field-programmable gate array (FPGA), or any suitable processing device or control circuit. A zero-crossing detector 2015 determines the zero-crossings of the input AC waveform from the AC power supply 2002. A zero-crossing may be the time at which the AC supply voltage transitions from positive to negative polarity, or from negative to positive polarity, at the beginning of each half-cycle. The microprocessor 2014 receives the zero-crossing information from the zero-crossing detector 2015 and provides the control inputs to the drive circuit 4012 to render the controllably conductive device 2010 conductive and non-conductive at predetermined times relative to the zero-crossing points of the AC waveform. The dimmer switch 210 may further comprise an audible sound generator (not shown) for generating an audible sound.

The microprocessor 2014 receives inputs from mechanical switches 2016 that are mounted on a printed circuit board (not shown) of the dimmer switch 210, and are arranged to be actuated by the toggle actuator (not shown) and an intensity adjustment actuator (not shown). The microprocessor 2014 also controls light emitting diodes 2018, which are also mounted on the printed circuit board. The light-emitting diodes 2018 may be arranged to illuminate one or more status indicators (not shown) on the front surface of the dimmer switch 210, for example, through a light pipe structure (not shown). The microprocessor 2014 is also coupled to a memory 2020 for storage of one or more unique identifiers (e.g., addresses) of the dimmer switch 210, instructions for controlling the lighting load 2004, programming instructions for communicating via a wireless communication link, or the like. The memory 2020 may be implemented as an external integrated circuit (IC) or as an internal circuit of the microprocessor 2014. A power supply 2022 generates a direct-current (DC) voltage $V_{CC}$ for powering the microprocessor 2014, the memory 2020, and other low voltage circuitry of the dimmer switch 210.

The dimmer switch 210 further includes a wireless communication module 2030 for transmitting and/or receiving the RF signals to and from its respective commanders and/or the broadcast controller 180. The wireless communication module 2030 may comprise an RF transceiver and an antenna. Examples of antennas for wall-mounted dimmer switches are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The dimmer switch 210 further comprises an optical module 2040, such as an optical signal receiving circuit for example. The optical module 2040 may be optically coupled to an optical receiver (not shown). The optical module 2040 may be coupled to the optical receiver on the front surface of the dimmer switch 210, for example, through a light pipe (not shown), such that the optical module 2040 may receive optical signals from one or more commanders (e.g., the tablet 185 or the smart phone) and/or the broadcast controller 180 via the light pipe. For example, the optical module 2040 may comprise a photodiode (not shown) that is responsive to the optical signals transmitted by the commanders and/or the broadcast controller 180. In addition, the photodiode of the optical module 2040 may be controlled by the microprocessor 2014, so as to transmit optical signals to the one or more commanders and/or the broadcast controller 180, for example. An example of a method of optically transmitting digital information to a load control device is described in greater detail in commonly-assigned U.S. patent application Ser. No. 13/538,665, filed Jun. 29, 2012, entitled METHOD OF OPTICALLY TRANSMITTING DIGITAL INFORMATION FROM A SMART PHONE TO A CONTROL DEVICE, the entire disclosure of which is hereby incorporated by reference.

The microprocessor 2014 may determine the module from which the signals are received, e.g., from the wireless communication module 2030 or the optical module 2040, and the controllably conductive device 2010 may be controlled based on those signals. The microprocessor 2014 may also transmit messages to the one or more commanders and/or the broadcast controller 180 via optical signals or digital messages transmitted via the RF signals. For example, the microprocessor 2014 of the dimmer switch 210 may be used to transmit digital messages to the one or more commanders and/or the broadcast controller 180 via wireless communication. The digital messages may include alerts and/or feedback and status information regarding the lighting load 2004. The digital messages may also include error messages or indications as to whether the dimmer switch 210 is able to communicate via a wireless communication link or RF signal, for example.

Referring to FIG. 3 again, the plug-in load control device 220 of the first independent unit 110 is adapted to be plugged into a standard electrical receptacle 222 for receiving power from the AC power source. The plug-in load control device 220 controls the power delivered to a plug-in electrical load 224 (such as, for example, a table lamp or other lighting load, or a television or other appliance), which is plugged into the plug-in load control device. For example, the plug-in load control device 220 may be operable to switch the plug-in load 224 on and off in response to the RF signals received from the remote control 250 and occupancy sensor 260. Alternatively, the plug-in load control device 220 may be operable to control the amount of powered delivered to the plug-in electrical load 224, for example, to adjust the lighting intensity of a table lamp plugged into the plug-in load control device). In addition, the load control system 100 could alternatively comprise a controllable electrical receptacle (not shown) having an integrated load control circuit for controlling plug-in loads, or a controllable circuit breaker (not shown) for control of electrical loads that are not plugged into electrical receptacles, such as a water heater.

The digital ballast controller 310 of the second independent unit 112 is adapted to be coupled to one or more ballasts 312 for controlling the intensities of respective gas discharge lamps 314 (e.g., fluorescent lamps). The ballasts 312 may receive power from the AC power source and may be coupled to the digital ballast controller 310 via a dedicated wired digital communication link 316, such as a digital addressable lighting interface (DALI) communication link. The digital ballast controller 310 is operable to transmit digital messages to the ballasts 312 for controlling the gas discharge lamps 314 in response to the RF signals received from the remote control 350, the occupancy sensor 360, and the daylight sensor 370. Examples of digital electronic dimming ballasts are described in greater detail in commonly-assigned U.S. Pat. No. 7,619,539, issued Nov. 17, 2009, entitled MULTIPLE-INPUT ELECTRONIC DIMMING BALLAST WITH PROCESSOR, and U.S. Pat. No. 8,035,529, issued Oct. 11, 2011, entitled DISTRIBUTED INTELLIGENCE BALLAST SYSTEM, the entire disclosure of which are hereby incorporated by reference. Alternatively, the ballasts 312 may be two-wire ballasts operable to receive both power and communication (i.e., digital messages) via two power lines from the digital ballast controller 310 as described in greater detail in U.S. patent application Ser. No. 13/359,722, filed Jan. 27, 2012, entitled DIGITAL LOAD CONTROL SYSTEM PROVIDING POWER AND COMMUNICATION VIA EXISTING POWER WIRING, the entire disclosure of which is hereby incorporated by reference.

In addition, the ballasts 312 could be replaced by other types of energy controllers (i.e., load control devices), such as, for example, light-emitting diode (LED) drivers for controlling the intensities of LED light sources (i.e., LED light engines). Examples of LED drivers are described in greater detail in co-pending, commonly-assigned U.S. patent application Ser. No. 12/813,908, filed Jun. 11, 2009, and U.S. patent application Ser. No. 13/416,741, filed Mar. 9, 2012, both entitled LOAD CONTROL DEVICE FOR A LIGHT-EMITTING DIODE LIGHT SOURCE, the entire disclosures of which are hereby incorporated by reference.

The motorized window treatment 320 of the second independent unit 112 (e.g., a roller shade) may be positioned in front of one or a window for controlling the amount of daylight entering the building. The motorized window treatment 320 each comprise a flexible shade fabric 322 rotatably supported by a roller tube 324. Each motorized window treatment 320 is controlled by an electronic drive unit (EDU) 326, which may be located inside the roller tube 324. The electronic drive unit 326 is operable to rotate the respective roller tube 324 to move the bottom edge of the shade fabric 322 to a fully-open position and a fully-closed position, and to any position between the fully-open position and the fully-closed position (e.g., a preset position). Specifically, the motorized window treatment 320 may be opened to allow more daylight to enter the building and may be closed to allow less daylight to enter the building. In addition, the motorized window treatment 320 may be controlled to provide additional insulation for the building, e.g., by moving to the fully-closed position to keep the building cool in the summer and warm in the winter. Alternatively, the motorized window treatments 320 could comprise other types of daylight control devices, such as, for example, motorized draperies, roman shades, pleated shades, or blinds, tensioned roller shade systems for non-vertical windows (i.e., skylights), controllable window glazings (e.g., electrochromic windows), controllable exterior shades, or controllable shutters or louvers. Examples of motorized window treatments are described in commonly-assigned U.S. Pat. No. 6,983,783, issued Jan. 10, 2006, entitled MOTORIZED SHADE CONTROL SYSTEM, and U.S. Patent Application Publication No. 2012/0261078, published Oct. 18, 2012, entitled MOTORIZED WINDOW TREATMENT, the entire disclosures of which are hereby incorporated by reference.

The temperature control devices 230, 330 of the first and second independent units 110, 112 are operable to control a heating, ventilation, and air-conditioning (HVAC) control system (not shown) for adjusting a present temperature $T_{PRES}$ of the building in which the load control system 100 is installed. The temperature control devices 230 are each operable to determine the present temperature $T_{PRES}$ in the building and to control the HVAC system to thus adjust the present temperature in the building towards a setpoint temperature $T_{SET}$. For example, the temperature sensor 270 may be operable to measure the present temperature $T_{PRES}$ in the building and transmit the present temperature to the temperature control device 230 of the first independent unit 110 via the RF signals. In addition, the temperature control device 330 of the second independent unit 112 may comprise an internal temperature sensor for measuring the present temperature $T_{PRES}$ in the building. Each temperature control device 230, 330 may comprise a respective user interface 232, 332 having a temperature adjustment actuator for adjusting the setpoint temperature $T_{SET}$ and a visual display for displaying the present temperature $T_{PRES}$ in the building or the setpoint temperature $T_{SET}$.

The contact-closure output pack 240 of the first independent unit 110 is operable to control a damper 242 of the HVAC system for adjusting the amount of air flowing through the damper and thus the present temperature $T_{PRES}$ in the room in which the damper is installed. Specifically, the contact-closure output pack 240 may be coupled to a controller (e.g., a variable air volume controller) for a controllable motor rotating the damper 242 between an open position and a closed position to thus the airflow into the room. The contact-closure output pack 240 is operable to determine the present temperature $T_{PRES}$ in the building in response to receiving the RF signals from the temperature sensor 270 and to adjust the rotational position of the damper 242 in the room to control the amount of air flowing into the room through the damper and thus control the present temperature $T_{PRES}$. Alternatively, the contact-closure output pack 240 could be coupled to other types of electrical loads for turning the electrical loads on and off or changing the state of the load.

The battery-powered remote controls 250, 350 are operable to transmit RF signals to the energy controllers of the first and second independent units 110, 112, respectively, for controlling the various electrical loads in response to user actuations of a plurality of buttons of the remote controls (i.e., to provide manual override). The remote controls 250, 350 each comprise an on button 252, 352, an off button 254, 354, a raise button 255, 355, a lower button 256, 356, and a preset button 258, 358. The remote controls 250, 350 may simply transmit digital messages including a serial number of the remote control (i.e., a unique identifier) as well as information regarding which of the buttons was actuated to the various load control devices via the RF signals. For example, the dimmer switch 210 may turn the lighting load 212 on and off in response to actuations of the on button 252 and the off button 254 of the remote control 250, respectively. The dimmer switch 210 may raise and lower the intensity of the lighting load 212 in response to actuations of the raise button 255 and the lower button 256, respectively. The dimmer switch 210 may control the intensity of the lighting load 212 to a preset intensity in response to actuations of the preset button 258. Examples of battery-powered remote controls are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 7,573,208, issued Aug. 22, 1009, entitled METHOD OF PROGRAMMING A LIGHTING PRESET FROM A RADIO-FREQUENCY REMOTE CONTROL, the entire disclosures of which are hereby incorporated by reference.

The occupancy sensors 260, 360 are operable to transmit RF signals to the energy controllers of the first and second independent units 110, 112, respectively, for controlling the various electrical loads in response to detecting the presence or absence of an occupant in the rooms in which the occupancy sensors are located. The occupancy sensors 260, 360 each include an internal detector, e.g., a pyroelectric infrared (PIR) detector, which is operable to receive infrared energy from an occupant in the space to thus sense the occupancy condition in the space. Each occupancy sensor 260, 360 is operable to process the output of the PIR detector to determine whether an occupancy condition (i.e., the presence of the occupant) or a vacancy condition (i.e., the absence of the occupant) is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors.

The occupancy sensors 260, 360 each operate in an "occupied" state or a "vacant" state in response to the detections of occupancy or vacancy conditions, respectively, in the space. If the occupancy sensor 260, 360 is in the vacant state and the occupancy sensor determines that the space is occupied in response to the PIR detector, the occupancy sensor changes to the occupied state. The dimmer switch 210, the plug-in load control device 220, the temperature control device 230, and the contact-closure output (CCO) pack 240 are responsive to the RF signals transmitted by the occupancy sensor 260 of the first independent unit 110, while the digital ballast controller 310, the motorized window treatment 320, and the temperature control device 330 are responsive to the RF signals transmitted by the occupancy sensor 360 of the second independent unit 112.

The commands included in the digital messages transmitted by the occupancy sensors 260, 360 may comprise an occupied command or a vacant command. For example, in response to receiving an occupied command from the occupancy sensor 260, the dimmer switch 210 may control the intensity of the lighting load 212 to an occupied intensity (e.g., approximately 100%). In response to receiving a vacant command, the dimmer switch 210 may control the intensity of the lighting load 212 to a vacant intensity, which may be less than the occupied intensity (e.g., approximately 0%, i.e., off). If there were more than one occupancy sensor 260 in the first independent unit 110, the dimmer switch 210 would control the intensity of the lighting load 212 to the occupied intensity in response to receiving a first occupied command from any one of the occupancy sensors, and to the vacant intensity in response to the last vacant command received from those occupancy sensors from which the occupancy sensor received occupied commands. The occupied intensity and the vacant intensity may be adjusted using a tuning procedure similar to the tuning procedure for the minimum intensity $L_{MIN}$ and the maximum intensity $L_{MAX}$ of the dimmer switch 210 described above.

Alternatively, the occupancy sensors 260, 360 each could be implemented as a vacancy sensor. The energy controllers that are responsive to vacancy sensors only operate to disconnect power from the controlled electrical loads in response to the vacancy sensors. For example, the dimmer switch 210 would only operate to turn off the lighting load 212 in response to receiving the vacant commands from the vacancy sensor. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,228,184, issued Jul. 24, 2012, entitled BATTERY-POWERED OCCUPANCY SENSOR; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The daylight sensor 370 of the second independent unit 112 is mounted so as to measure a total light intensity in the space around the daylight sensor. The daylight sensor 370 is responsive to a total light intensity $L_{TOT}$ measured by an internal photosensitive circuit, e.g., a photosensitive diode. Specifically, the daylight sensor 370 is operable to wirelessly transmit digital messages including a value representative of the total lighting intensity to the energy controllers of the second independent unit 112 via the RF signals. For example, the digital ballast controller 310 may control the ballasts 312 to decrease the lighting intensities of the gas discharge lamps 314 in response to increases in the total lighting intensity $L_{TOT}$ measured by the daylight sensor 370. Examples of load control systems having daylight sensors are described in greater detail in commonly-assigned U.S. Patent Application Publication No. 2010/0244709, published Sep. 30, 2010, entitled WIRELESS BATTERY-POWERED DAYLIGHT SENSOR, and U.S. Patent Application Publication No. 2010/0244706, published Sep. 30, 2010, entitled METHOD OF CALIBRATING A DAYLIGHT SENSOR, the entire disclosures of which are hereby incorporated by reference.

The energy controllers (i.e., load control devices) of the load control system 100 may further comprise, for example, one or more of a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a controllable electrical receptacle or a controllable power strip for controlling one or more plug-in electrical loads (such as coffee pots and space heaters); a screw-in luminaire including a dimmer circuit and an incandescent or halogen lamp; a screw-in luminaire including a ballast and a compact fluorescent lamp; a screw-in luminaire including an LED driver and an LED light source; a motor control unit for controlling a motor load, such as a ceiling fan or an exhaust fan; a drive unit for controlling a motorized projection screen; motorized interior or exterior shutters; a thermostat for a heating and/or cooling system; an air conditioner; a compressor; an electric baseboard heater controller; a controllable damper; a variable air volume controller; a fresh air intake controller; a ventilation controller; a hydraulic valve for a radiator or radiant heating system; a humidity control unit; a humidifier; a dehumidifier; a water heater; a boiler controller; a pool pump; a refrigerator; a freezer; a TV or computer monitor; a video camera; an audio system or amplifier; an elevator; a power supply; a generator; an electric charger, such as an electric vehicle charger; an energy storage system (e.g., a battery, solar, or thermal energy storage system), and an alternative energy controller (e.g., a solar, wind, or thermal energy controller).

The commanders (i.e., wireless transmitters) of the load control system 100 may further comprise, for example, a wall-mounted occupancy sensor, a radiometer, a cloudy-day or shadow sensor, a humidity sensor, a pressure sensor, a smoke detector, a carbon monoxide detector, an air-quality sensor, a security sensor, a proximity sensor, a fixture sensor, a wall-mounted keypad, a remote control keypad, a kinetic or solar-powered remote control, a key fob, a cell phone, a smart phone, a tablet, a personal digital assistant (PDA), a personal computer, a laptop, a timeclock, an audio-visual control, a keycard switch, a safety device (such as, a fire protection, water protection, and medical emergency device), a power monitoring device (such as a power meter, an energy meter, a utility submeter, and a utility rate meter), a timeclock, a central controller, or any residential, commercial, or industrial controller. In addition, the input devices may comprise one or more partition sensors that transmit RF signals in dependence upon whether a partition is opened or closed. Further, the input devices may comprise a fixture sensor (e.g., a photosensor) that is located inside a lighting fixture in order to determine the state of the light source of the lighting fixture (e.g., one or off) for data logging. Examples of additional energy controllers and commanders are described in greater detail in commonly-assigned U.S. Patent Application Publication No. 2012/0091804, published Apr. 19, 2012, entitled LOAD CONTROL SYSTEM HAVING AN ENERGY SAVINGS MODE, the entire disclosure of which is hereby incorporated by reference. Further, the independent units 110, 112 could each just comprise energy controllers that are just responsive to the broadcast controller 180 and are not responsive to any commanders.

According to the first embodiment of the present invention, the broadcast controller 180 primarily transmits digital messages to the energy controllers of the independent units 110, 112. However the broadcast controller 180 is also operable to receive digital messages from the commanders and energy controllers of the independent units 110, 112. Accordingly, the broadcast controller 180 may be operable to collect data from the commanders and energy controllers of the independent units 110, 112 of the load control system 100. The broadcast controller 180 may be operable to transmit a query message to the energy controllers, in response to which the energy controllers transmit the appropriate data back to the broadcast controller.

The broadcast controller 180 may additionally be operable to log data from one or more commanders. The broadcast controller 180 may be operable to log occupancy patterns, natural light patterns, glare and shadow patterns, and temperature patterns. The logged data may be used to predict energy savings of the load control system 100 before energy controllers are installed. For example, prior to the installation of the ballasts 312 (i.e., when non-controllable and/or non-dim ballasts are controlling the lamps 314), the broadcast controller 180 may log data from the occupancy sensor 360, the daylight sensor 370, and fixture sensors located in the lighting fixtures in which the lamps 314 are located to determine if the energy savings could be provided if the controllable ballasts 312 are installed (e.g., due to turning the lights off when the space is unoccupied and/or due to dimming the lights when there is natural light shining into the space). The broadcast controller 180 may also be operable to log data from the commanders and energy controllers after the energy controllers are installed.

For example, the data collected by the broadcast controller 180 may comprise operational characteristics and settings of the energy controllers of the independent units 110, 112, number and type of commanders, present modes of operation, energy usage information, light intensities of lighting loads, load failures, occupancy status of spaces, ambient light levels measured by daylight sensors, present capacity of energy storage systems, and status of plug-in electrical loads (i.e., whether plug-in loads are plugged in or not). In addition, the broadcast controller 980 may be operable to determine additional data from the occupancy status information received from the occupancy sensors 260, 360, for example, number of occupants, direction of movement of occupants, security information (such as rooms occupied by unauthorized individuals, energy saving due to reduced usage of electrical lights and heating and cooling in unoccupied rooms, room utilization information (such as conference rooms that are not occupied indicating that the conference rooms are presently available for use), building utilization information (such as information indicating that the building may be operated with more efficiency by consolidating workers), and employee status information (such as information indicating that employees may be working all day or leaving early).

During separate setup procedures of each of the first and second independent units 110, 112 of the load control system 100, the energy controllers of each independent unit may be associated with (i.e., assigned to) one or more of the commanders of that specific independent unit. For example, the dimmer switch 210 may be assigned to the occupancy sensor 260 by actuating buttons on both the dimmer switch and the occupancy sensor. An example of an assignment procedure for RF control devices is described in greater detail in commonly-assigned U.S. Patent Application Publication No. 2008/0111491, published May 15, 2008, entitled RADIO-FREQUENCY LIGHTING CONTROL SYSTEM, the entire disclosure of which is hereby incorporated by reference. Each energy controller may be associated with a plurality of commanders, and each commander may be associated with a plurality of energy controllers.

In addition, the operating characteristics and functionality of the load control system 100 may be programmed during the individual setup procedures of the first and second independent units 120. For example, the energy controllers are associated with and programmed to be responsive to the commanders. In addition, the preset intensity of the dimmer switch 210 may be programmed using the toggle actuator 214 and the intensity adjustment actuator 216 of the dimmer switch or the buttons 252-258 of the remote control 250. The first and second independent units 110, 112 may be configured using a walk-around programming procedure, for example, as described in greater detail in previously-referenced U.S. Pat. No. 5,905,442. Alternatively, the first and second independent units 110, 112 could be configured using a computer-aided programming procedure via a graphical user interface (GUI) software running on a computing device coupled to the network 182 (e.g., the tablet 185, a smart phone, a personal computer, or a laptop) to create a database that defines the operation of the respective independent unit. At least a portion of the database could be uploaded to the energy controllers of the respective independent unit 110, 112, such that the energy controllers know how to respond to the commanders during normal operation.

As previously described, the energy controllers of the first and second independent units 110, 112 operate independent of each other, but are all responsive to digital messages transmitted by the broadcast controller 180. The broadcast controller 180 may be installed in the load control system 100 and assigned to the energy controllers of the independent units 110, 112 after the independent units are configured and operational without requiring the energy controllers and commanders of the independent units 110, 112 to be reprogrammed. Accordingly, with only a short additional commissioning time, the broadcast controller 180 may be added to the load control system 100 after the independent units 110, 112 are initially commissioned to add the global and central control of the independently units.

The broadcast controller 180 is operable to determine the digital messages to be transmitted to the energy controllers of the first and second independent units 110, 112 in response to digital messages received from the network 182 via the network communication link 184. The broadcast controller 180 may also be responsive to digital messages received directly from a demand response remote control 186 via the RF signals or a contact closure signal received from an external device. In addition, the broadcast controller 180 may be operable to transmit and receive digital messages via two power lines connected to the broadcast controllers, i.e., via powerline communication (PLC) signals, for example, as described in previously-referenced U.S. patent application Ser. No. 13/359,722. Further, the broadcast controller 180 may also be operable to calculate the present position of the sun and, for example, to control the motorized window treatments 320 to prevent sun glare as described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

Figure 5:
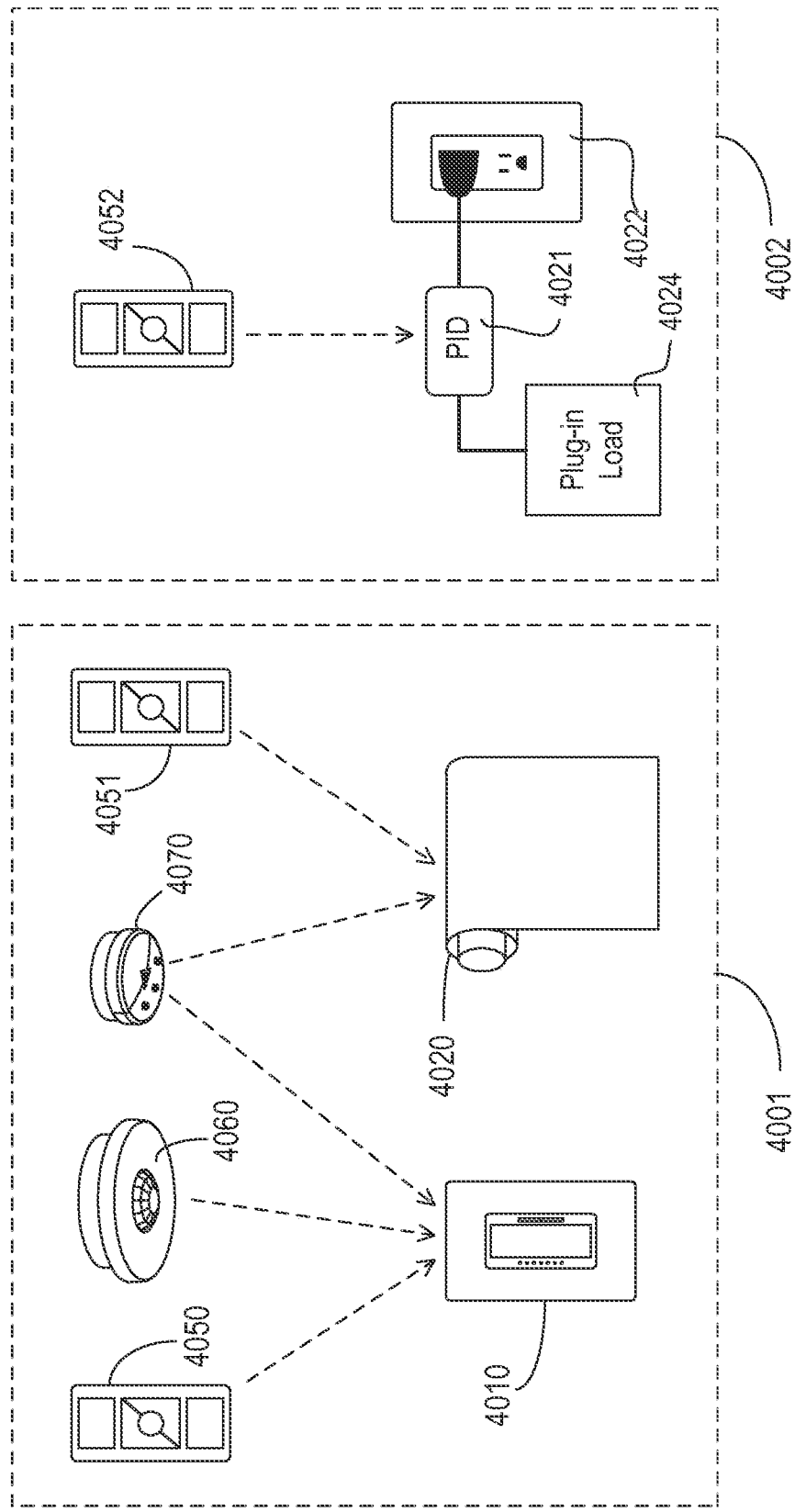
FIG. 5 is a diagram of two exemplary independent units consistent with embodiments.

FIG. 5 illustrates diagrams of further exemplary independent units 4001, 4002. The independent unit 4001 includes a first and second battery powered remote controls 4050, 4051, and occupancy sensor 4060, and a daylight sensor 4070, which function as commanders. The independent unit 4001 also includes a dimmer switch 4010 and a motorized window treatment 4020, which function as energy controllers. In the independent unit 4001, the dimmer switch 4010 and the motorized window treatment 4020 may respond to signals from one or more commanders. For example, the dimmer switch 4010 may respond to the signals transmitted by the first remote control 4050, the occupancy sensor 4060, and the daylight sensor 4070. Also by way of example, the motorized window treatment 320 may respond to the signals transmitted by the daylight sensor 4070 and the remote control 4051. The independent unit 4002 may include a third remote control 4052 and a plug-in load control device (PID) 4021. For example, the PID 4021 may respond to the signal of the third remote control 4052.

Figure 6A:
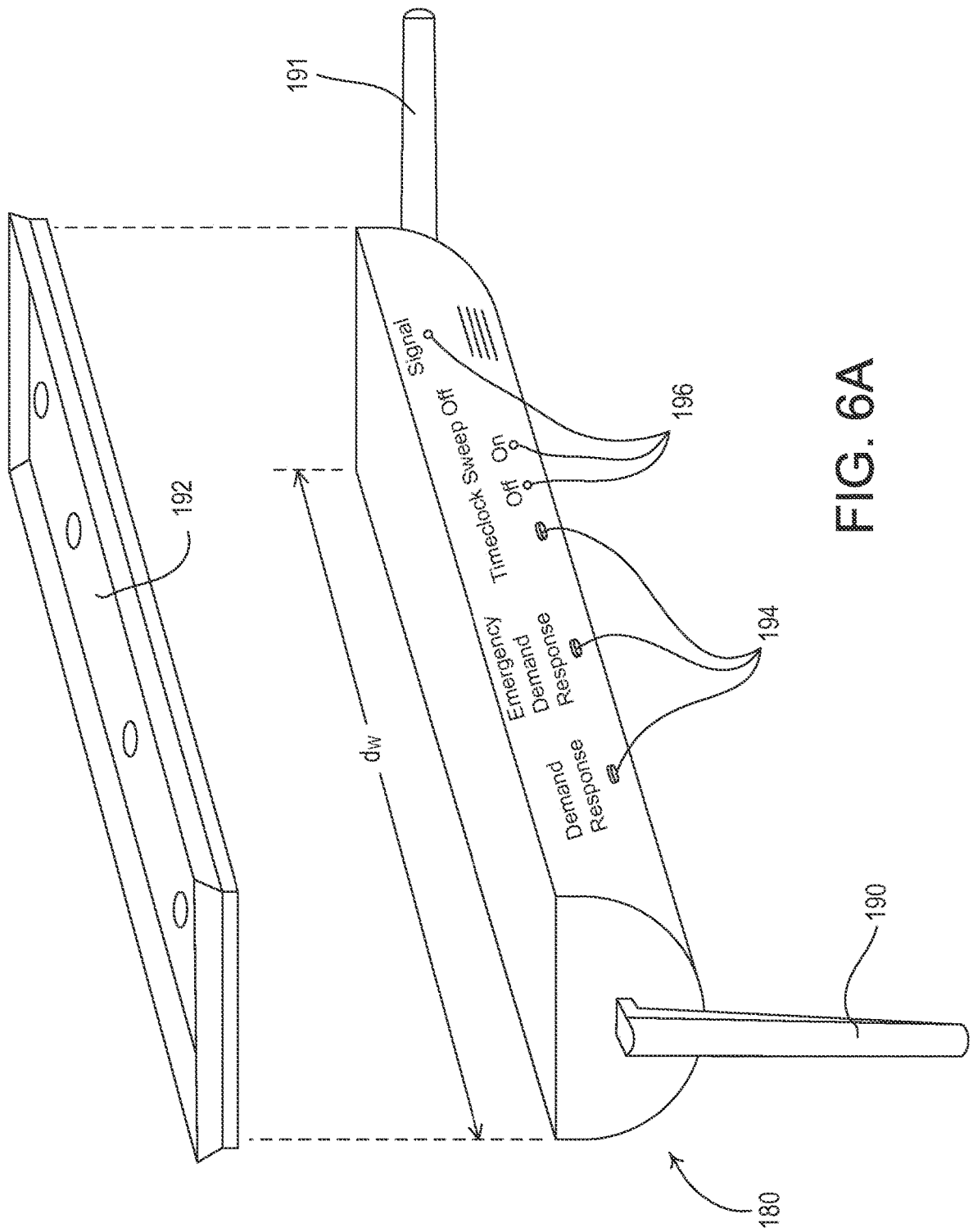
FIG. 6A is a simplified perspective view of the broadcast controller of the load control system of FIG. 3.

FIG. 6A is a simplified perspective view of the broadcast controller 180. The broadcast controller 180 comprises a diverse antenna system having two antennas 190, 191 with different orientations (e.g., oriented orthogonally to each other) for polar diversity. In addition, the antennas 190, 191 are spaced apart from each other across a width $d_W$ of the broadcast controller 180 for spatial diversity. For example, the width $d_W$ of the broadcast controller 180 (i.e., the distance at which the antennas 190, 191 are spaced apart) may be equal to or greater than approximately one-quarter wavelength (e.g., approximately 6.8 inches with a transmission frequency of approximately 434 MHz). The polar and spatial diversity of the antennas 190, 191 may lower interference between transmitted RF signals (i.e., collisions) and reduce the amount of retransmissions that may be required from the broadcast controller 180 to the energy controllers.

Accordingly, because of the polar and spatial diversity of the antennas 190, 191, the broadcast controller 180 may be able to transmit the RF signals over a greater transmission range (e.g., up to approximately 70 feet) than the commanders of the first and second independent units 110, 112 are able to transmit. This results in a total transmission area of approximately 15,000 square feet, which could alternatively range from, for example, approximately 5,000 to 15,000 square feet. In contrast, the transmission range of the broadcast controller 180 would only be approximately 30 feet if the broadcast controller only had one of the antennas 190, 191, resulting in a total transmission area of approximately 3,000 square feet. Accordingly, the use of two antennas 190, 191 on the broadcast controller 180 results in an improvement in the total transmission area that is greater than twice the transmission area with only one antenna. The polar and spatial diversity of the antennas 190, 191 also allows for an equivalent increase in the reception range and the total reception area of the broadcast controller 180.

The broadcast controller 180 is adapted to be removably coupled to a base 192 that allows for electrical connection to the network communication link 184 and to a power supply (not shown) for the broadcast controller. The broadcast controller 180 comprises buttons 194 for configuring and controlling the operation of the broadcast controller and the independent units 110, 112, and visual indicators 196 (e.g., light-emitting diodes) for providing feedback to a user. For example, the broadcast controller 180 may be removed from the base 192 and moved through a location, perhaps for the purpose of detecting and/or registering one more other nodes, such as, but not limited to, commander device (or nodes), energy controller device (or nodes), and/or other nodes that may be included in the independent units 120 and/or 122 described in further detail herein. In addition, the broadcast controller 180 may be detachably installed above a ceiling (e.g., to a junction box) or below a ceiling (e.g., flush mount to the surface of the ceiling) such that it can communicate directly and/or indirectly with the one or more nodes registered with the broadcast controller 180. The broadcast controller 180 could alternatively be mounted to a wall or in an electrical closet.

FIG. 6B illustrates a simplified diagram of a broadcast controller 180' according to an alternate embodiment of the present invention. Broadcast controller 180' may perform the same or similar functions as those described for the broadcast controller 180 as shown in FIG. 6A. The broadcast controller 180 comprises two orthogonally-oriented antennas 190', 191'. The first antenna 190' comprises an electrically-conductive material (i.e., a trace) displaced on a printed circuit board 192' inside the broadcast controller 180' and is fixed in position. The second antenna 191' extends from the broadcast controller 180' and is able to rotate 360°. However, the second antenna 191' is always oriented 90° from the first antenna 190' to allow for polar diversity. The rotation of the second antenna 191' simplifies the installation of the broadcast controller 180' since the broadcast controller may be mounted to a horizontal surface (e.g., a ceiling)

or to a vertical surface (e.g., a wall), and the second antenna 191' may be rotated accordingly, for example, to point towards the floor.

Figure 7A:
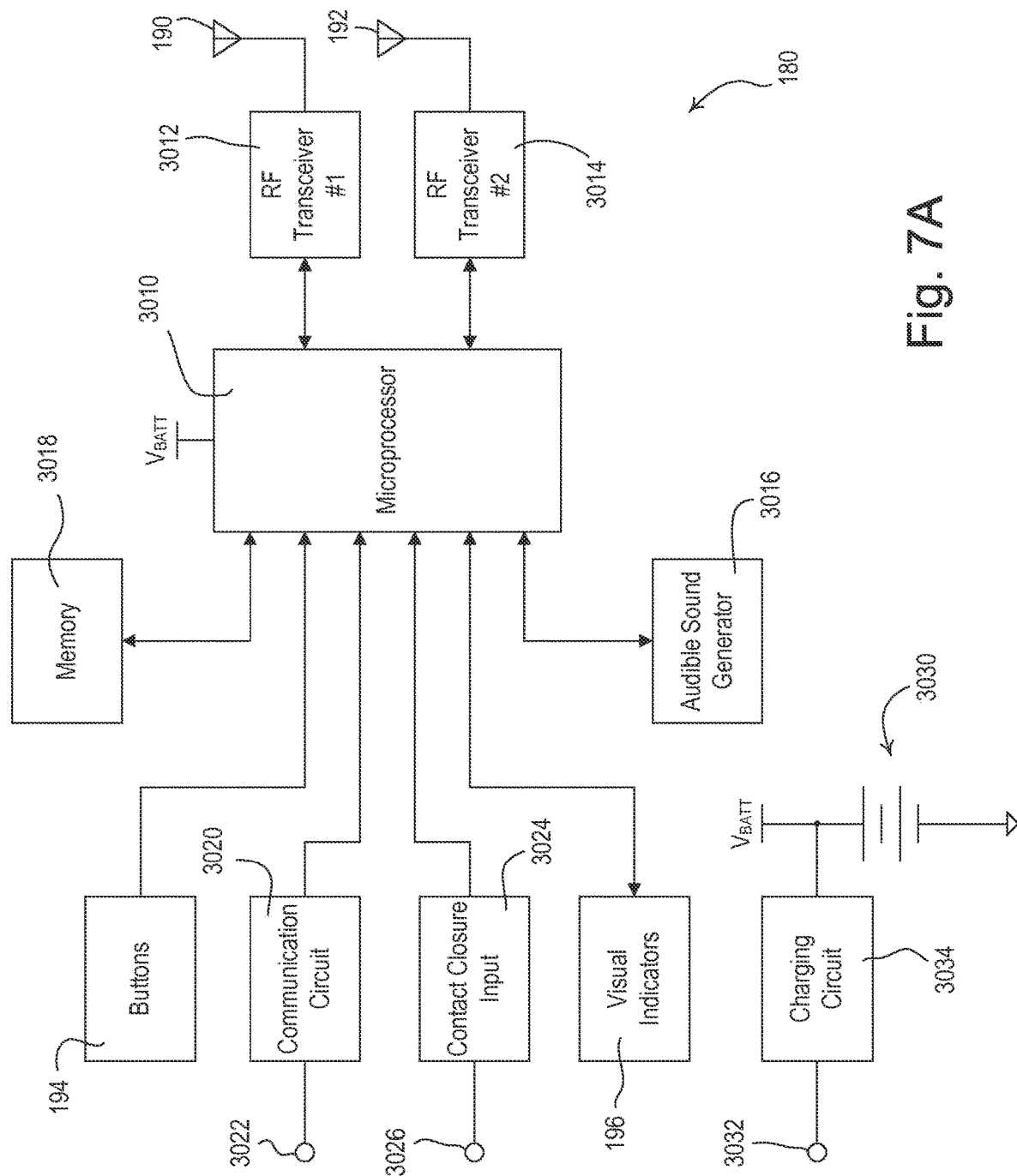
FIG. 7A is a simplified block diagram of the broadcast controller of the load control system of FIG. 3.

FIG. 7A is a simplified block diagram of the broadcast controller 180 according to the first embodiment of the present invention. The broadcast controller 180 includes a microprocessor 3010, which may alternatively comprise a microcontroller, a programmable logic device (PLD), an application specific integrated circuit (ASIC), a field-programmable gate array (FPGA), or any suitable processing device or control circuit. The microprocessor 3010 is coupled to two RF communication circuits (e.g., two RF transceivers 3012, 3014), which are coupled to the first and second antennas 190, 191, respectively, for transmitting the RF signals at the same frequency (e.g., approximately 434 MHz). Alternatively, the RF communication circuits could simply comprise RF transmitters or RF receivers. The microprocessor 3010 may employ one or more algorithms to control the allocation resources of the two antennas 190, 191 to either one of the RF transceivers 3012, 3014 of the broadcast controller 180 or to both of the RF transceivers 3012, 3014. In some embodiments, the microprocessor 3010 may employ one or more algorithms to use the two antennas 190, 191 for multi-input multi-output (MIMO) techniques, two antennas transmit and/or beamforming, for example.

As previously mentioned, the broadcast controller 180 (as well as the energy controllers) are operable to transmit digital messages in predetermined time slots according to the time division technique. Accordingly, the broadcast controller 180 may be operable to transmit digital messages on the two antennas 190, 191 in two different respective time slots. For example, the microprocessor 3010 may be operable to cause the first RF transceiver 3012 to transmit a first RF signal via the first antenna 190 in a first time slot, and to cause the second RF transceiver 3014 to transmit a second RF signal via the second antenna 191 in a second time slot. The first and second RF signals may comprise the same digital message (i.e., the same command, query, data, etc.). The first and second time slots are not overlapping and the first time slot may occur immediately before the second time slot. Alternatively, the first and second RF transceivers 3012, 3014 may transmit the first and second RF signals in randomly-selected time slots, for example, selected from a number of non-overlapping time slots. When the load control system 100 comprises additional broadcast controllers, the other broadcast controllers may be operable to transmit in additional time slots (i.e., different than the first and second time slots).

The broadcast controller 180 may be operable to receive an RF signal transmitted in a single time slot by one of the commanders or energy controllers via both of the first and second antennas 190, 191, i.e., at the same time. The first RF transceiver 3012 may be operable to generate a first received signal in response to the reception of the RF signal by the first antenna 190 and the second RF transceiver 3014 may be operable to generate a second received signal in response to the reception of the RF signal by the second antenna 191. The microprocessor 3010 may be operable to receive the first and second received signals and to respond to the wireless signal received by the first and second antennas 190, 191 by processing the first and second received signals. For example, the microprocessor 3010 may be operable to decode the first and second received signals and to respond to the one of the first and second received signals that is first decoded. Alternatively, the microprocessor 3010 may be operable to determine which of the first and second received signals has a greater signal strength and to respond to the received signal having the greater signal strength. In addition, the microprocessor 3010 may be operable to combine the first and second received signals and to respond to the combined signal.

In one or more embodiments, the broadcast controller 180 may employ one or more algorithms to permit the allocation of one or more transmission slots per each respective antenna of the two antennas 190, 191. For example, the broadcast controller 180 may assign a first radio (i.e., the RF transceiver 3012) one or more transmission slots of one of the two antennas 190, 191 and may assign to the first radio the same transmission slots, or one or more different transmission slots of a second of the two antennas 190, 191. By way of further example, the broadcast controller 180 may assign a second radio one or more transmission slots of one or both of the two antennas 190, 191 that may be different from the transmission slots assigned to the first radio. In other embodiments, the two antennas 190, 191 may be used to receive signals from the one or more devices (or nodes) with which the broadcast controller 180 may communicate (e.g., commanders or energy controllers, among others). For example, an algorithm of the broadcast controller 180 may evaluate a checksum or other quality control measurement respectively associated with the two antennas 190, 191 to determine which signals (or packets, etc.) received via the two antennas 190, 191 may be more reliable and/or may satisfy a predetermined quality threshold.

Because there are regulatory limitations on the power of radio transmissions, the broadcast controller 180 may employ one or more algorithms to control the broadcast transmit power of the one or more RF signals transmitted from the two antennas 190, 191. For example, the broadcast controller 180 may use the two antennas 190, 191 to respectively transmit signals at or below the regulated transmit power limitations, thereby effectively increasing the transmission range of the one or more radios used by the broadcast controller 180.

The broadcast controller 180 may be configured to transmit a first command signal to the at least one energy controller via the first antenna 190 and may be configured to transmit a second command signal to the at least one energy controller via the second antenna 191. The at least one energy controller may be configured to prioritize the first command signal or the second command signal over the control signal received from the broadcast controller 180. The broadcast controller 180 may be configured to assign the first command signal a designated transmission slot of the first antenna 190 and to assign the second command signal a designated transmission slot of the second antenna 191. The broadcast controller 180 may be configured to determine a first transmission power for the first command signal and to determine a second transmission power for the second command signal. The broadcast controller 180 may also be configured to transmit the first command signal via the first antenna 190 at or below the first transmission power and to transmit the second command signal via the second antenna 191 at or below the second transmission power.

As shown in FIG. 7A, the microprocessor 180 is operable to receive the user inputs from the buttons 194 and to illuminate the visual indicators 196 to provide feedback. The broadcast controller 180 may also comprise an audible sound generator 3016 for providing feedback to the user during configuration and normal operation. The microprocessor 3010 is also coupled to a memory 3018 for storage of the operating characteristics of the broadcast controller 180. The memory 3018 may be implemented as an external integrated circuit (IC) or as an internal circuit of the microprocessor 3010. The microprocessor 3010 is operable to be connected to the network communication link 184 via a communication circuit 3020 (e.g., an Ethernet communication circuit) and a network connection port 3022. The broadcast controller 180 also comprises a contact closure input circuit 3024 for receiving the contact closure signal received from the external device via a contact closure port 3026.

The broadcast controller 180 may comprise one or more rechargeable batteries 3030 for generating a battery voltage $V_{BATT}$ for powering the microprocessor 3010, the RF transceivers 3012, 3014, and the other low-voltage circuitry of the broadcast controller. The broadcast controller 180 may be adapted to receive AC line voltage or a DC voltage via a power port 3032 (e.g., a USB port). The batteries 3030 are operable to charge from the power port 3032 via a charging circuit 3034 when the broadcast controller 180 is connected to the base 192. The broadcast controller 180 may be removed from the base 192 and relocated to simplify the configuration procedure of the load control system 100. Alternatively, the broadcast controller 180 may comprise an internal power supply (rather than the batteries 3030) and may always be powered through the power port 3032.

Figure 7B:
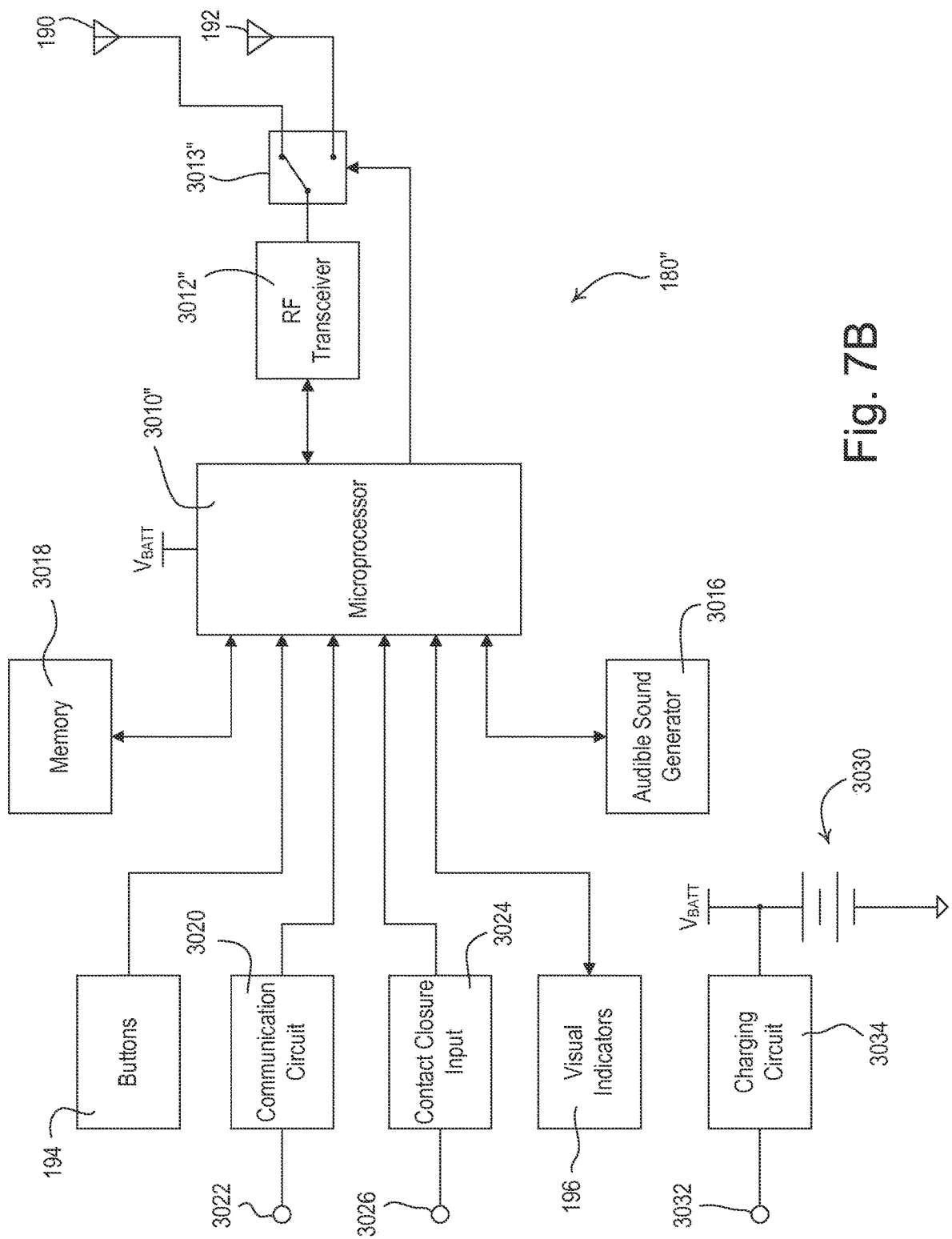
FIG. 7B is a simplified block diagram of a broadcast controller according to an alternate embodiment of the present invention.

FIG. 7B is a simplified block diagram of a broadcast controller 180" according to an alternate embodiment of the present invention. The broadcast controller 180" has similar functional blocks as the broadcast controller 180 shown in FIG. 7A. However, the broadcast controller 180" has a single RF communication circuit (e.g., an RF transceiver 3012") rather than the two separate RF transceivers 3012, 3014 of the broadcast controller 180 shown in FIG. 7A. The RF transceiver 3012" is coupled to the two antennas 190, 191 through an RF switch 3013". A microprocessor 3010" is able to control the position of the RF switch 3013" and which of the two antennas 190, 191 is coupled to the RF transceiver 3012" and is thus transmitting RF signals. Specifically, the microprocessor 3010" is operable to control the RF switch 3013" to a first position to couple the RF transceiver 3012" to the first antenna 190 to transmit a first wireless signal in a first time slot, and to control the RF switch to a second position to couple the RF transceiver to the second antenna 190 to transmit a second wireless signal in a second time slot, which may occur immediately after the first time slot. When the broadcast controller 180" is not transmitting RF signals, the microprocessor 3010" may lock the RF switch 3013" in one position, such that only one of the antennas 190, 191 is able to receive the RF signals. For example, for the broadcast controller 180' shown in FIG. 6B, the microprocessor 3010" may control the RF switch 3013" to the second position such that the second (and adjustable) antenna 191' is able to receive the RF signals.

The energy controllers may be associated with the broadcast controller 180 during or after the configuration procedures of each of the first and second independent units 110, 112. For example, the broadcast controller 180 may be installed in the load control system 100 and associated with the energy controllers of the independent units 110, 112 after the independent units are configured and operational. The energy controllers that are associated with the broadcast controller 180 are then responsive to the digital messages transmitted by the broadcast controller. For example, one of the energy controllers may be associated with the broadcast controller 180 by actuating a button on the energy controller until the energy controller enters an association mode, and then actuating one of the buttons 194 on the broadcast controller. The broadcast controller 180 may transmit a broadcast address to the energy controller, which may then save the broadcast address received from the broadcast controller. The broadcast controller 180 may flash one of the visual indicators 196 and/or may generate an audible sound when the association with the energy controller is completed. The broadcast controller 180 may be removed from the base 192 and moved close to the energy controllers to simplify the configuration procedure.

Alternatively, the broadcast controller 180 could be first put into an association mode in response to the actuation of the buttons 194 and then could repetitively transmit out the broadcast address in the association mode. The energy controllers could each save the broadcast address received from the broadcast controller 180 if an actuator on the energy controller is actuated while the broadcast controller is repetitively transmitting the broadcast address in the association mode.

After being associated with the energy controllers of the independent units 110, 112, the broadcast controller 180 is operable to transmit a digital message including one of a plurality of operating modes to the energy controllers. The energy controllers of the independent units 110, 112 automatically operate according to one of a plurality of control algorithms in response to receiving a digital message including one of the operating modes from the broadcast controller 180. For example, the broadcast controller 180 may be coupled to a central controller or processor (not shown) via the network 182 for receiving the operating modes to transmit to the independent units 110, 112. Alternatively, the broadcast controller 180 could transmit one of the operating modes to the energy controllers of the independent units 110, 112 in response to digital messages received from a building or energy management system coupled to the network 182, in response to digital messages received from a remote "cloud" server via the Internet, or in response to the contact closure signal received via the contact closure input. The energy controllers are operable to control the respective loads in response to the present operating mode and one or more operating characteristics that are stored in a memory of the energy controller.

In addition, the broadcast controller 180 may be operable to transmit digital messages including commands for controlling the associated loads to the energy controllers. For example, the commands may include a command to turn the load on or off, a command to adjust the amount of power delivered to the load, a command to increase or decrease a setpoint temperature of a heating and cooling system, a delay time (i.e., a time from when the command is received to when the load is controlled), and a fade time (i.e., the amount of time over which the load is adjusted from an initial value to a target value).

The broadcast controller 180 may also provide centralized timeclock control of the independent units 110, 112. For example, the broadcast controller 180 could periodically transmit the present time of the day to the energy controllers. Each energy controller could be programmed with a timeclock schedule for controlling the electrical loads in response to the present time of the day transmitted by the broadcast controller 180. The timeclock schedule may be stored in the memory 3018 of the broadcast controller 180. The broadcast controller 180 could comprise an astronomical timeclock or could receive the time of day information from the cloud server via the Internet. In addition, rather than transmitting the present time of day to the energy controllers, the broadcast controller 180 could store a timeclock schedule for controlling the electrical loads and could transmit alternative commands to the energy controllers in response to the present time of the day. For example, the broadcast controller 180 could transmit Sweep On or Sweep Off commands to the energy controllers per the timeclock schedule to turn one or more of the electrical loads on and off, respectively, at the end of the work day. Further, the broadcast controller 180 could transmit one of the operating modes to the energy controllers in response to the timeclock schedule. In one or more embodiments, the broadcast controller 180 may include one or more processor (or controller) devices, one or more memory, at least one power supply, and/or one or more wireless communication transceivers (that may be in communication with the two antennas 190, 191). The one or more processor devices may be configured to perform various functions, such as but not limited to those functions associated with timeclock functions and/or demand response functions.

The operating modes transmitted by the broadcast controller 180 may include, for example, a normal mode, a standard demand response (DR) mode, an emergency demand response (DR) mode, an afterhours mode, a safety mode, and a pre-condition mode. During the standard demand response mode and the emergency demand response mode, the energy controllers operate to lower the total power consumption of the load control system 100 (i.e., shed loads). For example, the dimmer switch 210 may decrease the present intensity $L_{PRES}$ of the lighting load 122 by a predetermined amount when the lighting load is on, turn the lighting load off when the room is unoccupied, and decrease the present intensity $L_{PRES}$ in response to a daylight sensor if there is an abundance of daylight in the room. In addition, the motorized window treatment 320 may lower the shade fabric 322 to cover the window and provide additional insulation for the building during the standard demand response mode and the emergency demand response mode, or may alternatively raise the shade fabric to allow more sunlight to enter the room.

Further, the temperature control devices 230, 330 may increase the setpoint temperature $T_{SET}$ of the HVAC system when cooling the building, and decrease the setpoint temperature $T_{SET}$ of the HVAC system when heating the building during the standard demand response mode and the emergency demand response mode to reduce the energy consumption of the HVAC system. In addition, the temperature control devices 230, 330 may be operable to turn the HVAC system off during the standard demand response mode and the emergency demand response mode. The operation of the energy controllers during the demand response modes may be dependent upon the present time of day or the present time of year. In addition, the operation of the energy controllers during the demand response mode may be dependent upon the present operating mode or the present scene selected in the independent unit. For example, if a "presentation" or "meeting" scene is selected in an independent unit and the broadcast controller 180 transmits the standard demand response mode, the energy controllers of the independent unit may not respond to the standard demand response mode, so as to not disrupt the meeting in progress.

The broadcast controller 180 may be operable to cause the energy controllers to enter the standard demand response mode or the emergency demand response mode in response to various different inputs. The broadcast controller 180 may generate an audible sound and/or may blink one of the visual indicators 196 (i.e., generate a visual indication) when first entering either of the demand response modes. In addition, the energy controllers may generate an audible sound or blink a visual indicator when in either of the demand response modes. Alternatively, the broadcast controller 180 could transmit a digital message via the network 182, such that an email or text is sent or a message is displayed on a graphical using interface (GUI) running on the tablet 185 or a PC when the broadcast controller 180 first enters either of the demand response modes. The broadcast controller 180 may be operable to transmit one of the standard demand response mode and the emergency demand response mode to the energy controllers in response to a manual input, such as, for example, an actuation of a demand response start button 188 of the demand response remote control 186, or the selection of a start option on a web page displayed on the tablet 185 or other computing device coupled to the network communication link 184 (e.g., a personal computer or a smart phone). In addition, the broadcast controller 180 may be operable to transmit one of the demand response modes in response to a timeclock event that is created using the computing device.

Further, the broadcast controller 180 may be operable to automatically cause the energy controllers to enter one of the demand response modes. For example, the load control system 100 may further comprise a contact closure interface unit (not shown) for receiving a wireless signal (e.g., a cellular signal) from the electrical utility 183 or an aggregator. The contact closure interface unit may direct to the broadcast controller 180 to transmit one of the demand response modes via the contact closure input signal received by the contact closure input circuit 5024. Alternatively, the central controller of the load control system 100 could receive a communication from the electrical utility 183 or the aggregator via the network 182 and could automatically transmit one or more digital messages to the broadcast controller 180 for causing the broadcast controller to transmit one of the demand response modes to the energy controllers. In addition, the central controller could periodically download a demand response state or command from the electrical utility or aggregator via the network 182, and could cause the broadcast controller 180 to transmit one of the demand response modes to the energy controllers in response to the downloaded state or command.

The broadcast controller 180 may be operable to cause the energy controllers to exit the standard demand response mode or the emergency demand response mode, for example, by transmitting the normal mode to the energy controllers. The broadcast controller 180 may be operable to cause the energy controllers to exit the demand response modes in response to a manual input, such as, for example, an actuation of a demand response stop button 189 of the demand response remote control 186, in response to the selection of a stop option on a web page displayed on a computing device coupled to the network communication link 184, or in response to a timeclock event created by the computing device. In addition, the broadcast controller 180 may be operable to automatically cause the energy controllers to exit the demand response modes in response to the removal of the signal at the contact closure input, in response to a communication received from the electrical utility 183 or the aggregator via the network 182, or in response to a downloaded demand response state or command. Further, the energy controllers may be operable to time out from the demand response mode after a predetermined amount of time.

The broadcast controller 180 is operable to "pre-condition" the building in which the load control system 100 is installed before operating the energy controllers in the standard demand response mode (in which the HVAC system will consume less power). The broadcast controller 180 may transmit a digital message including the pre-condition mode prior to causing the energy controllers to operate in the standard demand response mode. In the pre-condition mode, the temperature control devices 230, 330 are operable to pre-cool the building when the HVAC system is cooling the building, and to pre-heat the building when the HVAC system is heating the building.

The operating characteristics and functionality of the operating modes of the energy controllers may be programmed out-of-box, such that the energy controllers are each responsive to the operating modes transmitted by the broadcast controller 180 as soon as the energy controller is associated with the broadcast controller. In addition, the operating characteristics and functionality of the operating modes of the energy controllers could alternatively be configured by a customer online (for example, using a web browser on a personal computer), and then programming into memory of the broadcast controller 180 during the manufacturing process of the broadcast controller, such that the load control system 100 is operational as soon as the energy controllers are installed and associated with the broadcast controller. Further, the control algorithms of each of the energy controllers may be programmed, for example, using a handheld programmer to transmit digital messages to the energy controller. However, not all of the energy controllers may be responsive to all of the operating modes transmitted by the broadcast controller 180. Therefore, if the energy controller receives a digital message including an operating mode that is not configured in that energy controller, the energy controller defaults to the Normal mode. For example, the dimmer switch 210 may not be responsive to digital messages including the Pre-condition mode.

For example, the dimmer switch 210 may operate in the normal mode, the standard demand response mode, the emergency demand response mode, the afterhours mode, and the safety mode. When the dimmer switch 210 receives a digital message including one of the operating modes from the broadcast controller 180, the dimmer switch executes an operating mode adjustment procedure 400 to begin operating according to the appropriate control algorithm. When a digital message is received from one of the commanders of the independent unit of the dimmer switch 210, the dimmer switch executes a control procedure 500 in dependence upon the present operating mode as received from the broadcast controller 180. The dimmer switch 210 determines the present intensity $L_{PRES}$ of the lighting load 212 during the control procedure 500 using a normal intensity $L_{NORM}$, a demand response setback $\Delta_{DR}$, and a daylighting setback $\Delta_{DL}$, e.g., $$L_{PRES} = (1 - \Delta_{DR}) \cdot (1 - \Delta_{DL}) \cdot L_{NORM}.$$

The dimmer switch 210 controls the present intensity $L_{PRES}$ of the lighting load 212 to the normal intensity $L_{NORM}$ when operating in the normal mode, and may adjust the normal intensity $L_{NORM}$ in response to actuations of the buttons 252-258 of the remote control 250. The demand response setback $\Delta_{DR}$ represents a percentage by which the present intensity $L_{PRES}$ of the lighting load 212 is scaled back from the normal intensity $L_{NORM}$ when the dimmer switch 210 is operating in the demand response mode. The daylighting setback $\Delta_{DL}$ represents a percentage by which the present intensity $L_{PRES}$ of the lighting load 212 is scaled back from the normal intensity $L_{NORM}$ when daylighting is enabled for the dimmer switch 210.

Figure 8A:
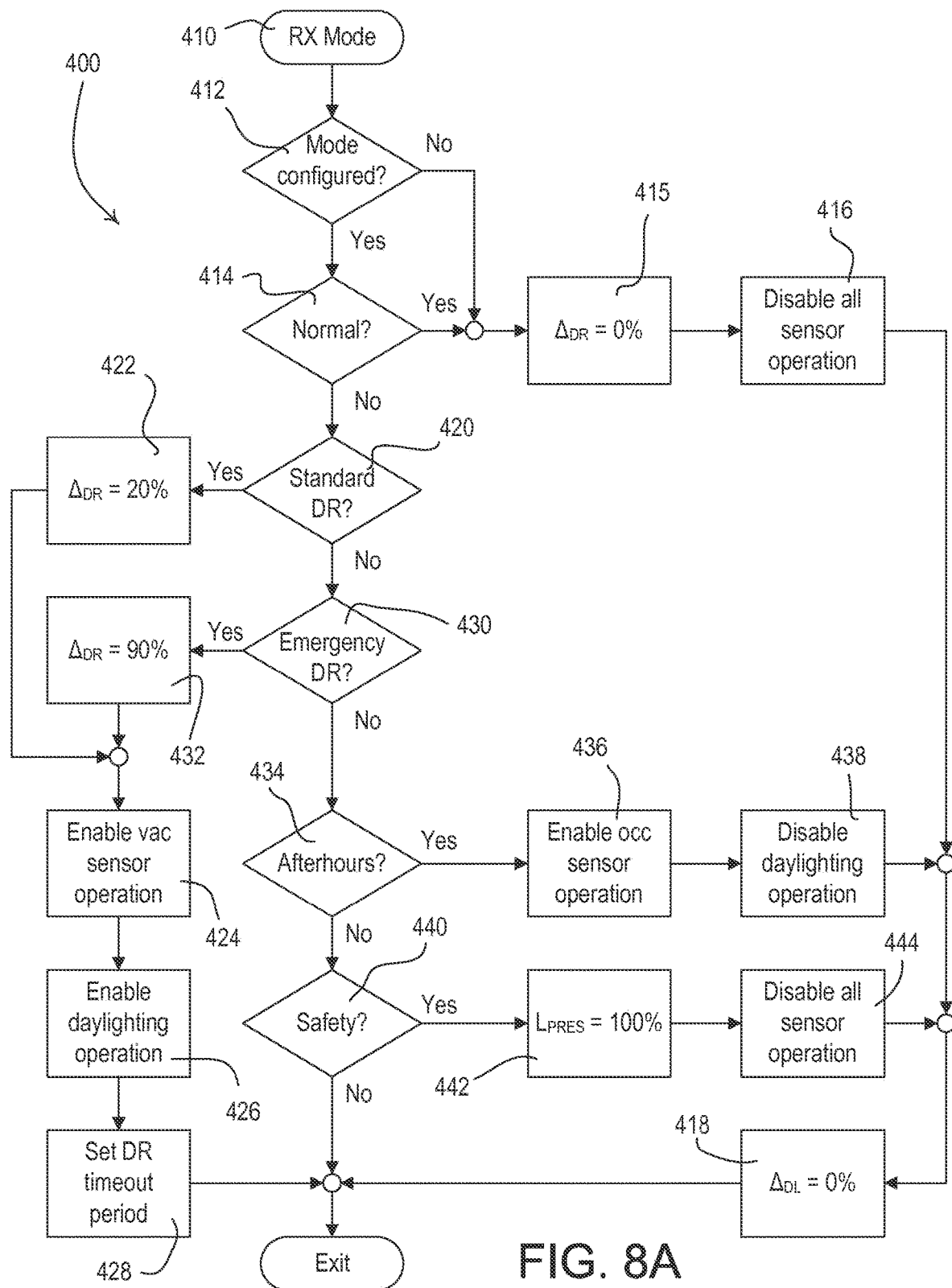
FIG. 8A is a simplified flowchart of an operating mode adjustment procedure executed by an energy controller (e.g., a dimmer switch) when a digital message including an operating mode is received from the broadcast controller of the load control system of FIG. 3.

FIG. 8A is a simplified flowchart of the operating mode adjustment procedure 400 executed by the dimmer switch 210 when the dimmer switch receives a digital message including one of the operating modes at step 410. If the operating mode that was received at step 410 is configured for the dimmer switch 210 at step 412 (i.e., the dimmer switch is responsive to the mode) and the received operating mode is the normal mode at step 414, the dimmer switch 210 sets the demand response setback $\Delta_{DR}$ to 0% at step 415. The dimmer switch 210 then disables all sensor operation at step 416 (i.e., the dimmer switch 210 will not respond to occupancy sensors or daylight sensors during normal operation) and sets the daylighting setback $\Delta_{DL}$ to 0% at step 418, before the operating mode adjustment procedure 400 exits.

If the received operating mode is the standard demand response mode at step 420, the dimmer switch 210 sets the demand response setback $\Delta_{DR}$ to a first predetermined setback amount $\Delta_{DR1}$, for example, approximately 20%, at step 422. The dimmer switch 210 then enables vacancy sensor operation at step 424 (i.e., the dimmer switch will respond to vacant messages, but not occupied messages transmitted by the occupancy sensors assigned to the dimmer switch) and enables daylighting operation at step 426 (i.e., the dimmer switch will adjust the preset intensity $L_{PRES}$ in response to the total lighting intensity measured by the daylight sensors assigned to the dimmer switch). Finally, the dimmer switch 210 sets a demand response (DR) timeout period at step 428 and the operating mode adjustment procedure 400 exits. If the received operating mode is the emergency demand response mode at step 430, the dimmer switch 210 sets the demand response setback $\Delta_{DR}$ to a second predetermined setback amount $\Delta_{DR2}$ (e.g., approximately 90%) at step 432, enables vacancy sensor operation at step 424, enables daylighting operation at step 426, and sets the demand response timeout period at step 428, before the operating mode adjustment procedure 400 exits. At the end of the demand response timeout period, the dimmer switch 210 will automatically exit the demand response modes, for example, by changing to the normal mode (i.e., setting the demand response setback $\Delta_{DR}$ to 0%, disabling all sensor operation, and setting the daylighting setback $\Delta_{DL}$ to 0%).

If the received operating mode is the afterhours mode at step 434, the dimmer switch 210 enables occupancy sensor operation at step 436 (i.e., the dimmer switch will respond to both occupied and vacant messages transmitted by the occupancy sensors assigned to the dimmer switch). The dimmer switch 210 then disables daylighting operation at step 438 (i.e., the dimmer switch 210 will not adjust the preset intensity $L_{PRES}$ in response to the daylight sensors assigned to the dimmer switch) and sets the daylighting setback $\Delta_{DL}$ to 0% at step 418, before the operating mode adjustment procedure 400 exits. If the received operating mode is the safety mode at step 440, the dimmer switch 210 sets the preset intensity $L_{PRES}$ of the lighting load equal to the maximum intensity $L_{MAX}$ (i.e., 100%) at step 442, such that the preset intensity $L_{PRES}$ is not dependent on the values of the normal intensity $L_{NORM}$, the demand response setback $\Delta_{DR}$, and the daylighting setback $\Delta_{DL}$. The dimmer switch 210 then disables all sensor operation at step 444 and sets the daylighting setback $\Delta_{DL}$ to 0% at step 418, before the operating mode adjustment procedure 400 exits. If the operating mode that was received at step 410 is not configured for the dimmer switch 210 at step 412, the dimmer switch simply operates in the normal mode by setting the lighting setback $\Delta_{DR}$ to 0% at step 415, disabling all sensor operation at step 415, and setting the daylighting setback $\Delta_{DL}$ to 0% at step 418.

Figure 8B:
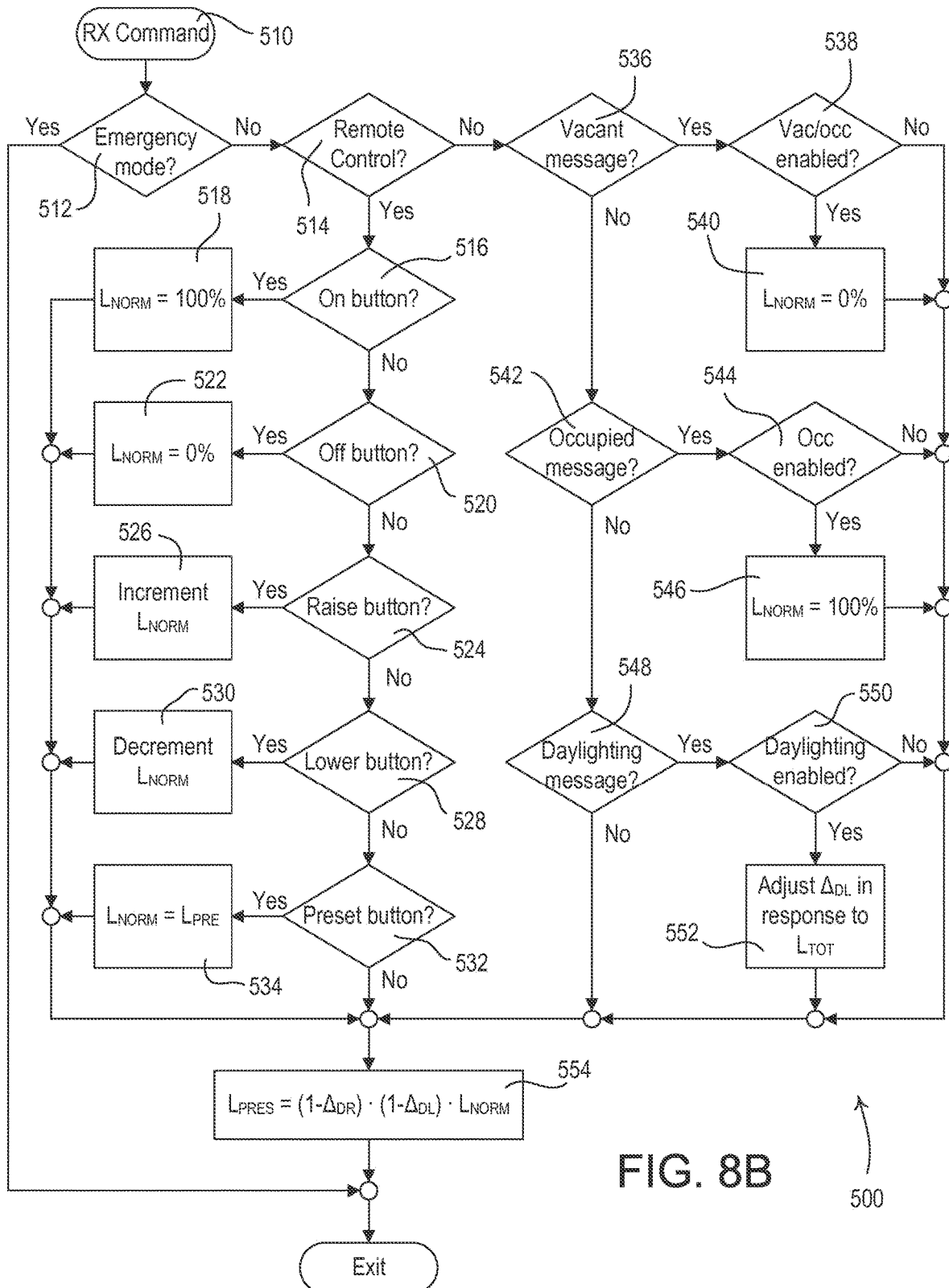
FIG. 8B is a simplified flowchart of a control procedure executed by the dimmer switch when a digital message is received from a commander of the load control system of FIG. 3.

FIG. 8B is a simplified flowchart of the control procedure 500 executed by the dimmer switch 210 when the dimmer switch receives a digital message from one of the commanders (e.g., the remote control 250, the occupancy sensor 260, or a daylight sensor) at step 510. If the dimmer switch 210 is operating in the emergency mode at step 512, the dimmer switch does not respond to the received digital message and the control procedure 500 simply exits. If the received digital message is from the remote control 250 at step 514 and indicates that the on button 252 of the remote control was actuated at step 516, the dimmer switch 210 sets the normal intensity $L_{NORM}$ to the maximum intensity $L_{MAX}$ (i.e., 100%) at step 518. If the received digital message indicates that the off button 254 of the remote control 250 was actuated at step 520, the dimmer switch 210 sets the normal intensity $L_{NORM}$ to 0% (i.e., off) at step 522. If the received digital message indicates that the raise button 255 was actuated at step 524 or that the lower button 256 was actuated at step 528, the dimmer switch 210 respectively increases the normal intensity $L_{NORM}$ by a predetermined amount (e.g., approximately 1%) at step 526 and decreases the normal intensity $L_{NORM}$ by a predetermined amount (e.g., approximately 1%) at step 530. If the received digital message indicates that the preset button 258 was actuated at step 532, the dimmer switch 210 sets the normal intensity $L_{NORM}$ to the preset intensity $L_{PRE}$ at step 534.

If the received digital message is not from the remote control 250 at step 514, the dimmer switch 210 determines if the received digital message is from the occupancy sensor 260. Specifically, if the received digital message is a vacant message from the occupancy sensor 260 at step 536 and vacancy sensor or occupancy sensor operation is enabled at step 538 (i.e., as enabled at steps 424 or 432 of the operating mode adjustment procedure 400), the dimmer switch 210 sets the normal intensity $L_{NORM}$ to 0% (i.e., off) at step 540. If vacancy sensor or occupancy sensor operation is not enabled at step 538, the dimmer switch 210 does not adjust the normal intensity $L_{NORM}$. If the received digital message is an occupied message from the occupancy sensor 260 at step 542 and occupancy sensor operation is enabled at step 544, the dimmer switch 210 sets the normal intensity $L_{NORM}$ to the maximum intensity $L_{MAX}$ (i.e., 100%) at step 546.

If the received digital message is a daylighting message from a daylight sensor at step 548 and daylighting operation is enabled at step 550, the dimmer switch 210 sets the daylighting setback $\Delta_{DL}$ in response to the measured total lighting intensity $L_{TOT}$ included in the received digital message at step 552. For example, the dimmer switch 210 may increase the value of the daylighting setback $\Delta_{DL}$ if the total lighting intensity $L_{TOT}$ is above a predetermined threshold. Finally, after adjusting the normal intensity $L_{NORM}$ at steps 518, 522, 526, 530, 534, 540, 546 or adjusting the daylighting setback $\Delta_{DL}$, at step 552, the dimmer switch 210 calculates a new value of the present intensity $L_{PRES}$ of the lighting load 212 using the normal intensity $L_{NORM}$, the demand response setback $\Delta_{DR}$, and the daylighting setback $\Delta_{DL}$, at step 554, before the control procedure 500 exits.

Similarly, the temperature control device 230 of the first independent unit 110 executes an operating mode adjustment procedure 600 to operate with the appropriate control algorithm in response to receiving a digital message including one of the operating modes from the broadcast controller 180. The temperature control device 230 controls the setpoint temperature $T_{SET}$ of the HVAC system to a normal temperature $T_{NORM}$ when operating in the normal mode, and may adjust the normal temperature $T_{NORM}$ in response to actuations of the actuators of the user interface 232. The temperature control device 230 adjusts the setpoint temperature $T_{SET}$ using an offset temperature $T_{OS}$ to reduce the total power consumption of the HVAC system when operating in the standard demand response mode, the emergency demand response mode, or the afterhours mode. In addition, the temperature control device 230 adjusts the setpoint temperature $T_{SET}$ using the offset temperature $T_{OS}$ to pre-cool or pre-heat the building when operating in the pre-condition mode.

Figure 8C:
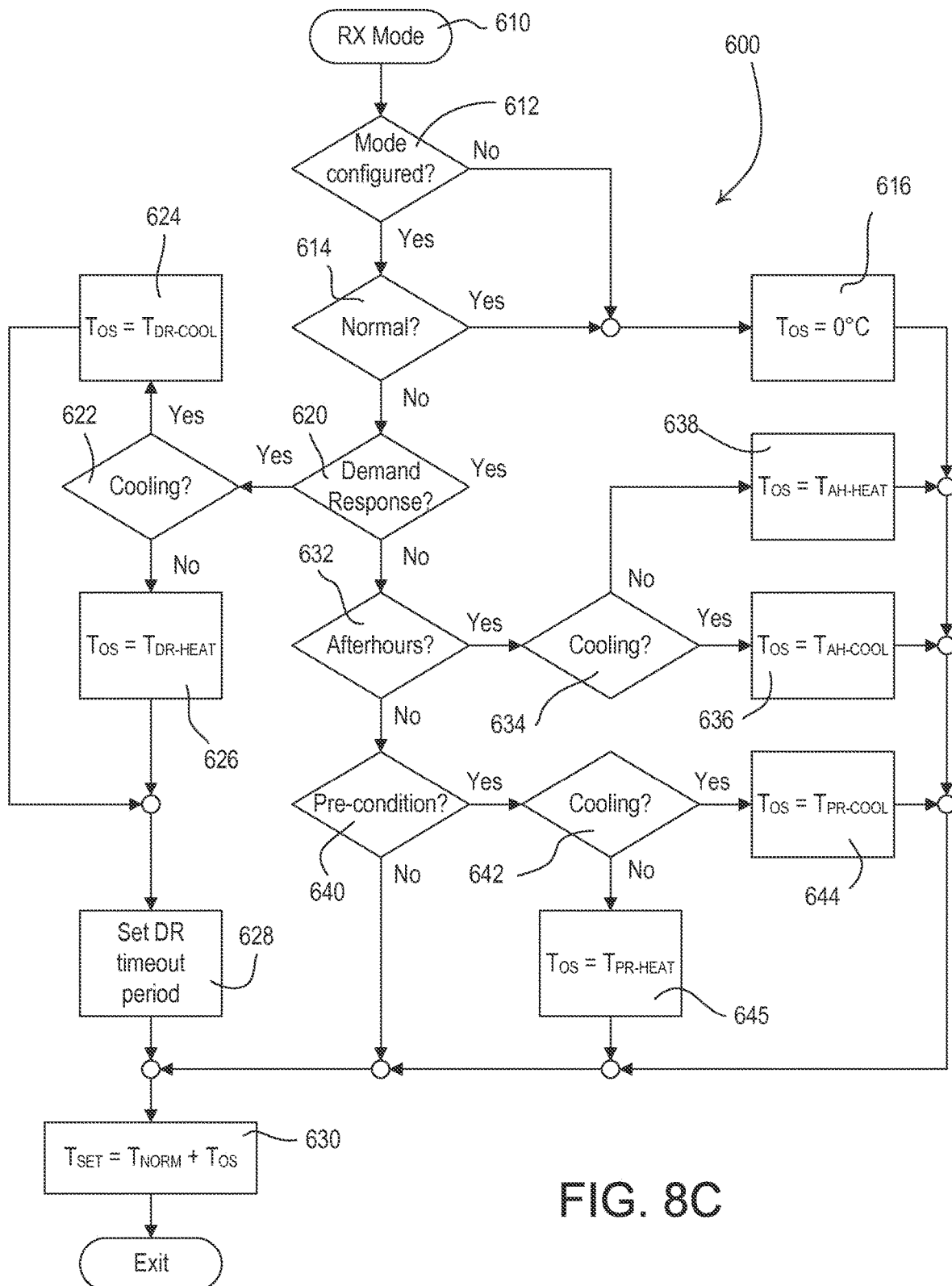
FIG. 8C is a simplified flowchart of an operating mode adjustment procedure executed by a temperature control device when a digital message including an operating mode is received from the broadcast controller of the load control system of FIG. 3.

FIG. 8C is a simplified flowchart of the operating mode adjustment procedure 600 executed by the temperature control device 230 when the temperature control device receives a digital message including one of the operating modes at step 610. If the operating mode that was received at step 610 is configured for the temperature control device 230 at step 612 and the received operating mode is the normal mode at step 614, the temperature control device sets the offset temperature $T_{OS}$ to 0° ° C. at step 616. The temperature control device 230 then determines the setpoint temperature $T_{SET}$ for the HVAC system at step 630 by adding the offset temperature $T_{OS}$ to the normal temperature $T_{NORM}$ (i.e., the setpoint temperature $T_{SET}$ equals the normal temperature $T_{NORM}$), before the operating mode adjustment procedure 600 exits.

If the received operating mode is either of the demand response modes at step 620 and the HVAC system is presently cooling the building at step 622, the temperature control device 230 sets the offset temperature $T_{OS}$ to a cooling demand response setback temperature $T_{DR\text{-}COOL}$ (e.g., approximately 3° C.) at step 624. If the HVAC system is presently heating the building at step 622, the temperature control device 230 sets the offset temperature $T_{OS}$ to a heating demand response setback temperature $T_{DR\text{-}HEAT}$ (e.g., approximately)-3° ° C. at step 626. The temperature control device 230 sets a demand response (DR) timeout period at step 628. Finally, the temperature control device 230 adds the offset temperature $T_{OS}$ to the normal temperature $T_{NORM}$ to determine the setpoint temperature $T_{SET}$ for the HVAC system at step 630 before the operating mode adjustment procedure 600 exits. Accordingly, when operating in either of the demand response modes, the temperature control device 230 increases the setpoint temperature $T_{SET}$ when cooling the building (since the offset temperature $T_{OS}$ is positive) and decreases the setpoint temperature $T_{SET}$ when heating the building (since the offset temperature $T_{OS}$ is negative). At the end of the demand response timeout period, the temperature control device 230 will exit the demand response modes, for example, by changing to the normal mode (i.e., setting the offset temperature $T_{OS}$ to 0° ° C.).

If the received operating mode is the afterhours mode at step 632 and the HVAC system is presently cooling the building at step 634, the temperature control device 230 sets the offset temperature $T_{OS}$ to a cooling afterhours setback temperature $T_{AH\text{-}COOL}$ (e.g., approximately 3° C.) at step 636. If the HVAC system is presently heating the building at step 634, the temperature control device 230 sets the offset temperature $T_{OS}$ to a heating afterhours setback temperature $T_{AH\text{-}HEAT}$ (e.g., approximately)-3° ° C. at step 638. The temperature control device 230 then determines the setpoint temperature $T_{SET}$ for the HVAC system at step 630 by adding the offset temperature $T_{OS}$ to the normal temperature $T_{NORM}$ and the operating mode adjustment procedure 600 exits. Accordingly, when operating in the afterhours mode, the temperature control device 230 increases the setpoint temperature $T_{SET}$ when cooling the building and decreases the setpoint temperature $T_{SET}$ when heating the building.

If the received operating mode is the pre-condition mode at step 640 and the HVAC system is presently cooling the building at step 642, the temperature control device 230, the temperature control device 230 sets the offset temperature $T_{OS}$ to a cooling pre-cool temperature $T_{PR-COOL}$ (e.g., approximately −4° C.) at step 644. If the HVAC system is presently heating the building at step 642, the temperature control device 230 sets the offset temperature $T_{OS}$ to a pre-heat temperature $T_{PR-HEAT}$ (e.g., approximately 4° C.) at step 646. Accordingly, when operating in the pre-condition mode, the temperature control device 230 decreases the setpoint temperature $T_{SET}$ when cooling the building and increases the setpoint temperature $T_{SET}$ when heating the building. If the operating mode that was received at step 610 is not configured for the temperature control device 230 at step 612, the temperature control device simply operates in the normal mode by setting the offset temperature $T_{OS}$ to 0° C. at step 616.

While the operating mode adjustment procedures 400, 600 of FIGS. 8A and 8C were described as executed by the dimmer switch 210 and the temperature control device 230, the other energy controllers of the first and second independent units 110, 112 would also execute similar operating mode adjustment procedures with changes depending upon the specific loads that the energy controllers are controlling. In addition, as described above, the operating modes of the energy controllers are mutually exclusive, i.e., the energy controllers each only operate in one of the operating modes at a single time. Alternatively, the energy controllers could operate in more than one operating mode at once.

The energy controllers may each be operable to adjust the operating characteristics stored in memory (e.g., the first and second predetermined setback amounts $\Delta_{DR1}$, $\Delta_{DR2}$ of the dimmer switch 210 and the cooling and heating demand response setback temperatures $T_{DR-COOL}$, $T_{DR-HEAT}$ of the temperature control device 130) in response to digital messages received from the broadcast controller 180. The operating characteristics can be transmitted to the energy controllers and stored in memory in the energy controllers, such that the energy controllers are operable to control the controlled loads in response to receiving an operating mode from the broadcast controller 180. Alternatively, the broadcast controller 180 could transmit a digital message including both the operating mode and the operating characteristics to the energy controllers.

Figure 9:
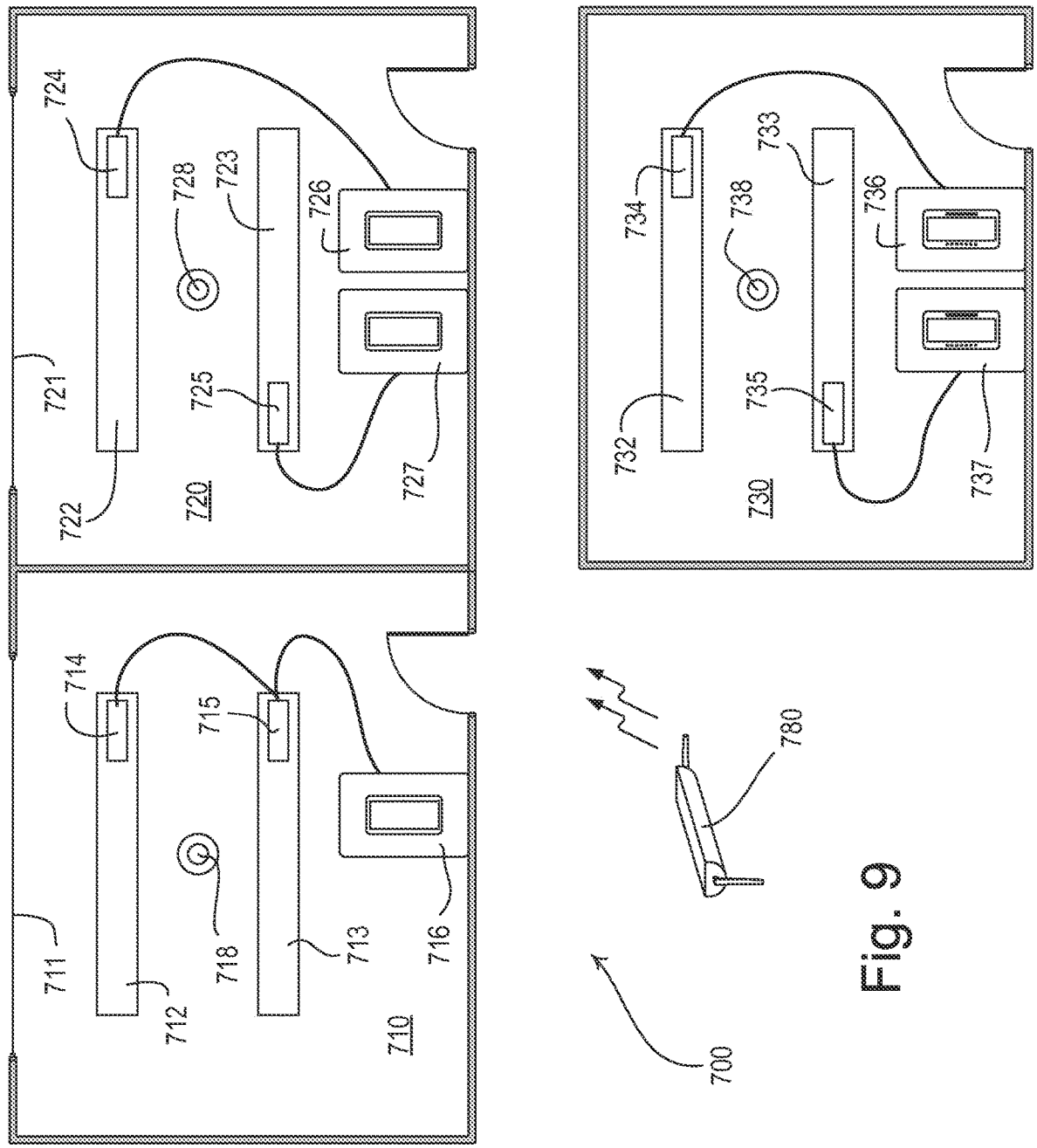
FIG. 9 is a simplified floor plan having three independent units that is used to illustrate how the load control system of FIG. 3 may operate in a standard demand response mode and an emergency demand response mode according to a second embodiment of the present invention.

The energy controllers may alternatively operate according to different algorithms in the standard demand response mode and the emergency demand response mode. FIG. 9 is a simplified floor plan 700 having three offices 710, 720, 730 (e.g., independent units) that is used to illustrate how the load control system 100 may operate in the standard demand response mode and the emergency demand response mode according to a second embodiment of the present invention. The first office 710 includes a window 711 and two fluorescent lighting fixtures 712, 713 having respective ballasts 714, 715 for controlling fluorescent lamps in the lighting fixtures. The ballasts 714, 715 are electrically coupled to an electronic switch 716, which is able to simply turn the fluorescent lamps of the lighting fixtures 712, 713 on and off. The first office 710 also includes an occupancy sensor 718, which is associated with the electronic switch 716, such that the electronic switch is responsive to the RF signals transmitted by the occupancy sensor.

During normal operation, a user is able to manually turn the fluorescent lamps of the lighting fixtures 712, 713 on and off by actuating the toggle actuator of the electronic switch 716. In addition, the electronic switch 716 turns the fluorescent lamps of the lighting fixtures 712, 713 on in response to receiving an occupied command from the occupancy sensor 718 and off in response to receiving a vacant command from the occupancy sensor 718. In other words, in one or more embodiments, during normal mode, the energy controller (electronic switch 716) accepts (or prioritizes) the command signal of the occupancy sensor 718 as the commander of the energy controller (electronic switch 716). This may occur because the broadcast controller 780 has—by signaling normal mode—effectively released the electronic switch 716 (the energy controller) from the obligation to accept (or prioritize) the signal of the broadcast controller 780 over the commander of the electronic switch 716—the occupancy sensor 718.

In some embodiments, when the broadcast controller 780 issues a normal mode signal to the energy controllers registered with the broadcast controller 780, that may be understood generally to be the release of the respective energy controllers from the configured obligation to accept (or prioritize) the commands of the broadcast controller over the commands of the respective energy controllers' commanders. The energy controllers may operate according to the commands of their respective commanders until such time as the broadcast controller 780 issues a new (e.g., fresh or updated) command message (e.g., standard demand response mode) for the energy controllers to once again accept (or prioritize) the commands of the broadcast controller 780 over the commands of the energy controllers' commanders.

The second office 720 also includes a window 721 and two lighting fixtures 722, 723 (e.g., fluorescent lighting fixtures) having respective ballasts 724, 725. The ballasts 724, 725 are electrically coupled to respective electronic switches 726, 727, such that the lighting fixtures 722, 723 may be independently turned on and off. The electronic switches 726, 727 are each associated with and responsive to an occupancy sensor 728. During normal operation, the electronic switches 726, 727 independently turn the respective lighting fixtures 722, 723 on and off in response to manual actuations of the toggle actuators and in response to the RF signals transmitted by the occupancy sensor 728. The third office 730 has two lighting fixtures 732, 733 (e.g., fluorescent lighting fixtures) with respective ballasts 734, 735 and two dimmer switches 736, 737 for controlling the intensities of the fluorescent lamps of the respective lighting fixtures 732, 733. The dimmer switches 736, 737 are each associated with and responsive to an occupancy sensor 738. During normal operation, a user is able to turn the lighting fixtures 732, 733 on and off and adjust the intensity of the fluorescent lamps between the minimum intensity $L_{MIN}$ and the maximum intensity $L_{MAX}$ by actuating the actuators of the respective dimmer switches 736, 737. The dimmer switches 736, 737 are operable to turn the fluorescent lamps of the respective lighting fixtures 732, 733 on to a first reduced intensity (e.g., approximately 80%) in response to receiving an occupied command from the occupancy sensor 738 and off in response to receiving a vacant command from the occupancy sensor.

The electronic switches 716, 726, 727 and the dimmer switches 736, 737 are all responsive to a broadcast controller 780. The broadcast controller 780 is operable to transmit the standard demand response mode and the emergency response mode to the electronic switches 716, 726, 727 and the dimmer switches 736, 737 in response to receiving an input from the various sources as described above in the first embodiment. The functionality of each of the electronic switches 716, 726, 727 and the dimmer switches 736, 737 is programmed during the configuration procedure of the broadcast controller 780 as will be described in greater detail below. In addition, the algorithms defining the operation of the electronic switches 716, 726, 727 and the dimmer switches 736, 737 in the standard demand response mode and in the emergency demand response mode are stored in each of the devices. Therefore, when the broadcast controller 780 transmits the standard demand response mode or the emergency demand response mode to the electronic switches 716, 726, 727 and the dimmer switches 736, 737, the devices understand how to operate.

For example, during the standard demand response mode, the electronic switch 726 may turn off the lighting fixture 722 in response to receiving a vacant command from the occupancy sensor 728, but does not turn on the lighting fixture in response to receiving an occupied command from the occupancy sensor. When the electronic switch 726 first receives the standard demand response mode from the broadcast controller 780, the electronic switch turns off the lighting fixture 722 closest to the window 721. A user of the second office 720 may open a window treatment covering the window 721 to allow more daylight to enter the office if needed. While in the standard demand response mode, the electronic switch 726 may turn on the lighting fixture 722 in response to a manual actuation of the toggle actuator. The operation of the electronic switch 716 in the first office 710 and the electronic switch 727 in the second office 720 is unaffected in the standard demand response mode (i.e., the same as during normal operation).

During the standard demand response mode, the dimmer switches 736, 737 of the third office 730 limit the maximum intensities of the lighting fixtures 732, 733 to a second reduced intensity (i.e., approximately 80%) in response to manual actuations of the actuators of the dimmer switches. When the dimmer switches 736, 737 first receive the standard demand response mode from the broadcast controller 780, the dimmer switches slowly dim the intensities of the lighting fixtures 732, 733 by a predetermined load shed percentage, e.g., approximately 20%. For example, if the intensity of each of the lighting fixtures 732, 733 is 80% during normal operation, the dimmer switches 736, 737 reduce the intensities of the lighting fixtures to approximately 64% over a standard demand response fade time, e.g., approximately one minute, such that the user will not notice the slow reduction in the intensities of the lighting fixtures. While in the standard demand response mode, the dimmer switches 736, 737 turn the respective lighting fixtures 732, 733 on to a third reduced intensity (e.g., approximately 64%) in response to receiving an occupied command from the occupancy sensor 738 and off in response to receiving a vacant command from the occupancy sensor. Alternatively, the intensities of the lighting fixtures 732, 733 may be manually overridden during the standard demand response mode, such that a user is able to control the intensities of the lighting fixtures to approximately full intensity (e.g., approximately 100%) in response to actuations of the toggle actuators 214 and the intensity adjustment actuators 216 of the dimmer switches 736, 737.

The electronic switches 716, 726, 727 and the dimmer switch 736, 737 are operable to exit the standard demand response mode in response to receiving the normal mode from the broadcast controller 780. If the offices 710, 720, 730 are unoccupied when the electronic switches 716, 726, 727 and the dimmer switch 736, 737 receive the normal mode, the lighting fixtures 712, 713, 722, 723, 732, 733 remain off. If the second office 720 is occupied when the electronic switch 726 controlling the lighting fixture 722 closest to the window 721 receives the normal mode, the electronic switch turns the lighting fixture 722 on. If the third office 730 is occupied when the dimmer switches 736, 737 receive the normal mode, the dimmer switches slowly increase the intensities of the lighting fixtures 732, 733 by the predetermined load shed percentage over the predetermined amount of time. Alternatively, the electronic switches 716, 726, 727 and the dimmer switch 736, 737 could not adjust the present state of the lighting fixtures 712, 713, 722, 723, 732, 733 when exiting the standard demand response mode.

When the electronic switches 716, 726, 727 receive the emergency demand response mode from the broadcast controller 780, the electronic switches turn off the respective lighting fixtures 712, 713, 722, 723 since the first and second offices have the windows 711, 721 for allowing daylight to enter the offices. During the emergency demand response mode, the electronic switches 716, 726, 727 do not turn the lighting fixtures 712, 713, 722, 723 back on in response manual actuations of the buttons of the electronic switches or in response to digital messages received from the occupancy sensors 718, 728. When the dimmer switches 736, 737 receive the emergency demand response mode from the broadcast controller 780, the dimmer switches immediately control the intensities to a predetermined minimum load shed intensity (e.g., approximately 10%). During the emergency demand response mode, intensities of the lighting fixtures 732, 733 are not able to be raised above the predetermined minimum load shed intensity. The dimmer switches 736, 737 are able to turn the lighting fixtures 732, 733 on to the predetermined minimum load shed intensity in response to receiving an occupied command from the occupancy sensor 738, and to turn the lighting fixtures off in response to receiving a vacant command from the occupancy sensors. Alternatively, the dimmer switches 736, 737 may be locked out during the emergency demand response mode, such that the intensities of the lighting fixtures 732, 733 cannot be adjusted by actuating of the toggle actuators 214 and the intensity adjustment actuators 216 of the dimmer switches.

If the offices 710, 720, 730 are unoccupied when the electronic switches 716, 726, 727 and the dimmer switch 736, 737 receive the normal mode from the broadcast controller 780, the lighting fixtures 712, 713, 722, 723, 732, 733 remain off. In response to receiving the normal mode from the broadcast controller 780 when the offices 710, 720, 730 are occupied, the electronic switches 716, 726, 727 turn the respective lighting fixtures 712, 713, 722, 723 on and the dimmer switches 736, 737 immediately control the intensities of the lighting fixtures 732, 733 to the intensities to which the lighting fixtures were controlled before entering the emergency demand response mode.

Each energy controller may be associated with the broadcast controller 180 by actuating a button on the energy controller until the energy controller enters an association mode, and then actuating one of the buttons 194 on the broadcast controller. The specific button 194 that is actuated on the broadcast controller 180 determines the resulting functionality of the energy controller, e.g., if the energy controller is or is not responsive to the standard demand response mode and the emergency demand response mode. For example, the buttons 194 of the broadcast controller 180 may comprise a standard demand response button and an emergency demand response button. The algorithms defining the operation of the electronic switches 716, 726, 727 and the dimmer switches 736, 737 in the standard demand response mode and in the emergency demand response mode are stored in each of the devices.

As discussed above, the operation of the electronic switch 716 in the first office 710 is not affected during the standard demand response mode, but is adjusted during the emergency demand response mode. Therefore, to associate the electronic switch 716 with the broadcast controller 180, the user removes the broadcast controller from the base 192 and walks to the electronic switch 716 in the first office 710. The user presses and holds the toggle actuator of the electronic switch 716 until a visual indicator on the electronic switch begins to blink, and then presses and holds the emergency demand response button on the broadcast controller 180 until the broadcast controller flashes one of the visual indicators 196 and generates an audible sound. Accordingly, the electronic switch 716 is now associated with the broadcast controller 180 and will only respond to the emergency demand response mode. Similarly, the electronic switch 726 of the second office 720 does not response to the standard demand response mode, but responds to the emergency demand response mode, and is thus programmed in a similar fashioned as the electronic switch 716 of the first office 710.

However, the operation of the other electronic switch 727 of the second office 720 is adjusted during both the standard demand response mode and the emergency demand response mode. To associate the electronic switch 772 with the broadcast controller 180, the user presses and holds the toggle actuator of the electronic switch 727, and then presses and holds the standard demand response button on the broadcast controller 180 until the association is completed. The user then repeats the process for the emergency demand response button, i.e., by pressing and holding the toggle actuator of the electronic switch 727, and then pressing and holding the emergency demand response button on the broadcast controller 180. The dimmer switches 736, 737 are also responsive to both demand response modes, and are therefore each programmed in a similar manner as the electronic switch 727.

According to a third embodiment of the present invention, the broadcast controller 180 may be operable to transmit more than just two different demand response modes to the energy controllers of the independent units 110, 112. For example, the broadcast controller 180 could be operable to transmit one of a plurality of tiered demand response modes (such as "condition yellow," "condition orange," and "condition red" demand response modes) to the energy controllers. The tiered demand response modes may provide increasing amounts of load reduction with the condition yellow demand response mode providing a minimum level of load shedding and the condition red demand response mode providing a maximum (i.e., most extreme) level of load shedding. The broadcast controller 180 may be operable to automatically cause the energy controllers to enter one of the tiered demand response modes in response to communications received from the electrical utility 183 or the aggregator. For example, the broadcast controller 180 may receive one of the condition yellow, orange, and red demand response modes directly from the communications received from the electrical utility 183 or the aggregator.

In addition, the broadcast controller 180 may be operable to automatically cause the energy controllers to enter one of the tiered demand response modes in response to time-of-day pricing information received from the electrical utility 183 or the aggregator. For example, the broadcast controller 180 may be operable to enter one of the tiered demand response modes (e.g., the condition yellow demand response mode) if the electricity price exceeds a pricing threshold (which may be set by the user). Alternatively, the broadcast controller 180 may be operable to enter the condition yellow demand response mode during the times of the day when the time-of-day pricing is typically the highest, for example, in response to a timeclock event programmed by the user.

Further, the broadcast controller 180 may be operable to automatically cause the energy controllers to enter one of the tiered demand response modes using a peak demand charge management procedure. For example, the broadcast controller 180 may be operable to enter one of the tiered demand response modes (e.g., the condition yellow demand response mode) if the total power consumption (as measured by one or more power meters) exceeds a peak power threshold (which may be set by the user). Alternatively, the broadcast controller 180 may be operable to enter the condition yellow demand response mode during the times of the day when the total power consumption is typically the highest, for example, in response to a timeclock event programmed by the user.

According to the third embodiment of the present invention, the energy controllers of the independent units 110, 112 may be assigned to different groups (e.g., hallways, offices, outside lights, always on, etc.), which represent the different types of areas in a building that may be controlled in different fashions in the tiered demand response modes. The energy controllers may be assigned to a group when the energy controllers are assigned to the broadcast controller 180 as part of the configuration procedure of the load control system 100 (as described above). During the configuration procedure, the broadcast controller 180 may transmit an appropriate group address to the energy controller being assigned to the broadcast controller and the energy controller stores the group address in memory. After the configuration procedure, the broadcast controller 180 transmits digital messages to the different groups using the respective group addresses, and the energy controllers respond to digital messages including their group address. In addition, the load control system 100 could comprise additional broadcast controllers 180 coupled to the network 182 to allow the system to have additional demand response groups. The use of groups allows the broadcast controller 180 to be easily associated with the energy controllers, thus providing a short commissioning time to add the global functionality that is provided by the broadcast controller.

The operating characteristics of the various demand response modes may be monitored and configured using the tablet 185. FIGS. 10A-10C show example screenshots 800, 802, 804 of a management view screen that may be served up by the broadcast controller 180 and displayed on the tablet 185 to allow a user to monitor the actions that will take place when the condition yellow, orange, and red demand response modes, respectively, are selected. Specifically, one of the yellow, orange, and red demand response modes may be selected by clicking on the appropriate tab 810. Each screenshot 800, 802, 804 displays a table having a left column 812 of types of energy controllers and a top row 814 of the different groups to which the energy controllers may be assigned. Each entry in the table shows how the different types of energy controllers in each of the groups respond during one of the condition yellow, orange, and red demand response modes. For example, the dimmer switches in the hallways will dim the controlled lighting loads by a demand response setback of 30% over a fade time of one minute when the condition yellow demand response mode is selected as shown in FIG. 10A. In addition, the management view screen includes tabs 810 to display how the different types of energy controllers in each of the groups respond to time-of-day pricing information or using peak demand charge management.

In addition, the tablet 185 may display configuration screens (not shown) to allow the user to configure and adjust the values of the operating characteristics of the condition yellow, orange, and red demand response modes. For example, the user may adjust the demand response setback and the fade time according to which the dimmer switches in the hallways will dim the controlled lighting loads in the condition yellow demand response mode. In addition, the user may be able to select which of the condition yellow, orange, or red demand response modes are selected when the electricity price from the time-of-day pricing information exceeds the pricing threshold or when the total power consumption exceeds the peak power threshold in the peak demand charge management procedure. After configuring the operating characteristics, the tablet 185 transmits the new operating characteristics to the broadcast controller 180, which in turn transmits digital messages including the new operating characteristics to the energy controllers of the independent units 110, 112. The energy controllers all have their device type and their group address stored in memory, such that only the appropriate energy controllers update their operating characteristics.

The management view screen includes also a tuning tab 816. FIG. 10D shows an example screenshot 806 of a tuning screen that may be displayed on the tablet 185 in response to the selection of the tuning tab 816. The tuning screen displays the maximum intensity $L_{MAX}$ of the dimmer switches and the plug-in load control devices for the different groups, e.g., 70% for the dimmer switches in the hallways. In addition, the tablet 185 may also display a tuning configuration screen (not shown) for adjusting the maximum intensity $L_{MAX}$ of the dimmer switches and the plug-in load control devices. The dimmer switches and plug-in load control devices will limit the present light intensity of the controlled lighting loads to the maximum intensity $L_{MAX}$ in response to actuations of the toggle actuator 214 and the intensity adjustment actuator 216. The tuning configuration screen may allow for adjustment of other operating characteristics and settings of the energy controllers other than just the maximum intensity $L_{MAX}$ of the dimmer switches and the plug-in load control devices, such as, for example, minimum intensities, preset intensities, setpoint temperatures, delay times, fade times, timeout periods, sensitivity settings for sensors, and daylighting thresholds. Tuning allows for easy adjustment of the operational characteristics and settings of the energy controllers to improve occupant comfort and satisfaction after the initial commissioning of the system. For example, the operational characteristics and settings of the energy controllers may be tuned yearly to reduce the energy consumption of the load control system 800. Alternatively, the operational characteristics and settings of the energy controllers may be tuned if the building has a new tenant or if the electrical utility 183 changes the demand response program.

The timeclock events of the broadcast controller 180 may be monitored and configured using the tablet 185 or other computing device. Alternatively, the management view screen of FIGS. 10A-10C and the tuning screen of FIG. 11 could be displayed on a smart phone, a personal computer, or other suitable computing device.

The broadcast controller 180 may be configured to obtain information (e.g., registration information, status information, operational information, configuration information, and/or relationship information, and the like) regarding the control devices of the independent units 110, 112 (such as the energy controller devices or commander devices). The broadcast controller 180 may communicate with any of the control devices that may be operable for two-way communication to determine a listing of what other control devices may be in operation in the respective first independent unit 110 and/or the second independent unit 112. For example, broadcast controller 180 may communicate with a first control device of independent unit 110 that may be operable for two-way communication to obtain a listing of other control devices of independent unit 110 of which the first control device may be aware. Also by way of example, broadcast controller 180 may communicate with a first control device of independent unit 112 that may be operable for two-way communication to obtain a listing of other constituent devices of independent unit 112 of which the first control device may be aware.

In one or more embodiments, broadcast controller 180 may obtain relationship information regarding the control devices of the first independent unit 110 and/or the second independent unit 112. For example, a first control device of the first independent unit 110 may be configured to monitor and respond to second control device of the first independent unit 110. The second constituent device may be configured to control a third control device of the first independent unit 110 in response to how the second constituent device interprets the signals received from the first constituent device. Broadcast controller 180 may obtain the interrelationship information regarding the first, second, and third constituent devices of the first independent network 110 by interrogating one or more control devices (that may include the first, second, or third constituent devices) of independent unit 110 that may be operable for two-way communication. Broadcast controller 180 may obtain such interrelationship information from the one or more control devices of independent unit 110 even though those one or more control devices may themselves not be aware of the particular interrelationships of the first, second, and third constituent devices.

In some embodiments, one or more of the control devices of the first independent unit 110 and/or the second independent unit 112 may be transmit-only devices. With regards to what may be transmit-only control devices (or nodes) of the first independent unit 110 and/or the second independent unit 112, the broadcast controller 180 may learn what other devices (or nodes) of the respective independent units 110, 112 may be configured to listen to and/or to monitor particular transmit-only devices, and like interrelationships of transmit-only control devices.

According to an alternate embodiment of the present invention, the broadcast controller 180 may be operable to be associated with all of the control devices (i.e., the commanders and the energy controllers) of one of the independent units 110, 112 in response to an actuation of a button on only one of the control devices of the respective independent unit. For example, when the broadcast controller 180 is in the association mode, the broadcast controller 180 may be operable to execute an independent unit association procedure in response to the actuation of the toggle actuator 214 of the dimmer switch 210, the on button 252 of the remote control 250, or any other button of any of the control devices of the first independent unit 110. During the independent unit association procedure (i.e., in response to the press of one button of one control device in the independent unit), the broadcast controller 180 is operable to discover all of the commanders (i.e., the remote controller 250, the occupancy sensor 260, and the temperature sensor 270) and all of the energy controllers (the dimmer switch 210, the plug-in load control device 220, the temperature control device 230, and the CCO pack 240), and to associate all of the discovered energy controllers with itself. Accordingly, all of the energy controllers of an independent unit are operable to be associated with the broadcast controller 180 in response to a single press of a button on any of the commanders and energy controllers of that independent unit.

FIGS. 11A-11F illustrate the independent unit association procedure executed by the broadcast controller 180. For example, as shown in FIGS. 11A-11F, the broadcast controller 180 may be operable to discover the control devices of the independent unit 4001 of FIG. 5. As described with regard to FIG. 5, the independent unit 4001 includes the first and second remote controls 4050, 4052, the occupancy sensor 4060, and the daylight sensor 4070, which may function as commanders. The independent unit 4001 also includes the dimmer switch 4010 and the motorized window treatment 4020, which may function as energy controllers. The dimmer switch 4010 is responsive to the first and second remote controls 4050, 4052, the occupancy sensor 4060, and the daylight sensor 4070 and stores the serial numbers of these commanders in memory. The motorized window treatment 4020 is responsive to the daylight sensor 4070 and the second remote control 4051 and stores the serial numbers of these commanders in memory. The first and second remote controls 4050, 4052, the occupancy sensor 4060, and the daylight sensor 4070 only transmit RF signals, and are not aware of which of the energy controllers which are responsive to them.

Figure 11A:
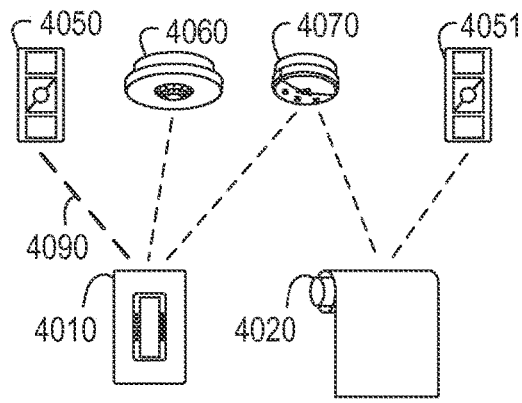
FIGS. 11A-11F illustrates an exemplary technique of a broadcast controller discovering the constituent devices of an independent unit consistent with embodiments.
Figure 11D:
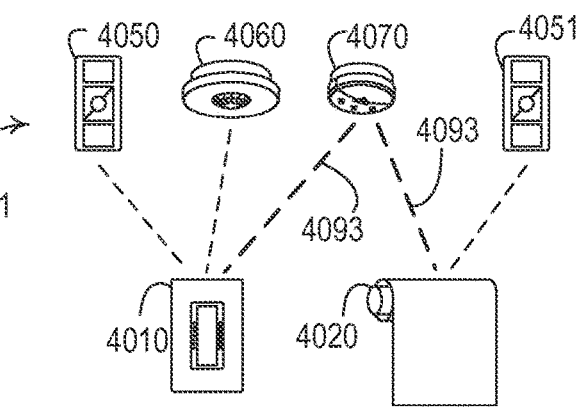
Figure 11B:
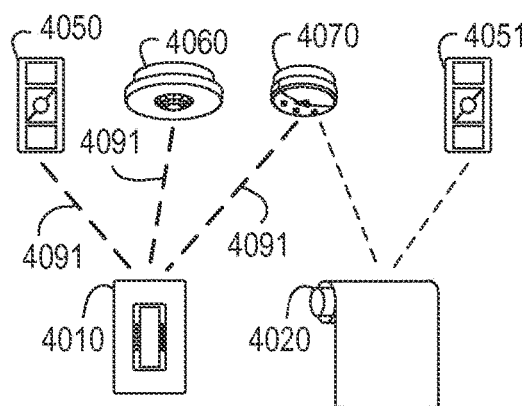

To associate the broadcast controller 180 with all of the energy controllers of the independent unit 4001 using the independent unit association procedure, a user may actuate one of the buttons of the first remote control 4050 while the broadcast controller is in the association mode. In response to an actuation of the button of the remote control 4050, the remote control 4050 is operable to transmit a digital message including the serial number of the remote control to the dimmer switch 4010. The broadcast controller 180 is also operable to receive the digital message having the serial number of the remote control 4050 while in the association mode. The broadcast controller 180 may then transmit a query message to all of the energy controllers in the load control system 100 to determine which energy controllers are responsive to the remote control 4050 (as identified by the serial number from the received digital message), i.e., the identity of energy controllers for which the remote control 4050 may be configured to serve as a commander. In the example of FIG. 11A, the broadcast controller 180 discovers that the remote control 4050 is configured to serve as a commander for the dimmer switch 4010 as shown by line 4090. In response to the query message, the dimmer switch 4010 is operable to transmit a digital message including the serial number of the dimmer switch to the broadcast transmitter 180. The broadcast controller 180 may then transmit a query message to the dimmer switch 4010 to determine the identity of commanders that may be configured to command the dimmer switch 4010. In the example of FIG. 11B, the broadcast controller 180 discovers that the remote control 4050, the occupancy sensor 4060, and the daylight sensor 4070 are configured to serve as commanders for the dimmer switch 4010 as shown by lines 4091.

Figure 11E:
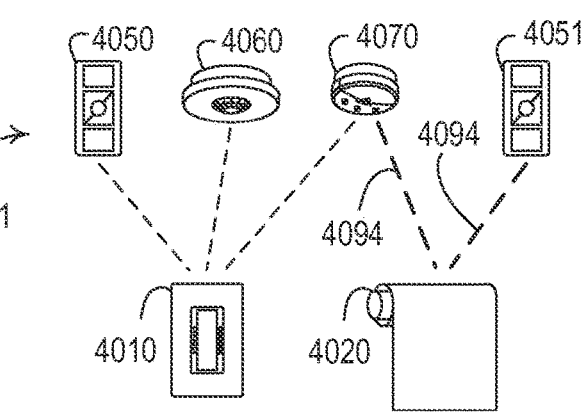
Figure 11C:
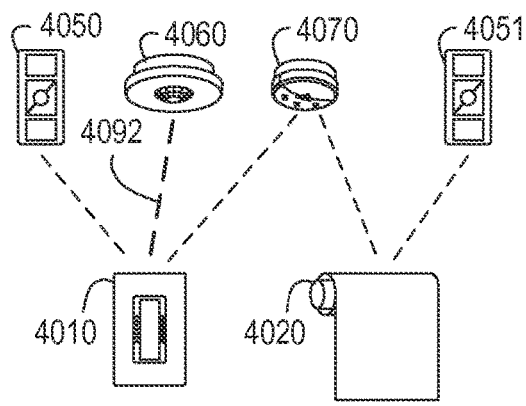

The broadcast controller 180 may next transmit a query message to all of the energy controllers in the load control system 100 to determine which energy controllers are responsive to the occupancy sensor 4060, i.e., the identity of the energy controllers for which the occupancy sensor 4060 may be configured to serve as a commander. In the example of FIG. 11C, the broadcast controller 180 discovers that the occupancy sensor 4060 is configured to serve as a commander for the dimmer switch 4010 as an energy controller as shown by line 4092. The broadcast controller 180 may then transmit a query message to all of the energy controllers in the load control system 100 to determine which energy controllers are responsive to the daylight sensor 4070, i.e., the identity of the energy controllers for which the daylight sensor 4070 may be configured to serve as a commander. In the example of FIG. 11D, the broadcast controller 180 discovers that the daylight sensor 4070 is configured to serve as a commander for the dimmer switch 4010 and for the motorized window treatment 4020 as shown by lines 4093.

Figure 11F:
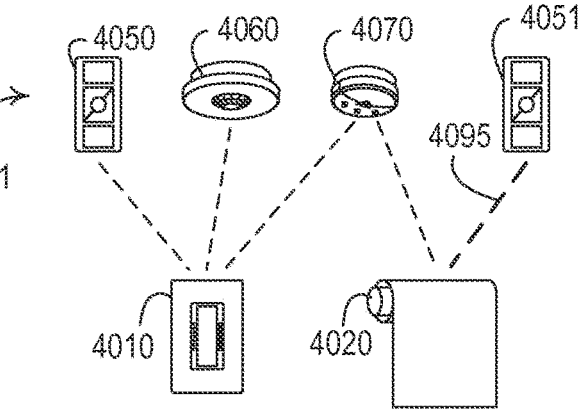

Since there are no more commanders to which the dimmer switch 4010 is responsive, the broadcast controller 180 may now transmit a query message to the motorized window treatment 4020 to identity of commanders that may be configured to command the motorized window treatment 4020. In the example of FIG. 11E, the broadcast controller 180 discovers that the second remote control 4051 and the daylight sensor 4070 are configured to serve as commanders for the motorized window treatment 320 as shown by lines 4094. Because the broadcast controller 180 already transmitted a query message to determine which energy controllers are responsive to the daylight sensor 4070 (as shown in FIG. 11D), the broadcast controller 180 may now transmit a query message to all of the energy controllers in the load control system to determine which energy controllers are responsive to the second remote control 4051, i.e., the identity of the energy controllers for which the second remote control 4051 may be configured to serve as a commander. In the example of FIG. 11F, the broadcast controller 180 discovers that the second remote control 351 is configured to serve as a commander for only the motorized window treatment 4020 as shown by line 4095.

Since there are no more energy controllers that are responsive to the first and second remote controls 4050, 4052, the occupancy sensor 4060, and the daylight sensor 4070, the broadcast controller 180 may then conclude that there are no more energy controllers or commanders to discover in the independent unit 4001. The broadcast controller 180 may transmit digital messages to the dimmer switch 4010 and the motorized window treatments 4020 to associate these energy controllers with the broadcast controller, and then may end the independent unit association procedure. During normal operation, the broadcast controller 180 may receive all RF signals transmitted by the energy controllers and commanders of the independent unit 4001. By performing one or more of the polling techniques illustrated in FIGS. 11A-11F, the broadcast controller 180 may obtain a comprehensive understanding of the identities of the constituent elements of the independent unit 4001 as well as the relationships that may exist among the various constituent elements (e.g., commander of an energy controller or an energy controller commanded by a commander, etc.).

Alternatively, the independent unit association procedure could be initiated by actuating a button on one of the energy controllers, e.g., the dimmer switch 4010. In this case, the broadcast controller 180 would first query the dimmer switch 4010 to discover that the remote control 4050, the occupancy sensor 4060, and the daylight sensor 4070 are configured to serve as commanders for the dimmer switch as shown by line 4091 in FIG. 11B. Then the broadcast controller 180 would transmit a query message to all of the energy controllers in the load control system 100 to determine which energy controllers are responsive to the remote control 4050 (as shown in FIG. 11A), the occupancy sensor 4060 (as shown in FIG. 11C), and the daylight sensor 4070 (as shown in FIG. 11D). The independent unit association procedure would continue as described above until all of the commanders and energy controllers of the independent unit 4001 were discovered.

In some embodiments, at least two of the one or more energy controllers, which may be respectively associated with two different independent units, may be arranged into a first group. The broadcast controller 180 may be further configured to associate a user-defined label with the first group. The user-defined label may be at least one of hallway, conference room, office, executive office, bathroom, open office, signage, limited access, or public area, for example. The broadcast controller 180 may be further configured to determine a first condition, where the first condition may correspond to one or more operations of which the one or more energy controllers arranged into the first group may be operable to perform. The broadcast controller 180 may also be configured to transmit a command signal to the first group address associated with the first group. The command signal may be interpretable by the one or more energy controllers arranged into the first group to perform at least one of the one or more operations. The one or more energy controllers that may be arranged into the first group may be configured to prioritize the command signal over the control signal received from the at least one commander. The at least one user-defined characteristic may be at least one of a location, a typical occupancy level, a time-of-day occupancy level, a security access level, a functional use, or an organizational hierarchy.

In some embodiments, the broadcast controller 180 may be configured to receive a first signal, where the first signal may indicate a first condition corresponding to one or more operations of which the at least one energy controller may be operable to perform. The broadcast controller 180 may also be configured to transmit a second signal to the at least one energy controller. The second signal may be interpretable by the at least one energy controller to perform at least one of the one or more operations. And the at least one energy controller may be configured to prioritize the second signal over the control signal received from the at least one commander. The broadcast controller 180 may receive the first signal from at least one of an electric utility or a remote control device. The first condition may correspond to more or more demand response compliance requirements.

The broadcast controller 180 may be further configured to arrange one or more of the respective energy controllers into a second group according to a second at least one user-defined characteristic of the one or more respective energy controllers. The broadcast controller 180 may be configured to assign a second group address to the one or more respective energy controllers arranged into the second group. Also, the broadcast controller 180 may be configured to transmit the second group address to the one or more respective energy controllers arranged into the second group.

The broadcast controller maybe further configured to determine a second condition that may correspond to at least one timeclock schedule and one or more functions of which the at least one energy controller may be operable to perform. The broadcast controller may also be configured to transmit a third signal to the at least one energy controller. The third signal may be interpretable by the at least one energy controller to perform the one or more functions.

Figure 12:
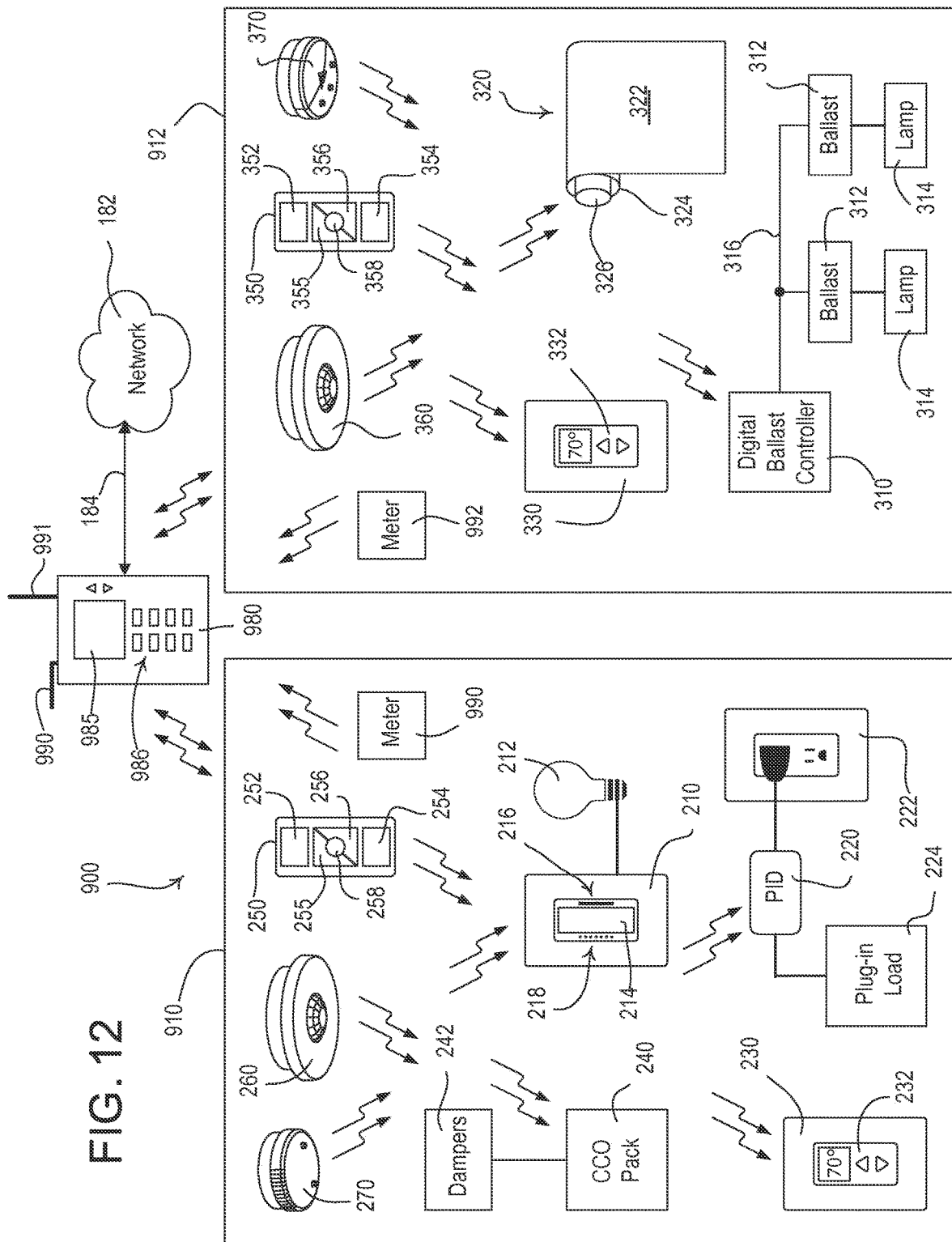
FIG. 12 is a simple diagram of a load control system comprising two independent units (e.g., sub-systems) and a broadcast controller according to a fourth embodiment of the present invention.

FIG. 12 is a simple diagram of a load control system 900 comprising two independent units 910, 912 and a broadcast controller 980 according to a fourth embodiment of the present invention. As shown in FIG. 12, the broadcast controller 980 comprises a user interface having a visual display 985, such as a liquid-crystal display (LCD) screen, and a plurality of buttons 986. The broadcast controller 980 comprises antennas 990, 991 that are orthogonally oriented with respect to each other and spaced apart for polar and spatial diversity. The broadcast controller 980 may comprise two RF transceivers coupled to the respective antennas 990, 991 (as in the broadcast controller 180 shown in FIG. 7A), or may comprise a single RF transceiver coupled to both of the antennas 990, 991 via an RF switch (as in the broadcast controller 180" shown in FIG. 7B). As in the first embodiment of the present invention, the broadcast controller 980 is operable to both transmit digital messages to and receive digital messages from the commanders and energy controllers of the independent units 910, 912. The broadcast controller 980 may be operable to collect and log data from the commanders and energy controllers of the independent units 910, 912 of the load control system 900.

The commanders and the energy controllers of the independent units 910, 912 may be associated with the broadcast controller 980 during the configuration procedures of each of the independent units. The broadcast controller 980 is placed into the association mode in response to the actuation of one of the buttons 986, and repetitively transmits out a broadcast address when in the association mode. While the broadcast controller 980 is in the association mode, an actuator on each of the commanders and energy controllers of the independent units 910, 912 may be actuated to associate the devices with the broadcast controller. In addition to the commanders and energy controllers saving the broadcast address received from the broadcast controller, the commanders and energy controllers each also transmit a unique address to the broadcast controller 980, which maintains a list of the commanders and energy controllers that are associated with the broadcast controller. The broadcast controller 980 is operable to store the programming and configuration information of the commanders and energy controllers of the independent units 910, 912 to provide for easy device replacement. The energy controllers of the independent units 910, 912 could be assigned to one or more of a plurality of groups of energy controllers by the broadcast controller 980.

The broadcast controller 980 is operable to control the energy controllers of the independent units 910, 912 in response to one or more timeclock schedules. The broadcast controller 980 may define a default timeclock schedule for each of the energy controllers that are associated with the broadcast controller in dependence upon the type of energy controller and the type of electrical load being controlled. In addition, the timeclock schedules may be adjusted using the user interface of the broadcast controller 980. For example, the broadcast controller 980 could display information regarding one or more of the energy controllers on the visual display 985. The user could step through each of the energy controllers and enable or disable timeclock events for the selected energy controller using the buttons 986. Alternatively, the timeclock schedules of the broadcast controller 980 could be programmed using a program running on a computing device (such as a tablet, a smart phone, a personal computer, or a laptop) connected to the network 182. For example, the data of the timeclock schedules could be loaded onto a removable memory (such as a USB flash drive), which could then be plugged into the broadcast controller 980 to load the timeclock schedules into memory on the broadcast controller. In addition, the timeclock schedules could be configured using a PC, laptop, smart phone, or tablet connected to the cloud server via the network 182.

Figure 13:
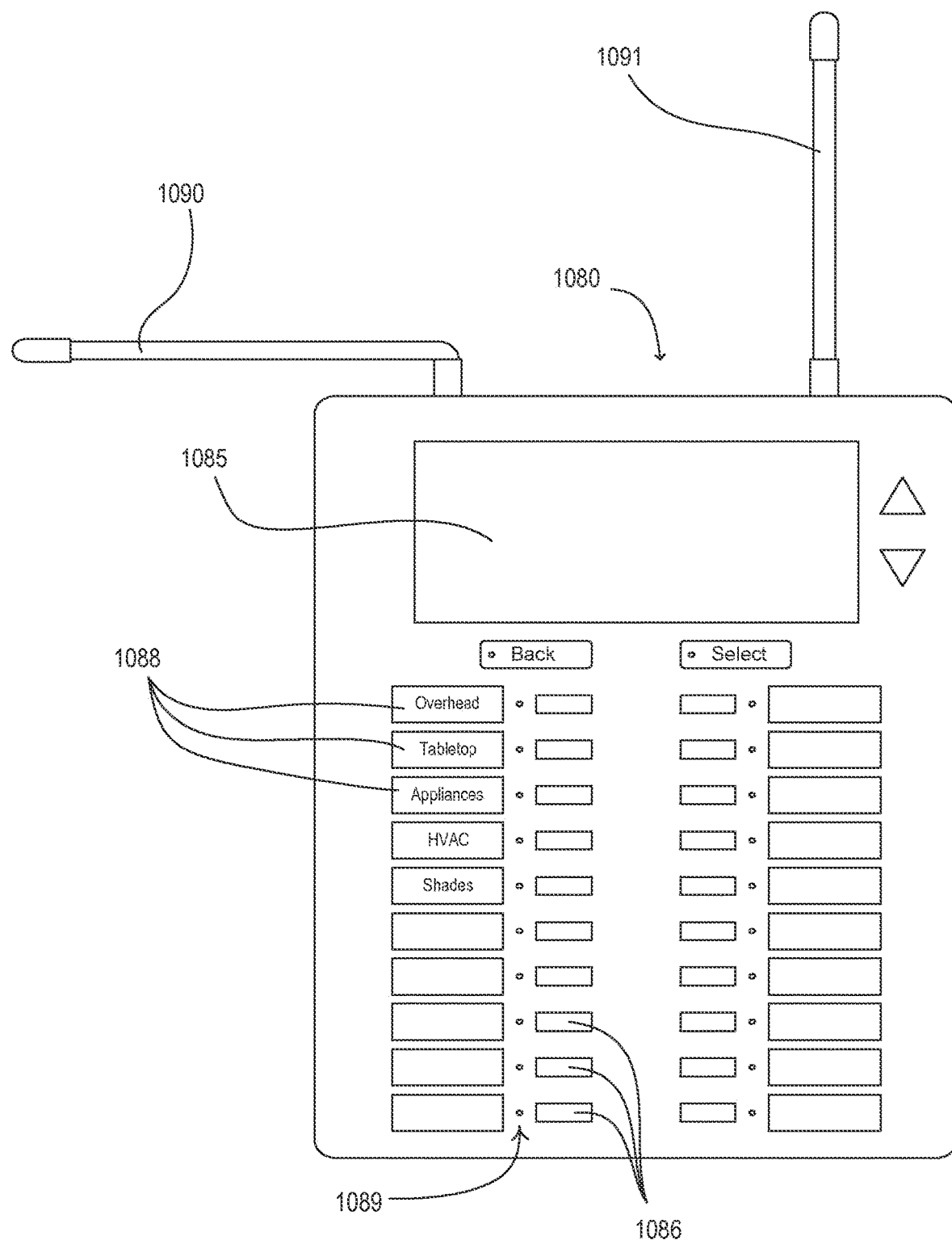
FIG. 13 is a simplified front view of a user interface of a broadcast controller according to the fourth embodiment of the present invention.

FIG. 13 is a simplified diagram of a broadcast controller 1080 according to an alternate embodiment of the present invention. The broadcast controller 1080 comprises a visual display 1085 and a plurality of group buttons 1086. A respective label 1088 and a respective light-emitting diode (LED) 1089 are located adjacent each of the group buttons 1086. The labels 1088 may note the name of the group associated with the adjacent group buttons 1086. The broadcast controller 1080 is placed into a group association mode when one of the group buttons 1086 is pressed and held for a predetermined amount of time. One or more of the energy controllers may be associated with the broadcast controller 1080 and may be assigned to the respective group in response to the actuation of an actuator on the energy controller while the broadcast controller 1080 is in the group association mode. This association procedure may be repeated for each of the group buttons 1086. A single energy controller may be assigned to multiple groups of energy controllers. The LEDs 1089 may be illuminated to indicate the groups to which an energy controller is assigned. The use of groups allows the broadcast controller 1080 to be easily associated with the energy controllers to provide a short commissioning time that is required to add the global functionality that is provided by the broadcast controller. After the energy controllers are assigned to the various groups represented by the group buttons 1086, the timeclock schedules of the broadcast controller 1080 may be configured on a group-by-group basis. In one or more embodiments, the broadcast controller 1080 utilizes two orthogonally-oriented antennas 1090, 1091.

Figure 14:
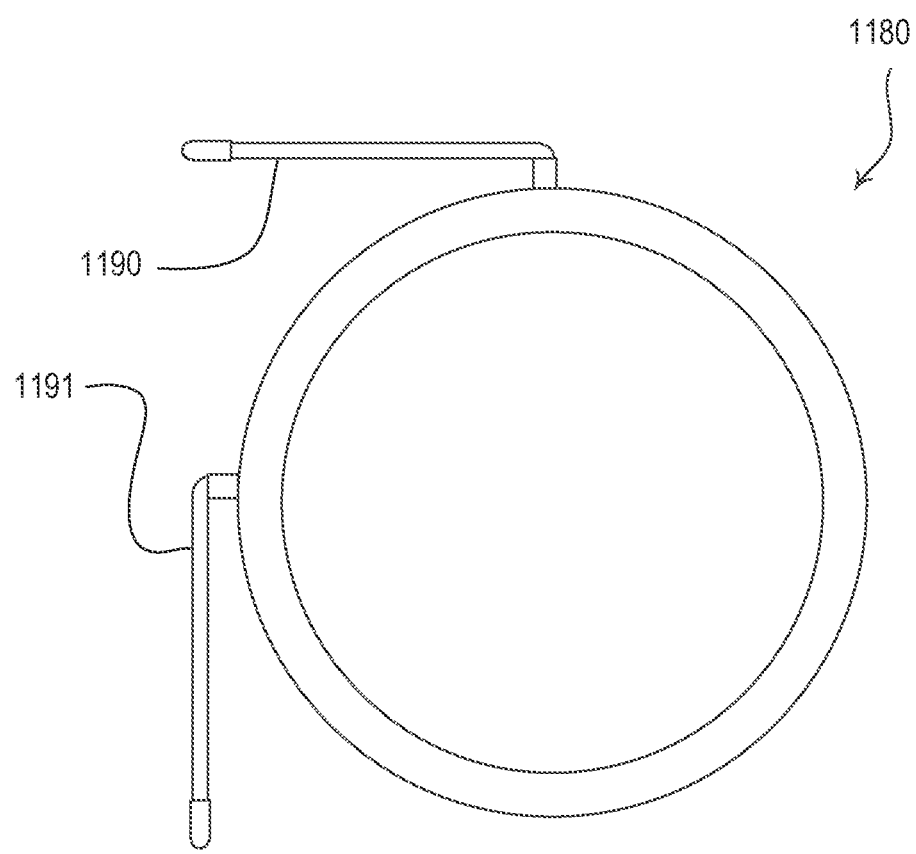
FIG. 14 is a simplified front view of a user interface of a broadcast controller according to an alternate embodiment of the present invention.

FIG. 14 illustrates a simplified diagram of a broadcast controller 1180 according to an alternate embodiment of the present invention. Broadcast controller 1180 may perform the same or similar functions as those described for the broadcast controllers 980 and/or 1080. In one or more embodiments, broadcast controller 1180 may have a visual display (not shown) similar to the visual display of broadcast controller 1180. In one or more embodiments, the broadcast controller 1180 utilizes two orthogonally-oriented antennas 1190, 1191.

Referring back to FIG. 12, the load control system 900 further comprises respective power meters 990, 992 in each of the independent units 910, 912. The power meters 990, 992 may be electrically coupled to measure a total current drawn by (and thus the power consumed by) the various electrical loads of the respective independent units 910, 912. The power meters 990, 992 may be associated with the broadcast controller 980 and may be operable to transmit data regarding the total power consumptions of the electrical loads in the independent units 910, 912 to the broadcast controller in response to queries transmitted by the broadcast controller. The broadcast controller 980 may be operable to store the data regarding the power consumption of the loads in memory, to display the power consumption of the loads on the visual display 985, or to transmit digital messages including the data regarding the power consumption of the loads to the cloud server via the network 182. In addition, one or more of the energy controllers may comprise internal power metering circuitry for determining the power presently being consumed by the respective electrical load, which can also be transmitted to the broadcast controller 980. Further, the broadcast controller 980 may be operable to store other data regarding the operation of the load control system 900 in memory, for example, occupancy information and status as transmitted by the occupancy sensors 260, 360.

The broadcast controller 980 (and/or the broadcast controllers 1080, 1180) may obtain information regarding any of the control devices of the first and/or second independent units 910, 912. As part of that acquired information, the broadcast controller 980 may obtain status information and/or operational parameters from one or more of the control devices of the first independent unit 910 and/or the second independent unit 912. The status information and/or operational parameters may depend on the particular control device, but generally may include: battery hours consumed, electrical load data (e.g., consumed power, load impedance, open load circuit detection, failed lamp), variable set point to measured variable differential (e.g., the difference between the temperature setting and the measured temperature), contact closure status, set point for electrical load intensity, actual electrical load intensity, ballast status, smoke detection status, occupancy status, shade extension (e.g., shade fully extended, half extended, fully retracted, and the like), PID status, controller activation status, damper status (e.g., 0%, 50%, 100%, or the like), among others.

In one or more embodiments, as part of that acquired information, the broadcast controller 980 may obtain (and/or adjust) configuration parameters from one or more of the control devices of the first independent unit 910 and/or the second independent unit 912. The configuration parameters may depend on the particular control device, but generally may include: variable set point (e.g., temperature set point), contact closure set point, set point for electrical load intensity, shade extension set point (e.g., extended shade fully, half extended, fully retracted, and the like), PID parameters, controller parameters, damper set points (e.g., 0%, 50%, 100%, or the like), among others.

In some embodiments, a system operator may use the status information or operational parameters to determine what control devices of the first independent unit 910 and/or the second independent unit 912 may require maintenance and/or replacement, for example. Also, the system operator may configure the one or more configurable parameters of the respective control devices of the first independent unit 910 and/or the second independent unit 912 via the broadcast controller 980. For example, the system operator may use a laptop or other computing device to communicate with the broadcast controller 980 (for example via a USB, Ethernet, and/or Wi-Fi connection) to interface with the status information, operational parameters, and/or configuration parameters.

In some embodiments, an energy controller may be released from its obligation to accept (or prioritize) signals or commands from the broadcast controller over the signals or commands from the energy controller's commander in a variety of ways. For example, in some embodiments, the broadcast controller may command the energy controller into the normal mode. Also by way of example, the energy controller may revert to accepting (or prioritizing) its commander's signals or commands after some time (e.g., predetermined period of time) after the broadcast controller commands the energy controller to accept (or prioritize) the broadcast controller's commands or signals. Again for example, the broadcast controller may transmit a "release" message (command or signal) to the energy controller that the energy controller may interpret as an authorization to resume accepting (or prioritizing) the commands or signals sent by the energy controller's commander. Also, in some embodiments, the energy controller may be configured to resume accepting (or prioritizing) the energy controller's commander's commands or signals after the energy controller finishes performing a function (e.g., a timeclock-based function) commanded by the broadcast controller.

In other words, an energy controller may be updated so that the energy controller may resume accepting (or prioritizing) the commands or signals from the energy controller's commander via one or more of the aforementioned mechanisms. For example, at a predetermined time after the broadcast controller commands the energy controller to perform a timeclock-based function (e.g., the energy controller accepts or prioritizes the command from the broadcast controller to perform the function), the energy controller may resume accepting (or prioritizing) the commands or signals of the energy controller's commander.

In some embodiments, one or more methods that may be performed by a broadcast controller to acquire information about the constituent nodes (or devices) of one or more independent units. In one or more embodiments, the broadcast controller may be in communication with one or more independent units. Some or each of the one or more independent units may include one or more commanders and one or more energy controllers. The broadcast controller may communicate with a first node of a first independent unit, where the first node may be at least one of a first commander or a first energy controller. The broadcast controller may obtain an address of the first node. Also, the broadcast controller may obtain from the first node an address of at least one second node of the first independent unit. The at least one second node may be at least one of a second commander or a second energy controller and the at least one second node may be in communication with the first node. The broadcast controller may determine if at least one of the first node or the at least one second node is an energy controller. Also, the broadcast controller may identify at least one of the first node or the at least one second node as an energy controller according to the determination. Additionally, the broadcast controller may identify at least one of the address of the first node or the address of the at least one second node as an energy controller address according to the determination.

In some embodiments, the broadcast controller may determine an operational relationship between the first node and the at least one second node. Further, the broadcast controller may determine if the first node communicates with a node of the first independent unit other than the at least one second node. The broadcast controller may communicate with the at least one second node. Also, the broadcast controller may determine if the at least one second node communicates with a node of the first independent unit other than the first node. The broadcast controller may determine that all of the nodes of the first independent unit have been identified upon the determinations indicating that the first node may communicate with no other nodes other than the at least one second node and/or the at least one second node may communicate with no other nodes other than the first node, for example.

The broadcast controller may communicate with the at least one second node. The broadcast controller may also obtain an address of at least one third node of the first independent unit from the at least one second node. The at least one third node may be at least one of a third commander or a third energy controller. Also, the at least one third node may be in communication with the at least one second node. The broadcast controller may determine if the at least one third node is an energy controller. Further, the broadcast controller may identify the at least one third node as an energy controller according to the determination.

Additionally, the broadcast controller may identify the address of the at least one third node as an energy controller address according to the determination, for example.

In some embodiments, an energy controller (as described herein) may be operable to control at least one electrical load in response to a control signal received from at least one commander. In some embodiments, the energy controller may comprise a wireless communication transceiver. The wireless communication transceiver may be operable to receive a first signal from a broadcast controller. The first signal may include a request for information regarding one or more nodes of an independent unit that may include the energy controller. The wireless communication transceiver may also transmit a second signal to the broadcast controller in response to the first signal. The second signal may include the information regarding the one or more nodes of the independent unit. The information regarding the one or more nodes of the independent unit may include respective addresses of the one or more nodes. And the information regarding the one or more nodes of the independent unit may include an operational relationship between the energy controller and the one or more nodes.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electric load control system, comprising:
   a plurality of independent units, each of the plurality of independent units including:
      commander circuitry;
      energy controller circuitry to receive, via a first network, one or more commands from the commander circuitry, the one or more commands to adjust a parameter of one or more electric load devices operatively coupled to the energy controller circuitry; and
   broadcast controller circuitry to communicate, via the first network, with the commander circuitry and the energy controller circuitry in each of the plurality of independent units;
      wherein the broadcast controller circuitry to, for each of the plurality of independent units, cause the energy controller circuitry in the respective independent unit to enter one of a plurality of operating modes, in which the energy controller circuitry modifies the one or more commands received from the respective commander circuitry.

2. The electric load control system of claim 1 wherein the broadcast controller circuitry to further:
   receive, via a second network different from the first network, a request from an external system.

3. The electric load control system of claim 2 wherein to receive, via the second network, the command from the external system, the broadcast controller circuitry to further:
   receive, via the second network, a request from a utility supplier system.

4. The electric load control system of claim 3 wherein to receive, via the second network, the request from the utility supplier system, the broadcast controller circuitry to further:
   receive from the utility supplier system, a demand response request.

5. The electric load control system of claim 4 wherein, responsive to receipt of the demand response request from the utility supplier system, the broadcast controller circuitry to further:
cause the energy controller circuitry in each of the plurality of independent units to operate in a demand response mode in which the energy controller circuitry:
receives, from an input device communicatively coupled to the first network, an input indicative of a target power level for each of the one or more electric load devices operatively coupled to the energy controller circuitry;
retrieves, from operatively coupled memory circuitry, a first algorithm, wherein the first algorithm corresponds to the received demand response request;
determines a first power supply reduction to the one or more electric load devices operatively coupled to the energy controller circuitry using the first algorithm; and
reduces the target power level of power supplied to each of the one or more electric load devices operatively coupled to the energy controller circuitry by the determined first power supply reduction.

6. The electric load control system of claim 3 wherein to receive, via the second network, the request from the utility supplier system, the broadcast controller circuitry to further:
receive from the utility supplier system, an emergency demand response request.

7. The electric load control system of claim 6 wherein, responsive to receipt of the emergency demand response request from the utility supplier system, the broadcast controller circuitry to further:
cause the energy controller circuitry in each of the plurality of independent units to operate in a demand response mode in which the energy controller circuitry:
receives, from an input device communicatively coupled to the first network, an input indicative of a target power level for each of the one or more electric load devices operatively coupled to the energy controller circuitry;
retrieves, from operatively coupled memory circuitry, a second algorithm, wherein the second algorithm corresponds to the received emergency demand response request;
determines a first power supply reduction to the one or more electric load devices operatively coupled to the energy controller circuitry using the second algorithm; and
reduces the target power level of power supplied to each of the one or more electric load devices operatively coupled to the energy controller circuitry by the determined second power supply reduction.

8. An electric load control method, comprising:
receiving, by energy controller circuitry via a first network, one or more commands from commander circuitry, the one or more commands to cause the energy controller circuitry to adjust a parameter of one or more electric load devices operatively coupled to the energy controller circuitry; and
communicating, by broadcast controller circuitry via the first network, an instruction to cause the energy controller circuitry to enter one of a plurality of operating modes, in which the energy controller circuitry modifies the one or more commands received from the commander circuitry.

9. The electric load control method of claim 8, further comprising:
receiving, by the broadcast controller circuitry, a request from an external system via a second network different from the first network.

10. The electric load control method of claim 9 wherein receiving the receiving from the external system via the second network, further comprises:
receiving, by the broadcast controller circuitry, a request from a utility supplier system via the second network.

11. The electric load control method of claim 10 wherein receiving the request from the utility supplier via the second network further comprises:
receiving, by the broadcast controller circuitry, a demand response request from the utility supplier system.

12. The electric load control method of claim 11, further comprising, responsive to receipt of the demand response request from the utility supplier system:
causing, by the broadcast controller circuitry, the energy controller circuitry to operate in a demand response mode of operation;
receiving, by the energy controller circuitry from an input device communicatively coupled to the first network, an input indicative of a target power level for each of the one or more electric load devices operatively coupled to the energy controller circuitry;
retrieving, by the energy controller circuitry, a first algorithm from operatively coupled memory circuitry, wherein the first algorithm corresponds to the received demand response request;
determining, by the energy controller circuitry, a first power supply reduction to the one or more electric load devices operatively coupled to the energy controller circuitry using the first algorithm; and
causing, by the energy controller circuitry, a reduction in the target power level of power supplied to each of the one or more electric load devices operatively coupled to the energy controller circuitry by the determined first power supply reduction.

13. The electric load control method of claim 10 wherein receiving the request from the utility supplier via the second network further comprises:
receiving, by the broadcast controller circuitry, an emergency demand response request from the utility supplier system.

14. The electric load control method of claim 13, further comprising, responsive to receipt of the emergency demand response request from the utility supplier system:
causing, by the broadcast controller circuitry, the energy controller circuitry to operate in an emergency demand response mode of operation;
receiving, by the energy controller circuitry from an input device communicatively coupled to the first network, an input indicative of a target power level for each of the one or more electric load devices operatively coupled to the energy controller circuitry;
retrieving, by the energy controller circuitry, a second algorithm from operatively coupled memory circuitry, wherein the second algorithm corresponds to the received emergency demand response request;
determining, by the energy controller circuitry, a second power supply reduction to the one or more electric load devices operatively coupled to the energy controller circuitry using the second algorithm; and
causing, by the energy controller circuitry, a reduction in the target power level of power supplied to each of the one or more electric load devices operatively coupled to the energy controller circuitry by the determined second power supply reduction.

15. A non-transitory, machine-readable, storage device that includes instructions that, when executed by energy controller circuitry, cause the energy controller circuitry to:
  receive, via a first network, one or more commands from commander circuitry, the one or more commands to cause the energy controller circuitry to adjust a parameter of one or more electric load devices operatively coupled to the energy controller circuitry;
  receive, via the first network, one or more instructions from broadcast controller circuitry, the one or more broadcast controller circuitry instructions to cause the energy controller circuitry to enter one of a plurality of operating modes; and
  modify the one or more commands received from the commander circuitry responsive to entry of the energy controller circuitry into the one of the plurality of operating modes.

16. The non-transitory, machine-readable, storage device of claim 15 wherein the instructions that cause the energy controller circuitry to receive the one or more instructions from broadcast controller circuitry further cause the energy controller circuitry to:
  receive, via the first network, the one or more instructions from the broadcast controller circuitry responsive to a receipt, by the broadcast controller circuitry, of a request from an external system via a second network different from the first network.

17. The non-transitory, machine-readable, storage device of claim 16 wherein the instructions that cause the energy controller circuitry to receive the one or more instructions from broadcast controller circuitry, further cause the energy controller circuitry to:
  receive, via the first network, the one or more instructions from the broadcast controller circuitry, responsive to the receipt by the broadcast controller circuitry, of a request from a utility supplier system via the second network.

18. The non-transitory, machine-readable, storage device of claim 17 wherein the instructions that cause the energy controller circuitry to receive the one or more instructions from the broadcast controller circuitry, further cause the energy controller circuitry to:
  receive, via the first network, one or more demand response instructions from the broadcast controller circuitry responsive to the receipt, by the broadcast controller circuitry, of a demand response request from the utility supplier system.

19. The non-transitory, machine-readable, storage device of claim 18, wherein the instructions, when executed by the energy controller circuitry, further cause the energy controller circuitry to:
  responsive to receipt of the one or more demand response instructions from the broadcast controller circuitry:
    receive, from an input device via the first network, an input indicative of a target power level for each of the one or more electric load devices operatively coupled to the energy controller circuitry;
    retrieve, from operatively coupled memory circuitry, a first algorithm that corresponds to the received demand response request;
    determine a first power supply reduction to the one or more electric load devices operatively coupled to the energy controller circuitry using the first algorithm; and
    cause a reduction in the target power level of power supplied to the one or more electric load devices operatively coupled to the energy controller circuitry by the determined first power supply reduction.

20. The non-transitory, machine-readable, storage device of claim 17 wherein the instructions that cause the energy controller circuitry to receive the one or more instructions from the broadcast controller circuitry, further cause the energy controller circuitry to:
  receive, via the first network, one or more emergency demand response instructions from the broadcast controller circuitry responsive to the receipt, by the broadcast controller circuitry, of an emergency demand response request from the utility supplier system.

21. The non-transitory, machine-readable, storage device of claim 20, wherein the instructions, when executed by the energy controller circuitry, further cause the energy controller circuitry to:
  responsive to receipt of the one or more emergency demand response instructions from the broadcast controller circuitry:
    receive from an input device via the first network, an input indicative of a target power level for each of the one or more operatively coupled electric load devices;
    retrieve from operatively coupled memory circuitry, a second algorithm that corresponds to the received emergency demand response request;
    determine a second power supply reduction to the one or more electric load devices operatively coupled to the energy controller circuitry using the second algorithm; and
    cause a reduction in the target power level of power supplied to the one or more electric load devices operatively coupled to the energy controller circuitry by the determined second power supply reduction.

* * * * *